United States Patent
Yang et al.

(10) Patent No.: US 11,304,036 B2
(45) Date of Patent: Apr. 12, 2022

(54) V2X COMMUNICATION APPARATUS AND METHOD FOR TRANSMITTING AND RECEIVING V2X MESSAGE THEREFOR

(71) Applicant: LG ELECTRONICS INC., Seoul (KR)

(72) Inventors: Seungryul Yang, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/606,184

(22) PCT Filed: Dec. 29, 2017

(86) PCT No.: PCT/KR2017/015759
§ 371 (c)(1),
(2) Date: Oct. 17, 2019

(87) PCT Pub. No.: WO2018/174385
PCT Pub. Date: Sep. 27, 2018

(65) Prior Publication Data
US 2020/0245109 A1 Jul. 30, 2020

Related U.S. Application Data

(60) Provisional application No. 62/486,465, filed on Apr. 18, 2017, provisional application No. 62/475,827, (Continued)

(51) Int. Cl.
*H04W 4/40* (2018.01)
*B60W 30/16* (2020.01)
*H04W 4/12* (2009.01)

(52) U.S. Cl.
CPC .............. *H04W 4/40* (2018.02); *B60W 30/16* (2013.01); *H04W 4/12* (2013.01)

(58) Field of Classification Search
CPC .......... H04W 4/40; H04W 4/12; B60W 30/16
(Continued)

(56) References Cited

U.S. PATENT DOCUMENTS

2013/0219294 A1  8/2013  Goldman-Shenhar et al.
2015/0291162 A1* 10/2015  van Nunen ............ G01B 21/16
                                                            702/158

(Continued)

FOREIGN PATENT DOCUMENTS

CN    106314433 A    1/2017
JP    9-81899 A      3/1997

(Continued)

OTHER PUBLICATIONS

Liu et al.; "V2X-Based Decentralized Cooperative Adaptive Cruise Control in the Vicinity of Intersections;" Mar. 2016; IEEE; 644-800. (Year: 2016).*

(Continued)

*Primary Examiner* — Christopher R Crompton
(74) *Attorney, Agent, or Firm* — Birch, Stewart, Kolasch & Birch, LLP

(57) ABSTRACT

A method for receiving a V2X message by a V2X communication apparatus is disclosed. The method for receiving a V2X message may include receiving a V2V message including Cooperative Adaptive Cruise Control (CACC) information from at least one CACC vehicle, and the CACC information includes CACC String ID (CSID) information for identifying a CACC string to which the CACC vehicle is belonged and string length management information used for managing a string length of the CACC string, obtaining the CSID information and the string length management information from the V2V message; and setting a value of the string length management information of the subject vehicle based on the CSID information and the string length (Continued)

management information. Here, the string length management information may include at least one of Order In String (OIS) information indicating a current order of the CACC vehicle in the CACC string or CACC String Length (CSL) information indicating a length of the CASS string.

20 Claims, 47 Drawing Sheets

Related U.S. Application Data filed on Mar. 23, 2017, provisional application No. 62/475,825, filed on Mar. 23, 2017, provisional application No. 62/475,829, filed on Mar. 23, 2017.

(58) Field of Classification Search
USPC .......................................................... 370/329
See application file for complete search history.

(56) References Cited

U.S. PATENT DOCUMENTS

| | | | |
|---|---|---|---|
| 2017/0227972 A1* | 8/2017 | Sabau .................... | G05D 1/024 |
| 2017/0364070 A1* | 12/2017 | Oba ..................... | G05D 1/0061 |
| 2018/0093666 A1* | 4/2018 | Kim ..................... | B60W 30/16 |
| 2018/0213376 A1* | 7/2018 | Pinheiro ............... | H04W 76/14 |
| 2018/0294935 A1* | 10/2018 | Uchiyama ......... | H04W 72/0406 |
| 2019/0114924 A1* | 4/2019 | Bergquist ................ | G08G 1/22 |
| 2019/0182415 A1* | 6/2019 | Sivan ..................... | G06F 3/013 |
| 2019/0263404 A1* | 8/2019 | Bergquist ............ | B60W 30/162 |
| 2020/0086886 A1* | 3/2020 | Kaneko ................ | B60W 40/02 |

FOREIGN PATENT DOCUMENTS

| | | |
|---|---|---|
| JP | 10-261194 A | 9/1998 |
| JP | 11-321380 A | 11/1999 |
| JP | 2008-46820 A | 2/2008 |
| JP | 2010-39918 A | 2/2010 |
| KR | 10-1664716 B1 | 10/2016 |
| WO | WO 2016/065055 A1 | 4/2016 |
| WO | WO 2017-003405 A1 | 1/2017 |
| WO | WO 2017/011039 A1 | 1/2017 |

OTHER PUBLICATIONS

Hua Wei Hisilicon. "Add Vehicles Platooning Requirements in eV2X TS". SI-171018, 3GPP TSG SA WG1 Meeting #77, Jeju Island, South Korea, Feb. 7, 2017.

Shladover et al., "Cooperative adaptive Cruise Control (CACC) Definitions and Operating Concepts", 2015 TRB Annual Meeti.ng, Washington D. C., Jan. 2015, Retrieved from <https:/iwww.researchgate.net/publicatiorn'273204405>.

"Intelligent Transport System (ITS); Cooperative Adaptive Cruise Control (CACC): Pre-standardization study [Release 2]", European Telecommunications Standards Institute, V0.1.1 22, Feb. 22, 2017, pp. 1-50.

Amoozadeh et al., "Platoon Management with Cooperative Adaptive Cruise Control Enabled by VANET," Vehicular Communications Journal, Apr. 4, 2015, 15 pages total.

Bucher et al., "A V2X Message Evaluation Methodology and Cross-Domain Modelling of Safety Applications in V2X-enabled E/E-Architectures," SIMUTOOLS, 2015, 8 pages total.

Noel et al., "A Decision Support System for Improving Resiliency of Cooperative Adaptive Cruise Control Systems" Procedia Computer Science, vol. 95, 2016, pp. 489-496, 8 pages total.

* cited by examiner

[FIG. 1]
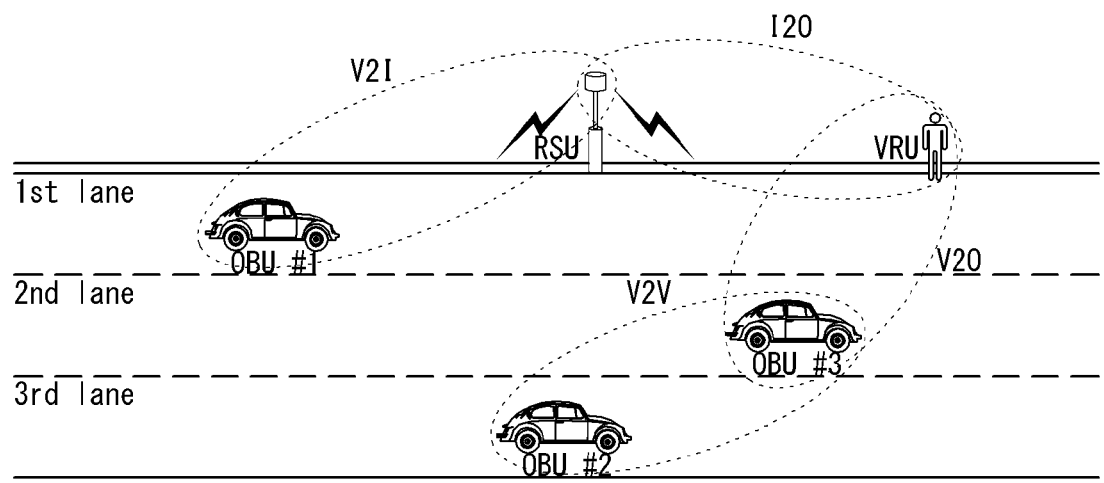

[FIG. 2]
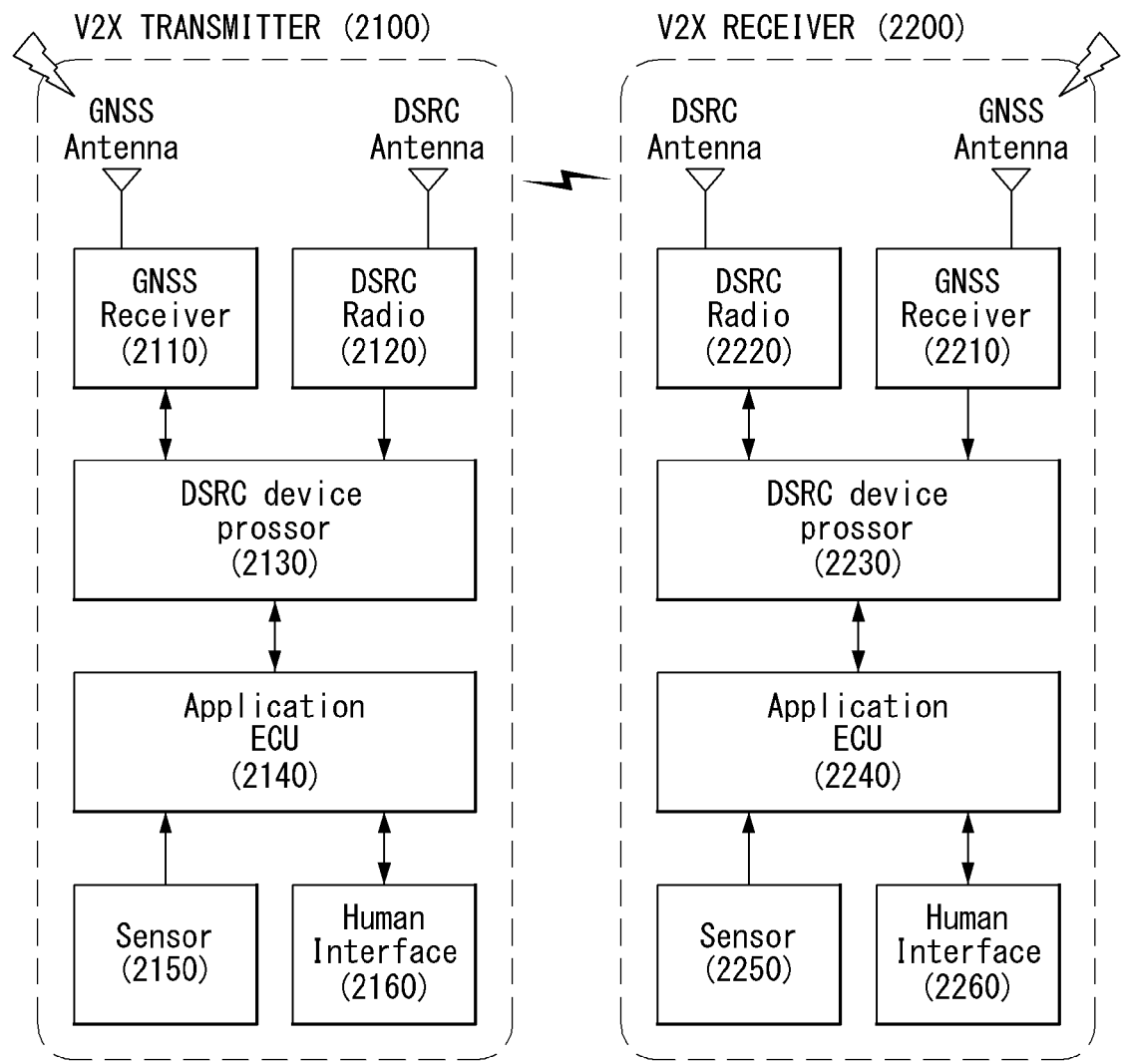

[FIG. 3]
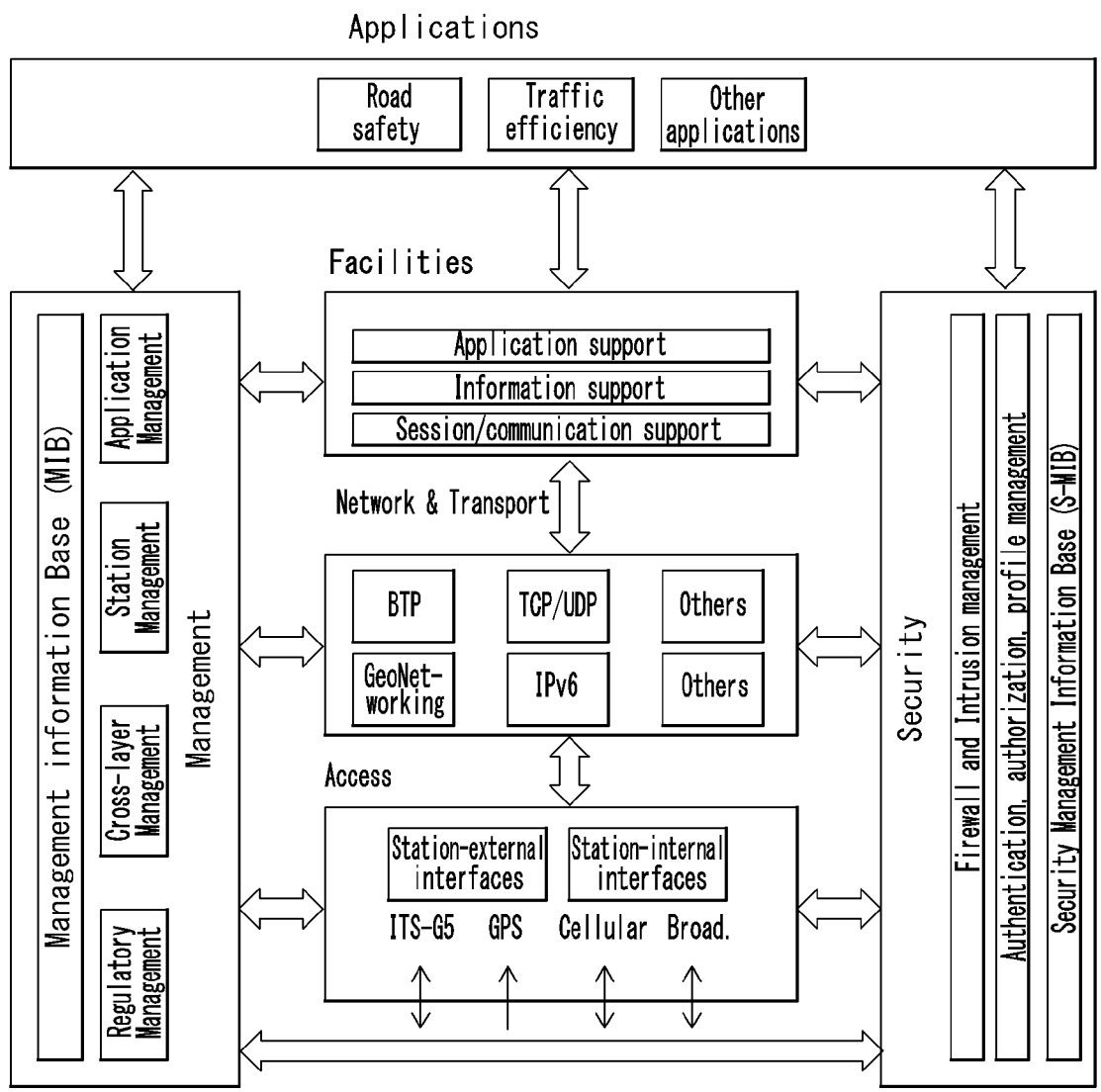

[FIG. 4]
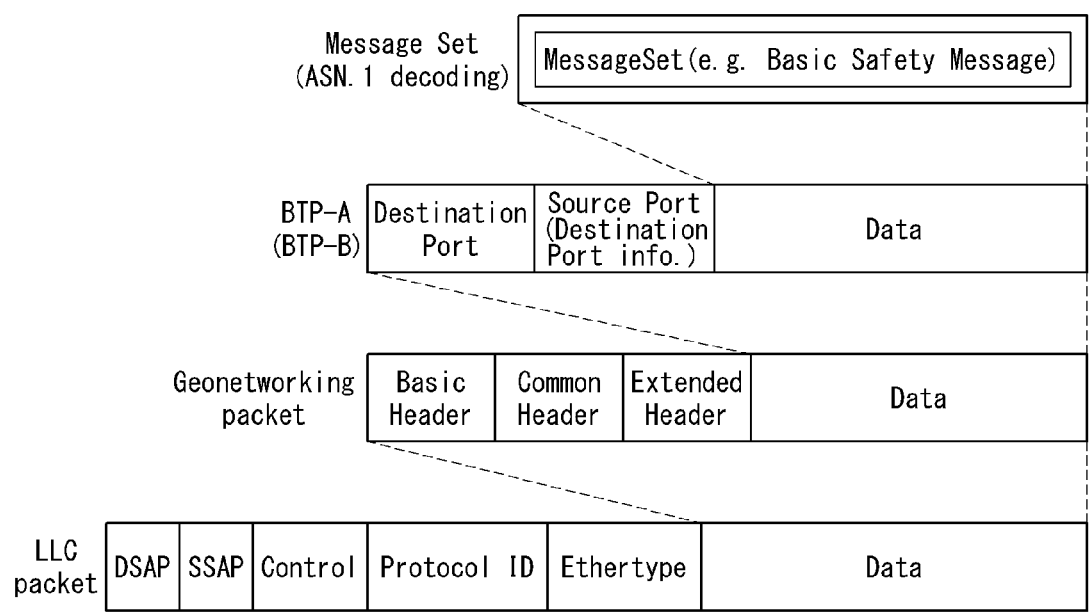

[FIG. 5]
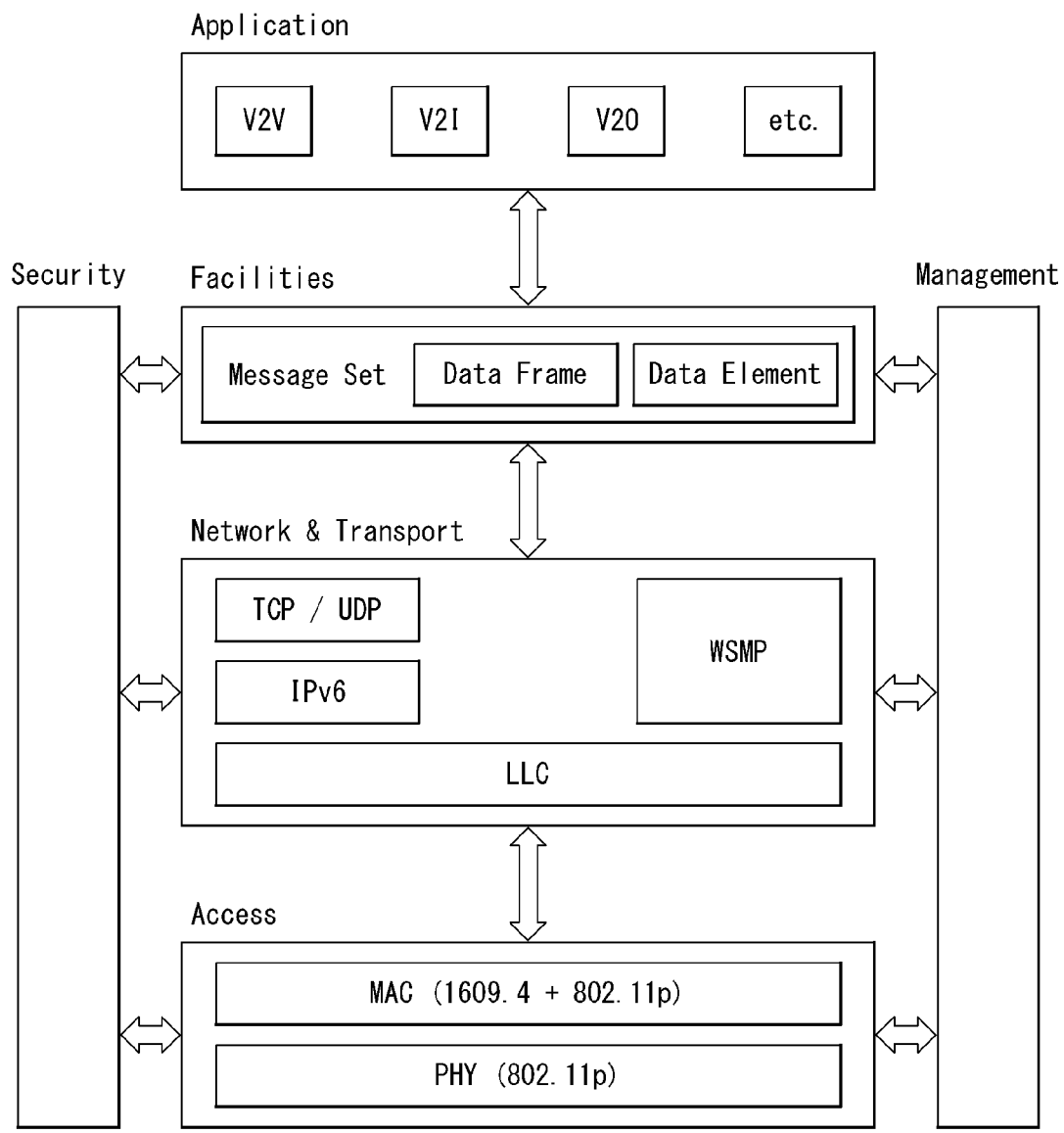

[FIG. 6]
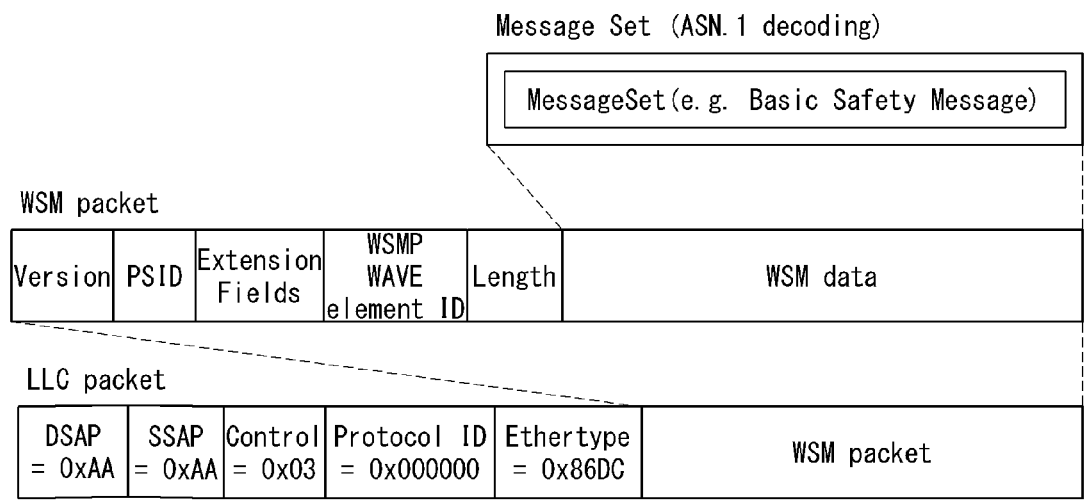

[FIG. 7]
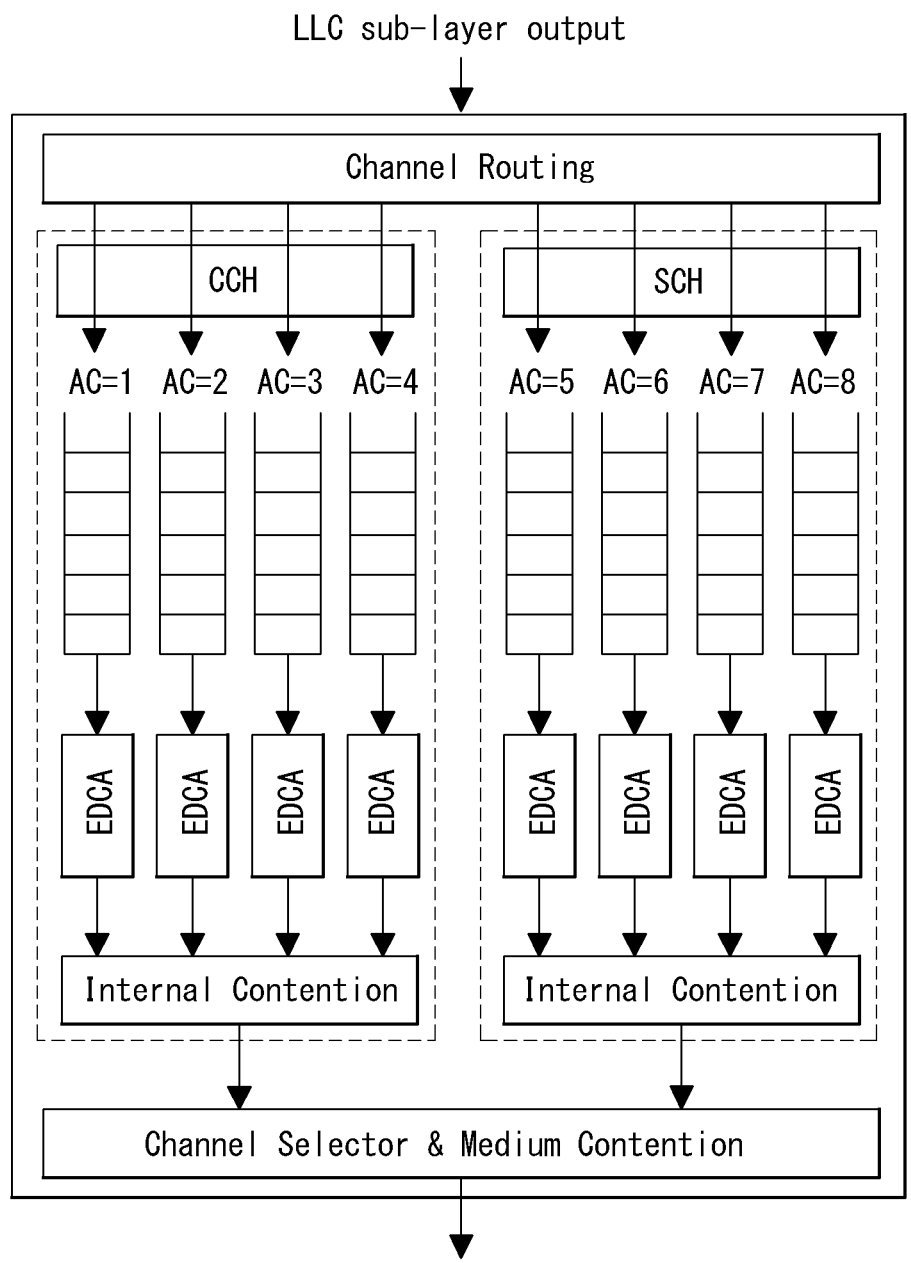

[FIG. 8]
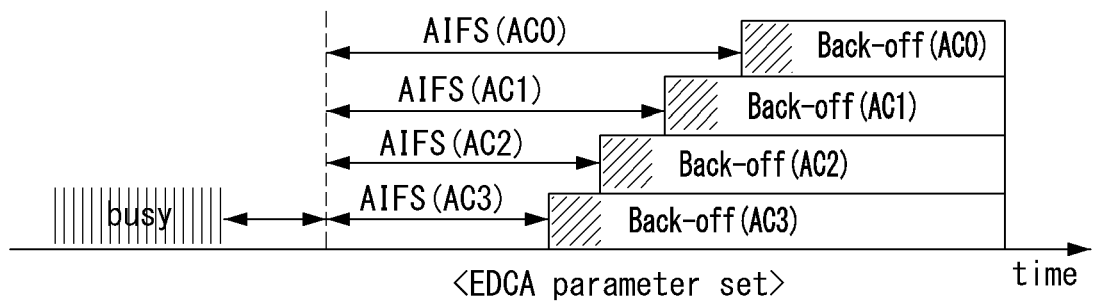

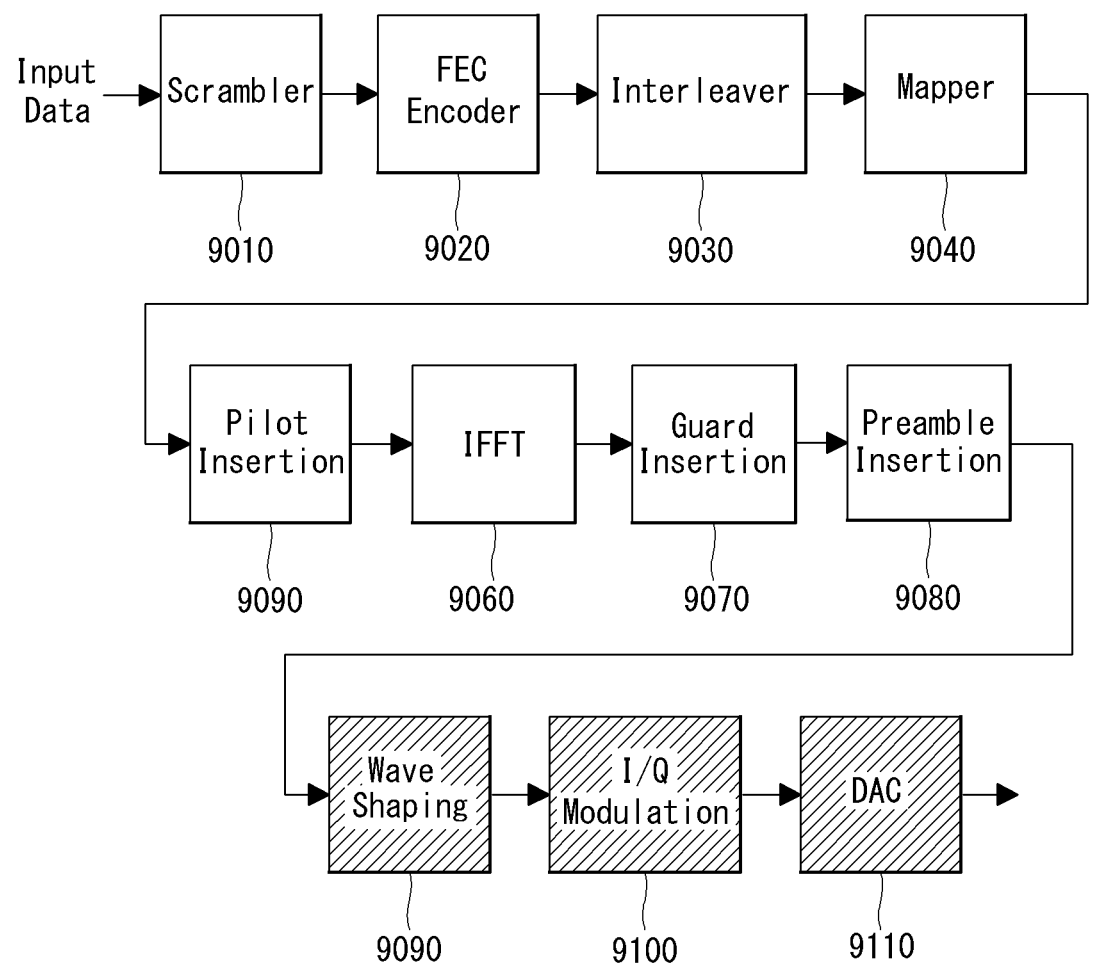
[FIG. 9]

[FIG. 10A]
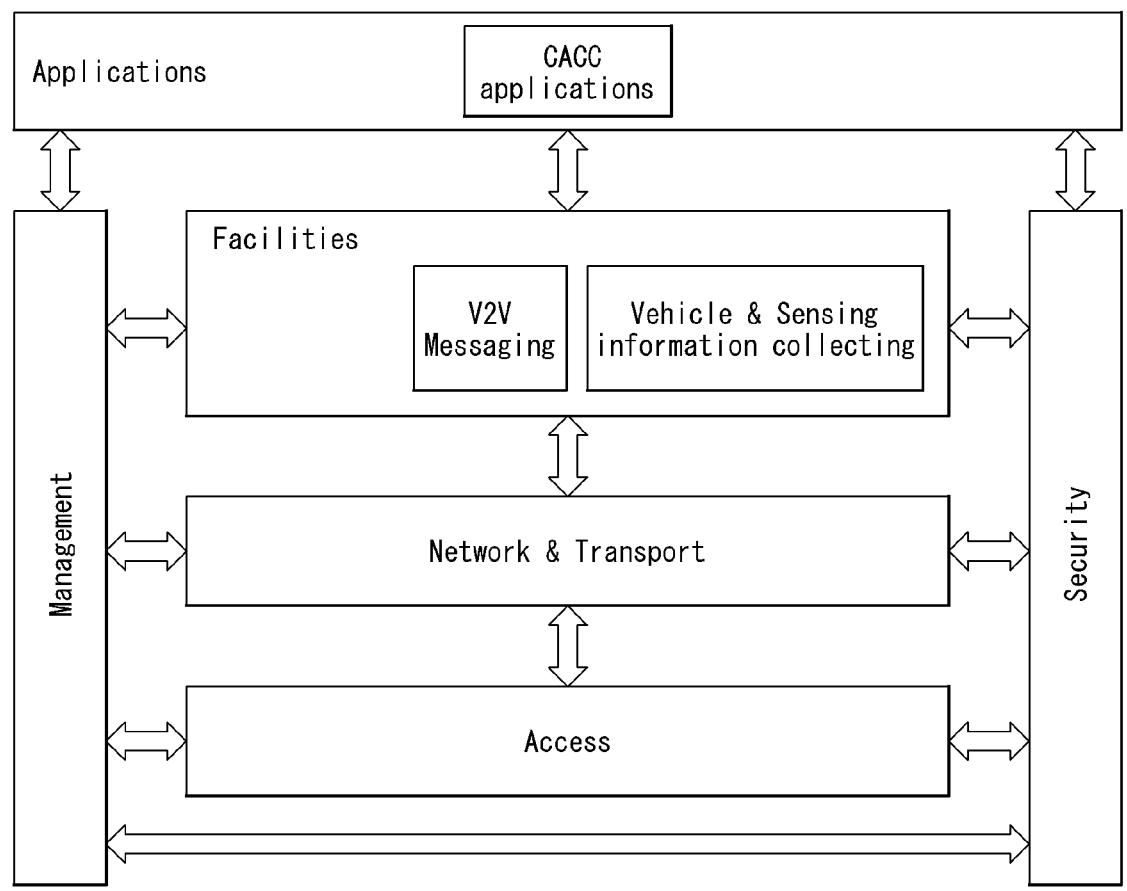

[FIG. 10B]
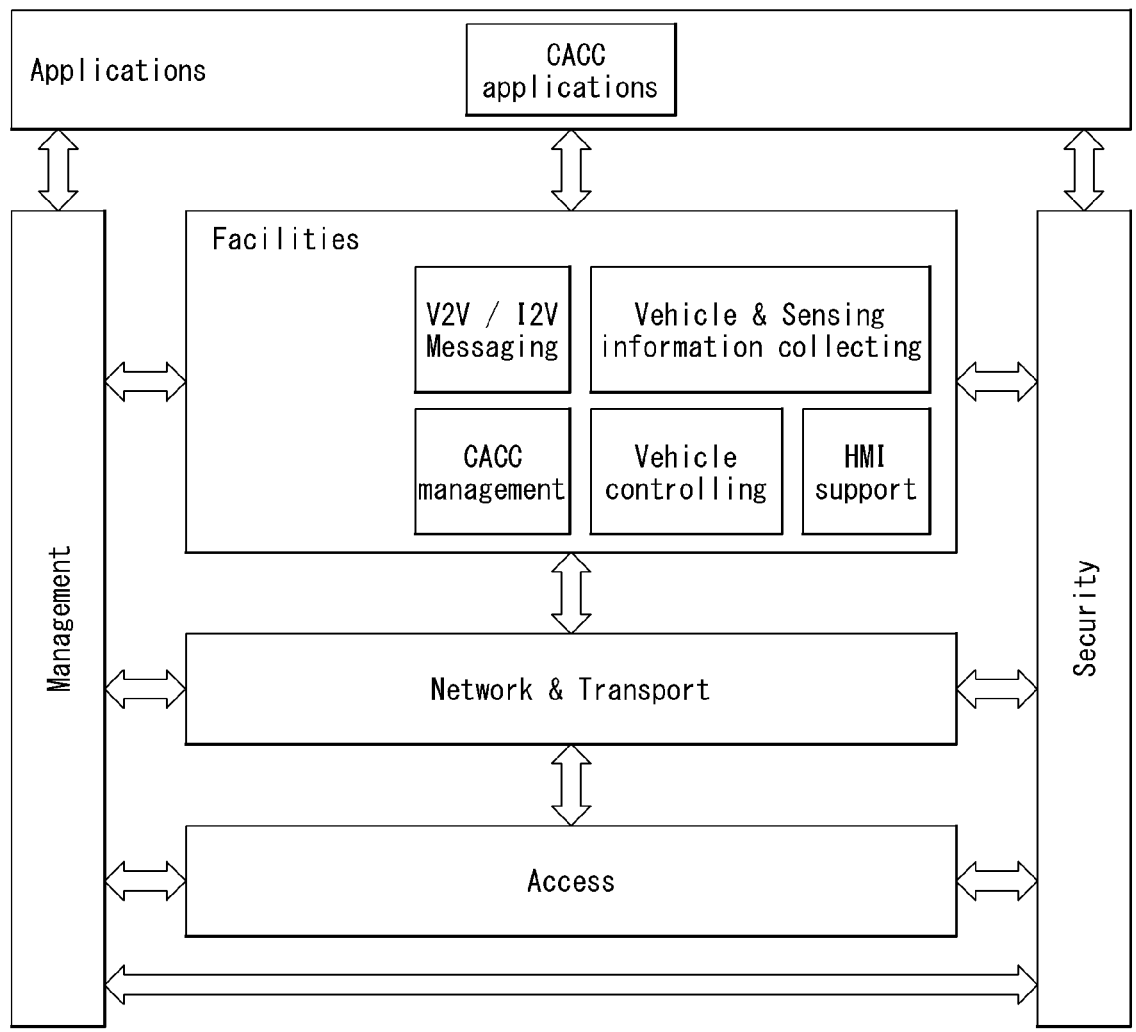

[FIG. 11A]
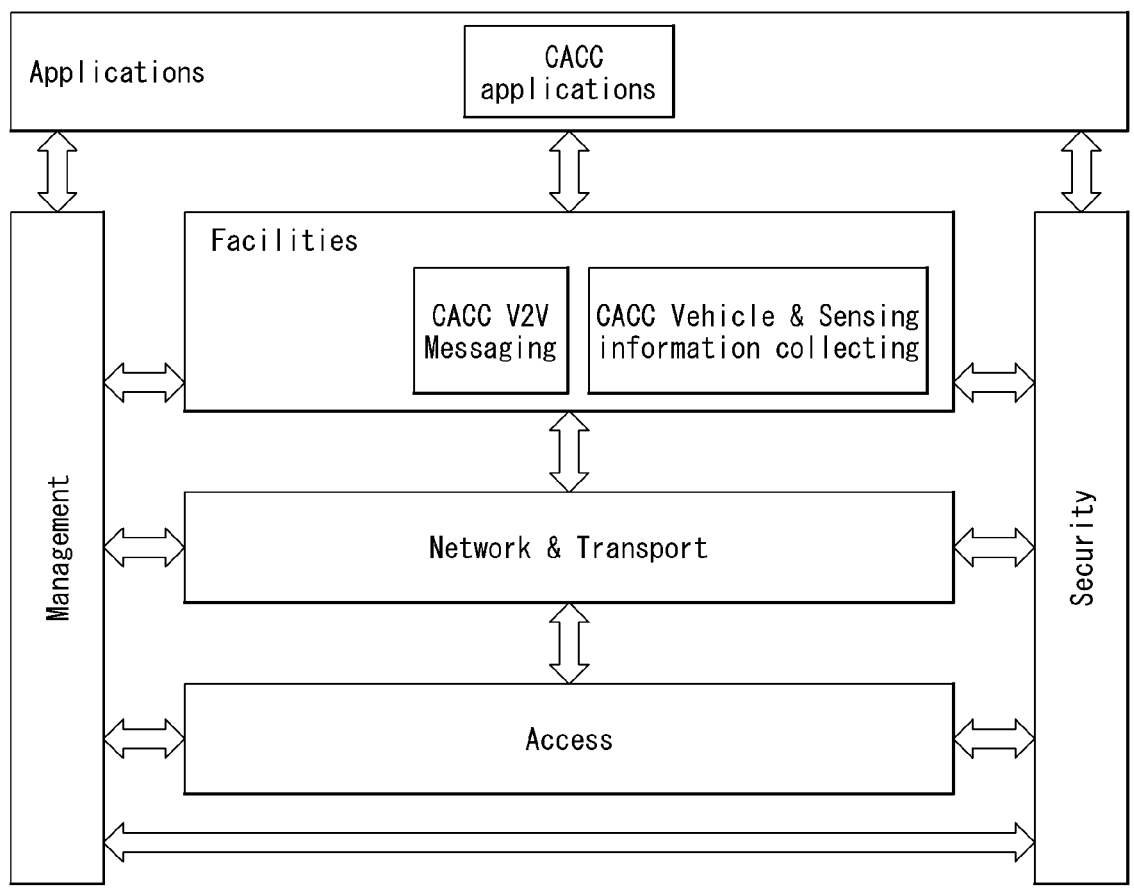

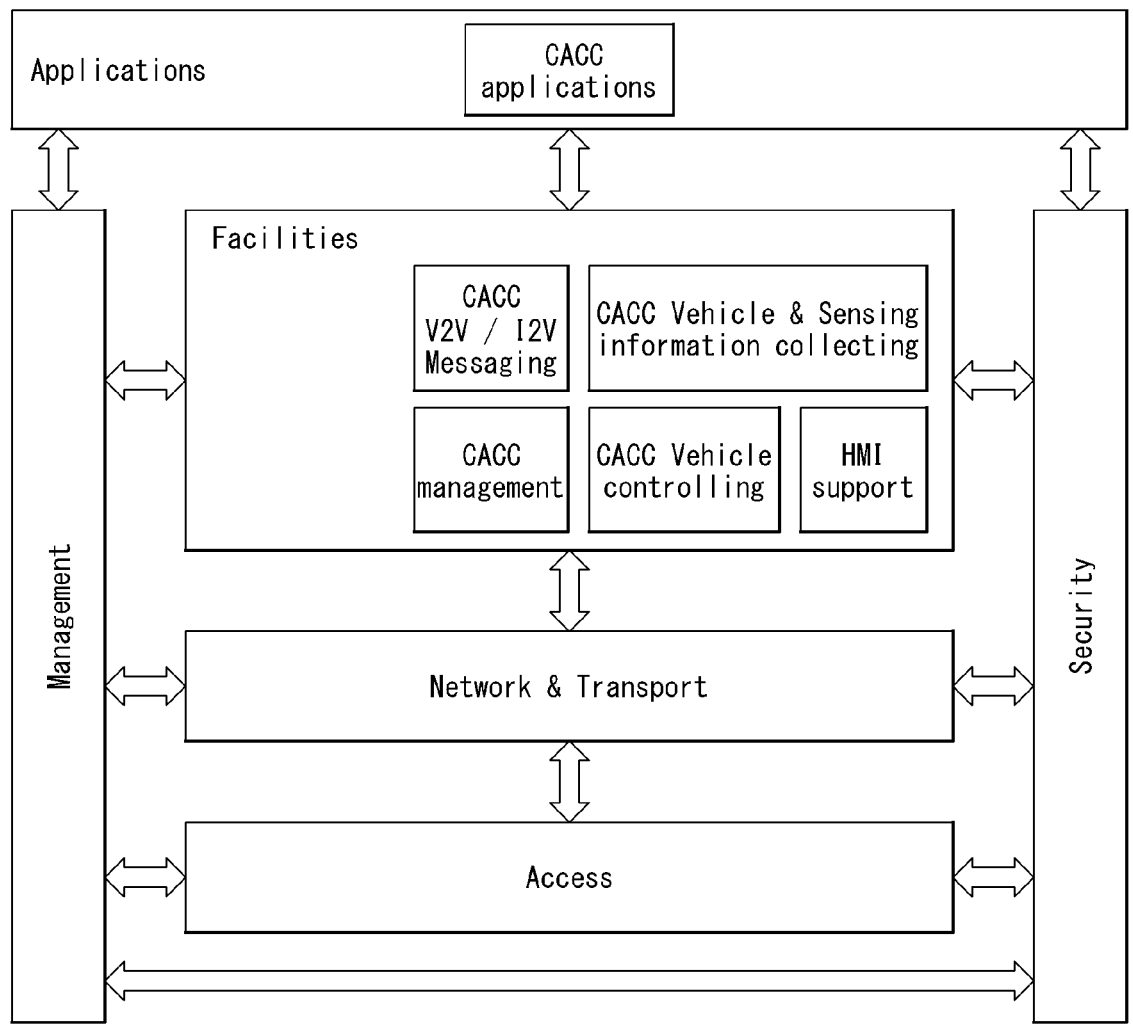
[FIG. 11B]

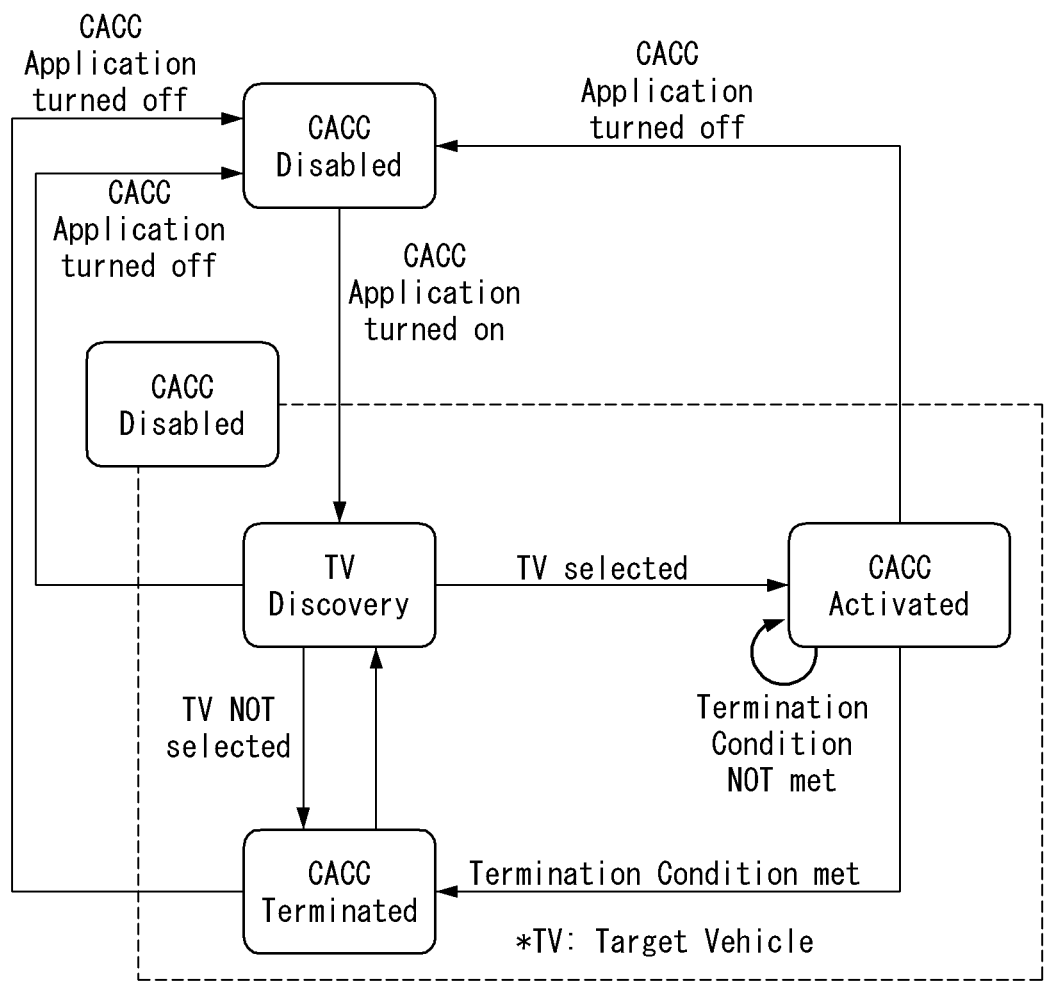

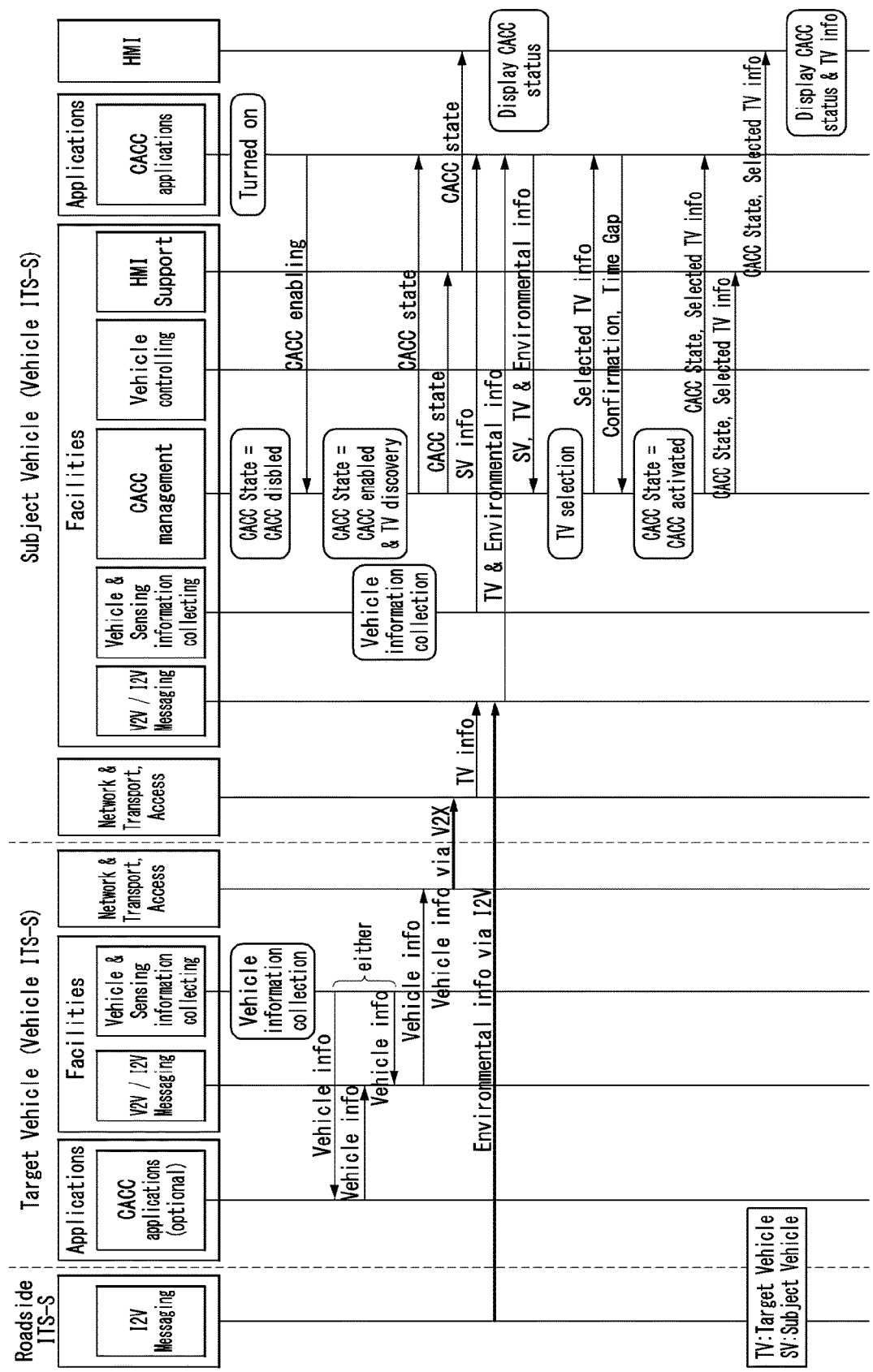
[FIG. 13]

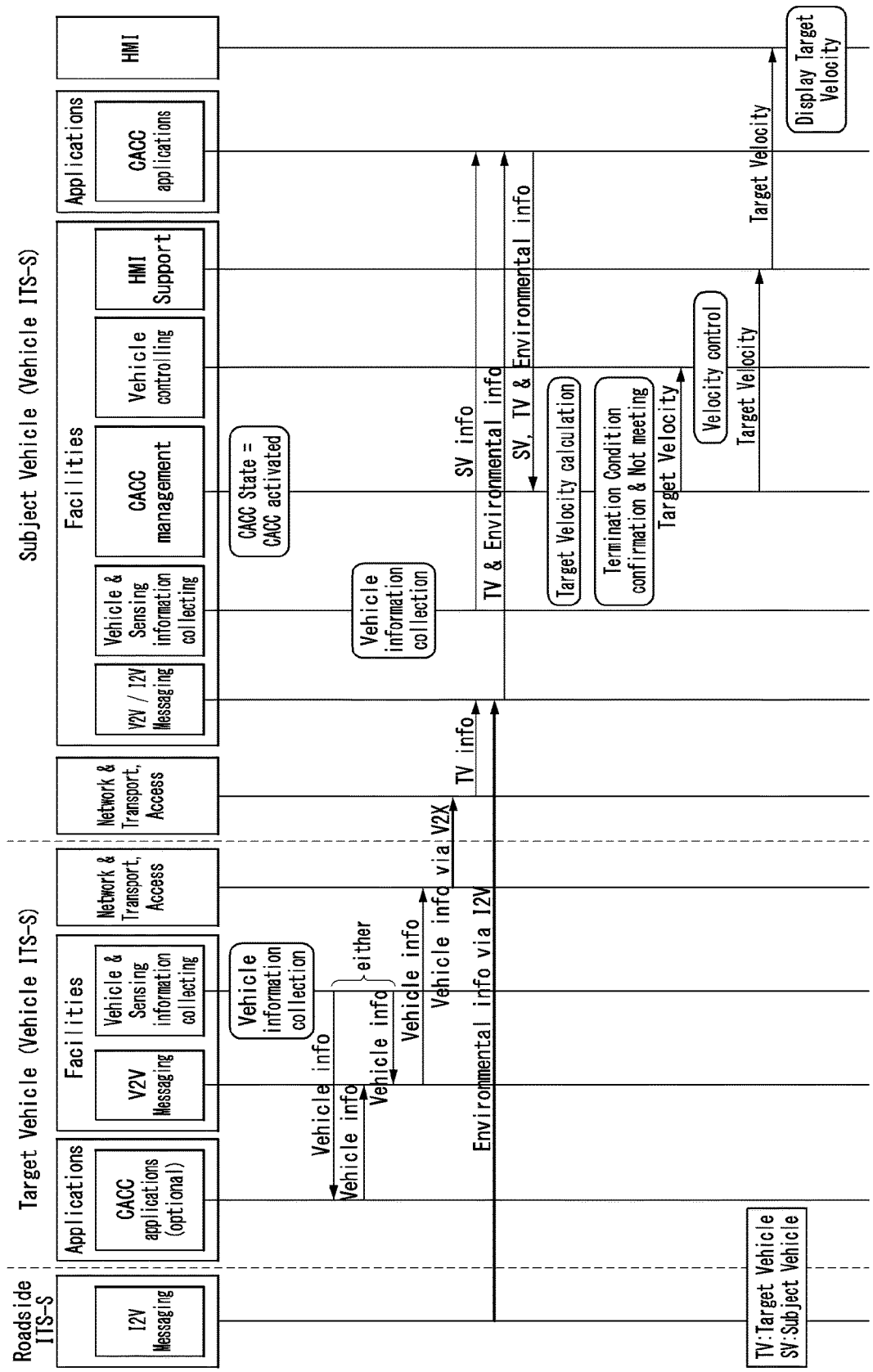
[FIG. 14]

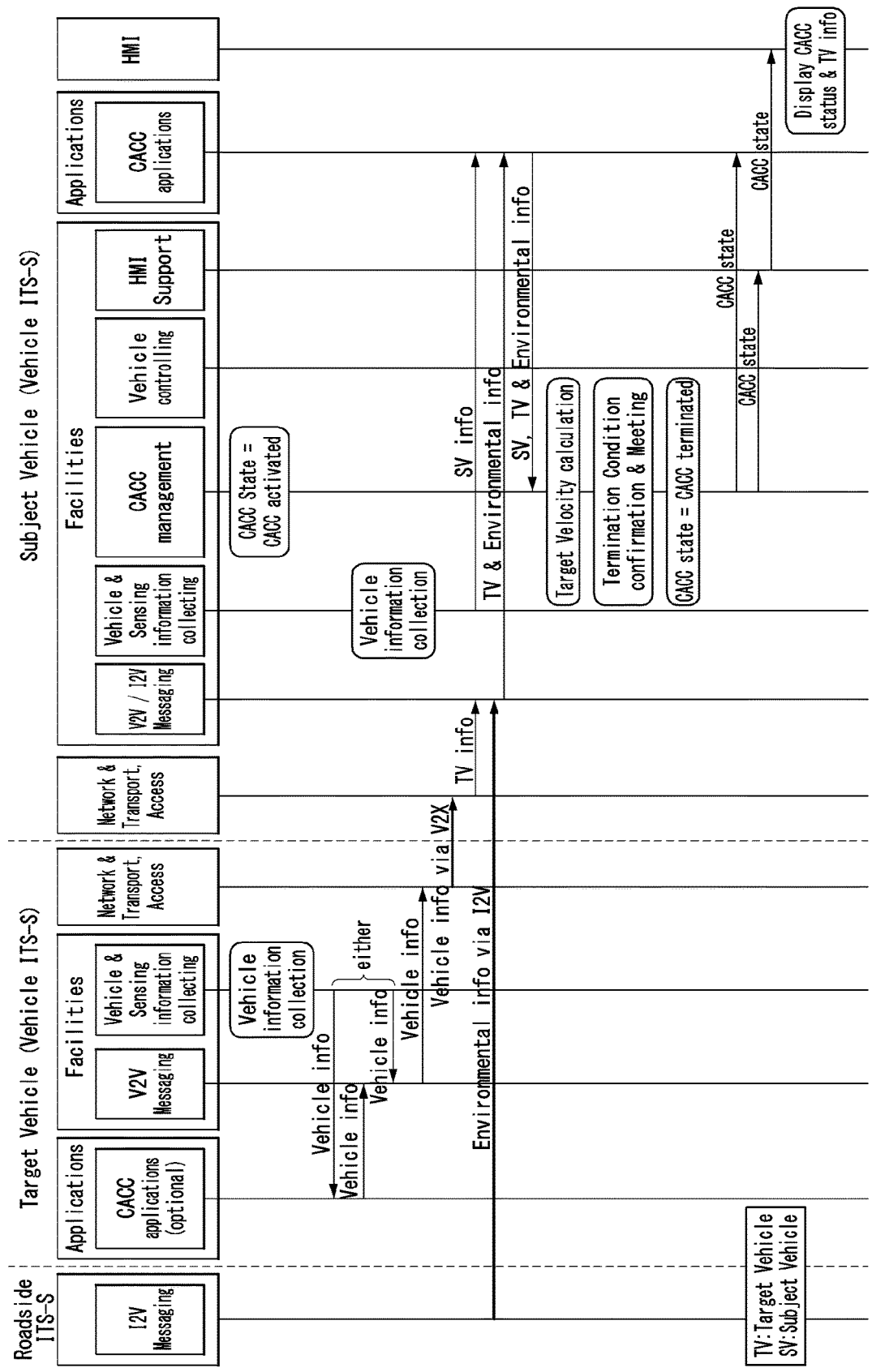
[FIG. 15]

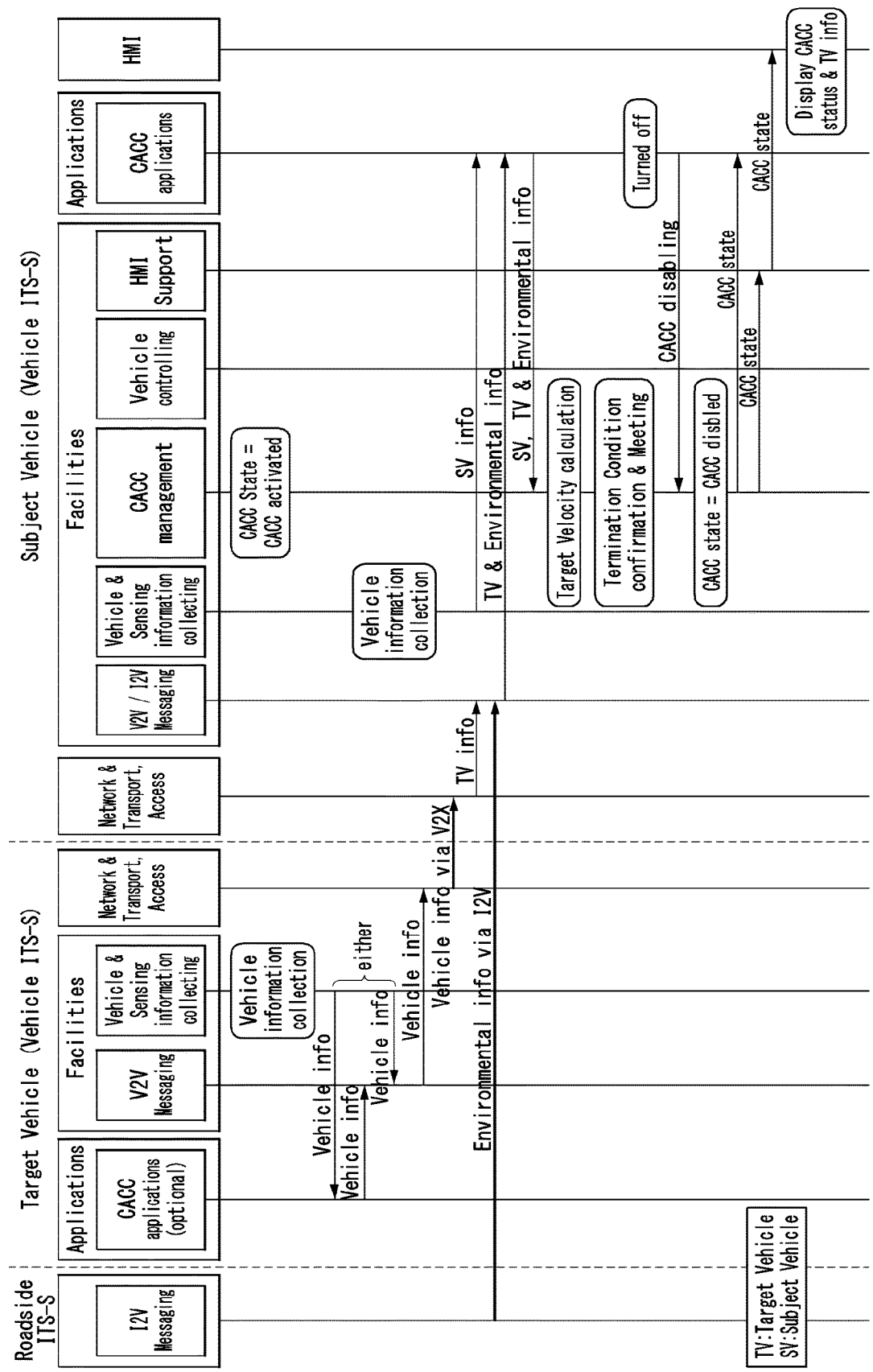
[FIG. 16]

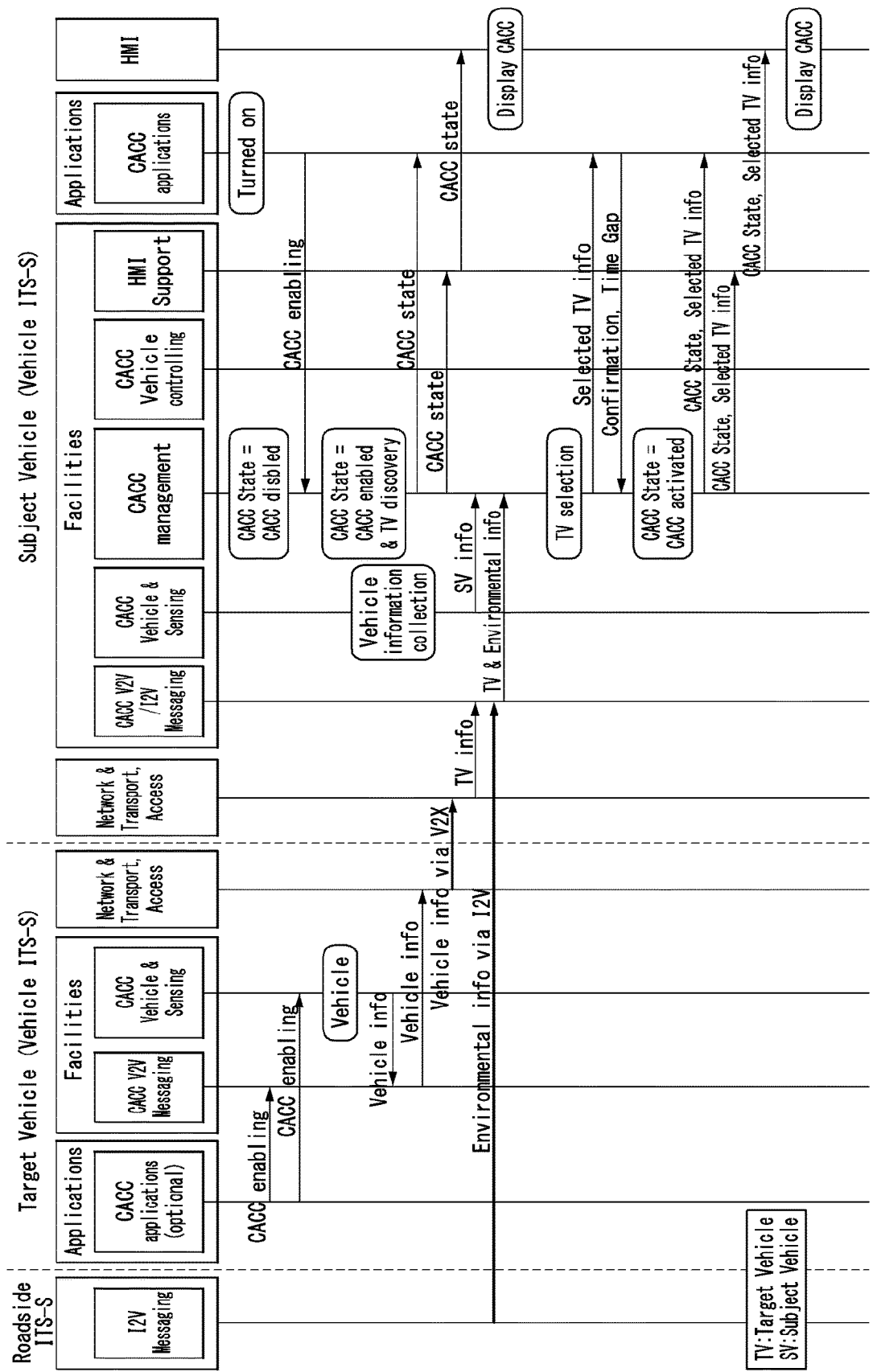

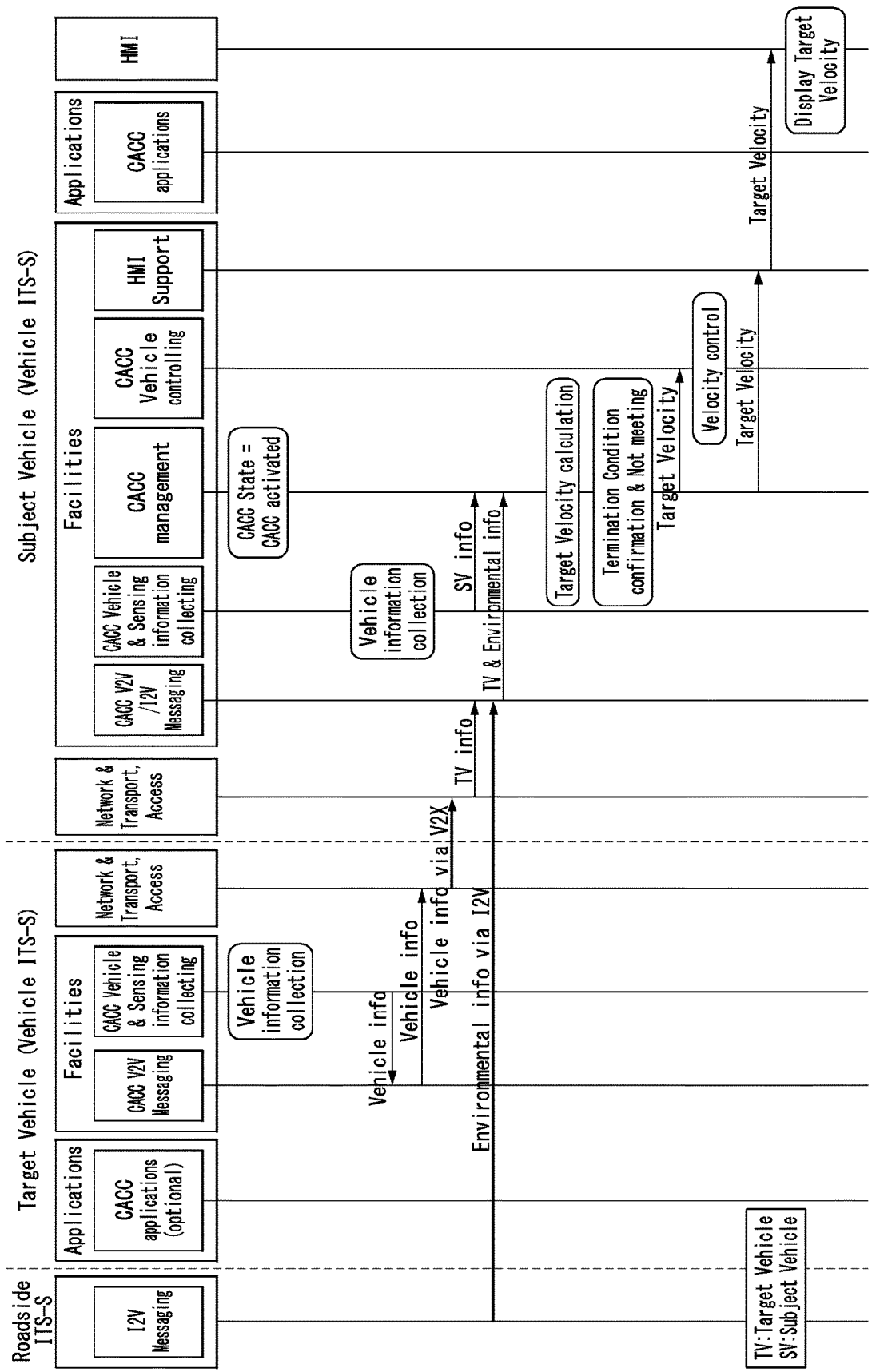
[FIG. 18]

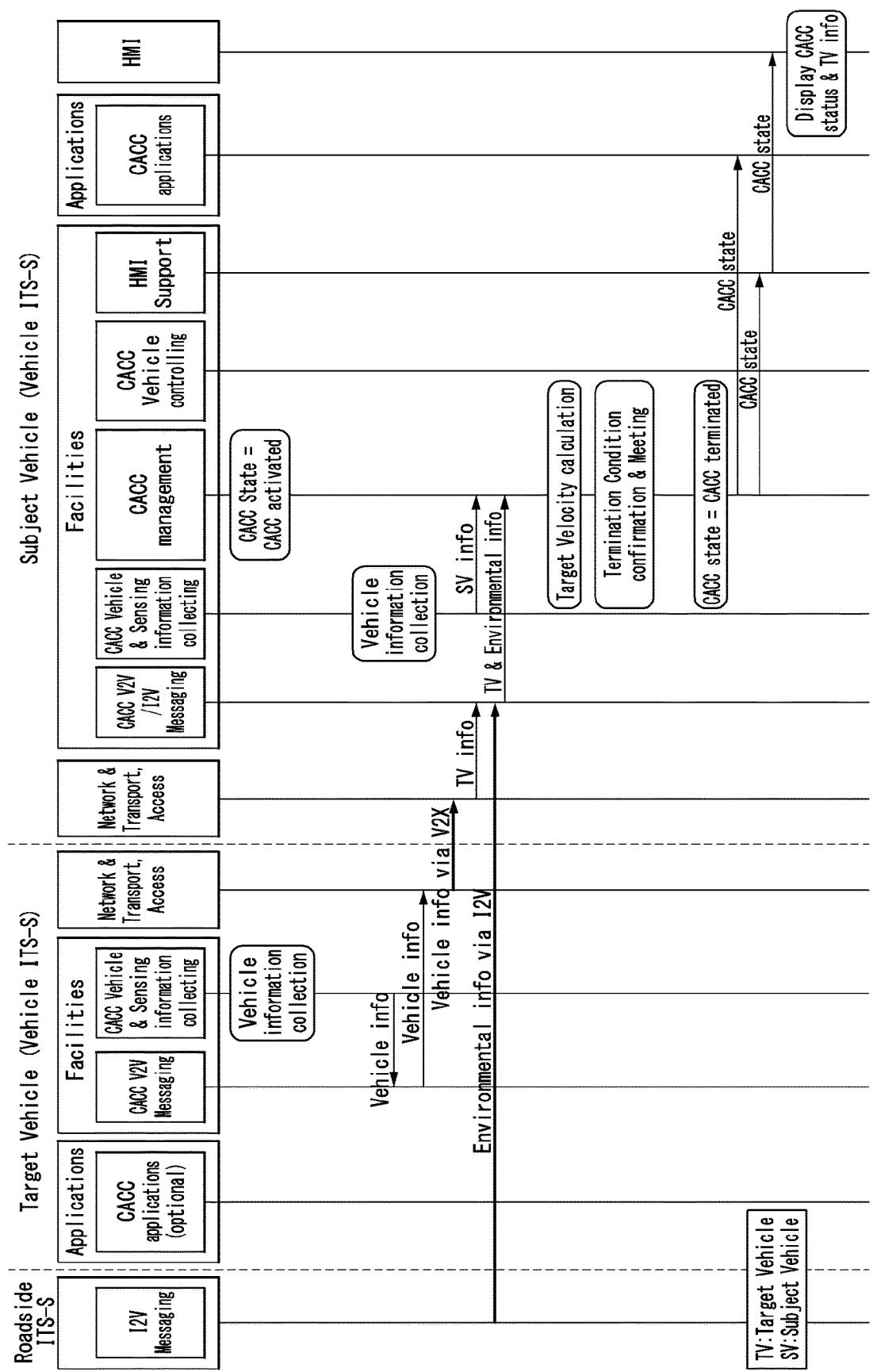
[FIG. 19]

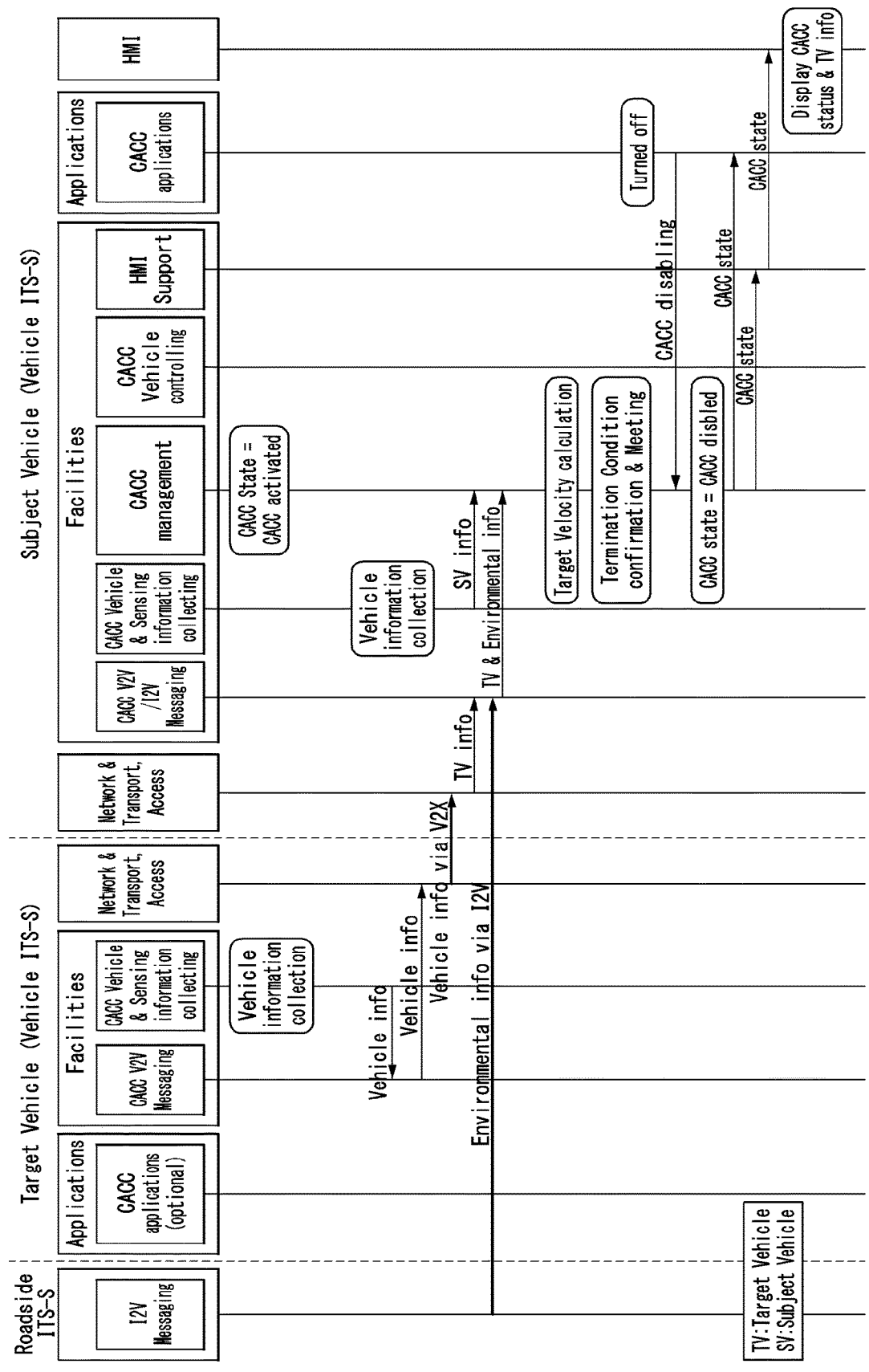
[FIG. 20]

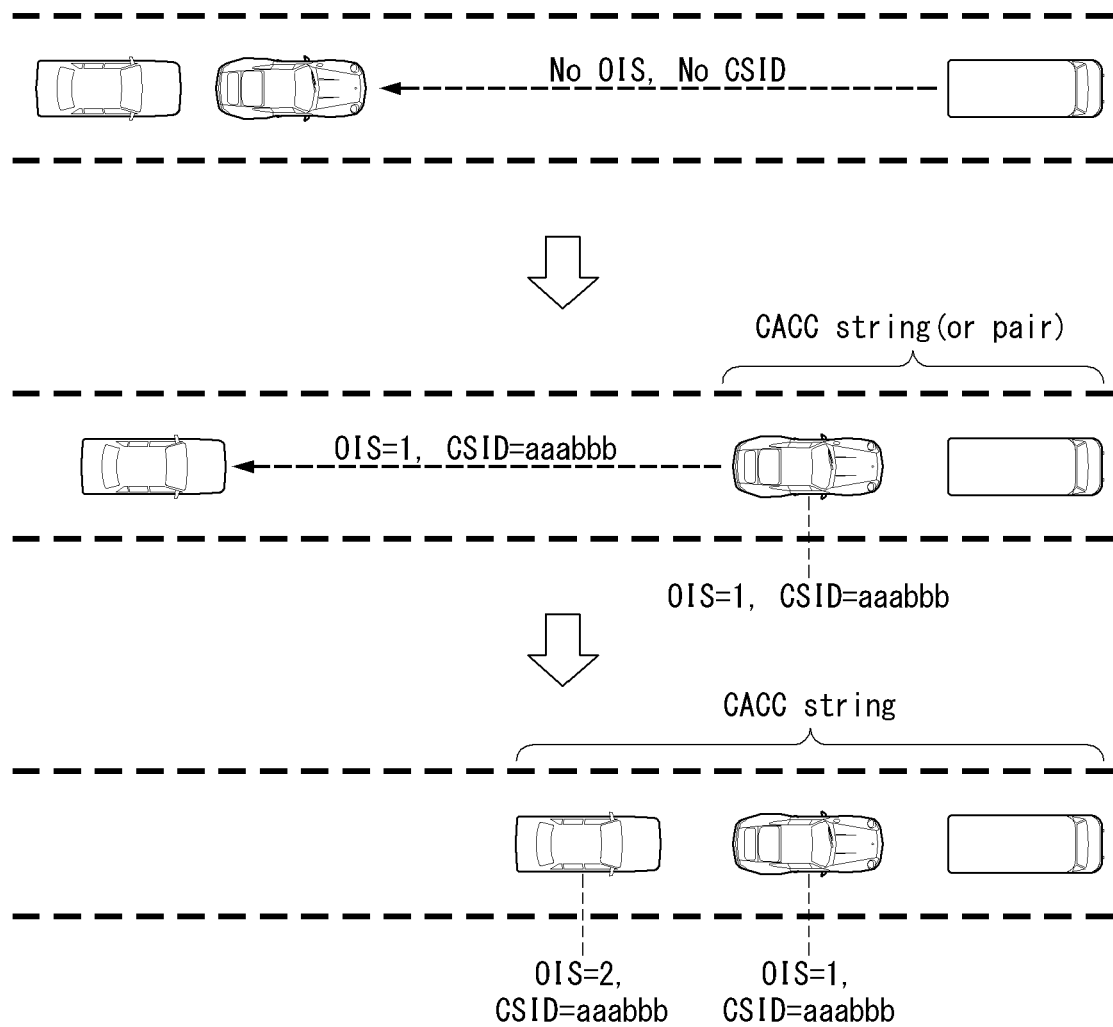
[FIG. 21]

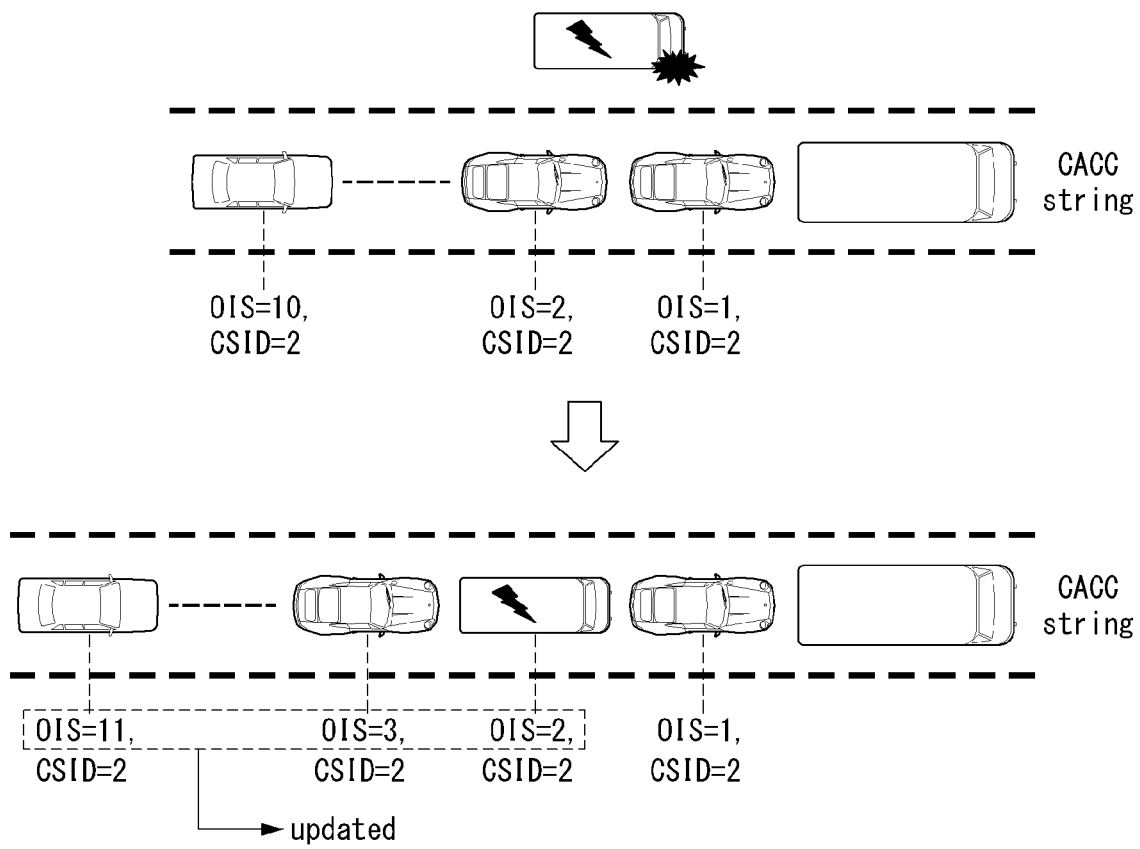
[FIG. 22]

[FIG. 23]
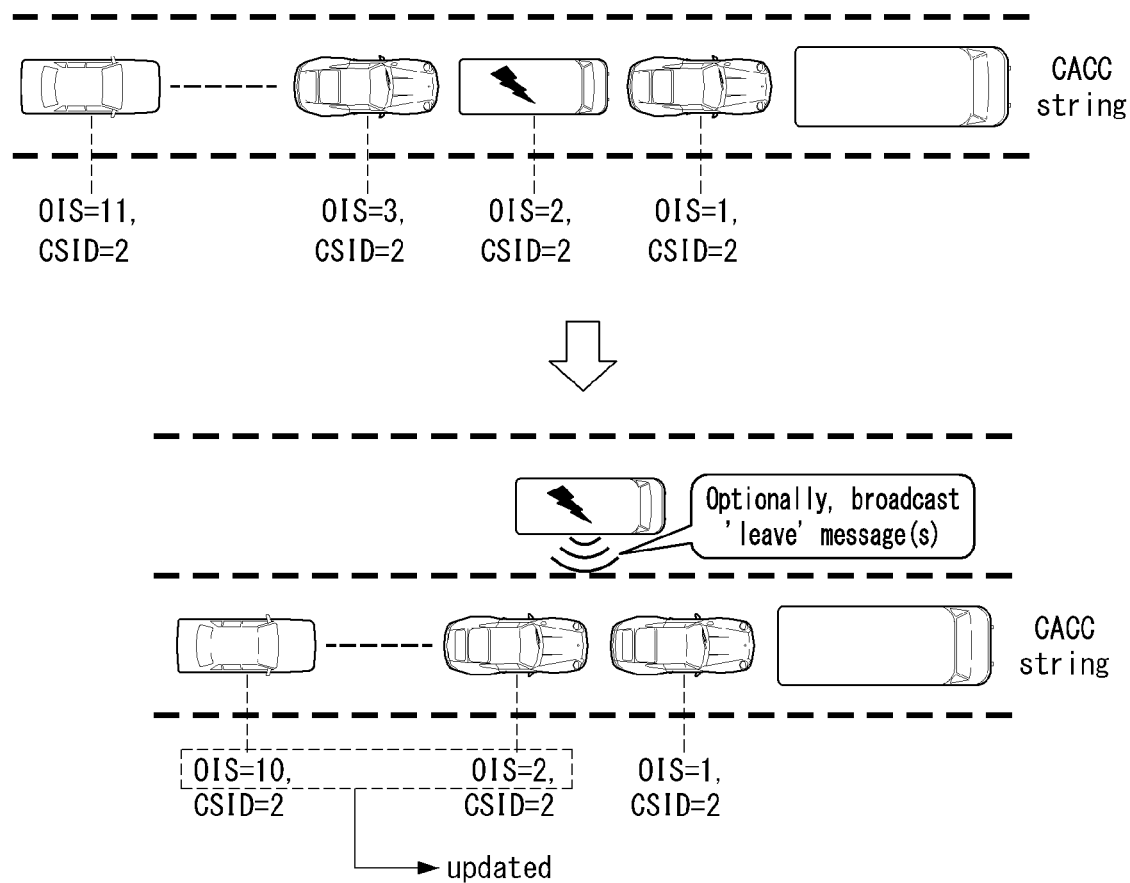

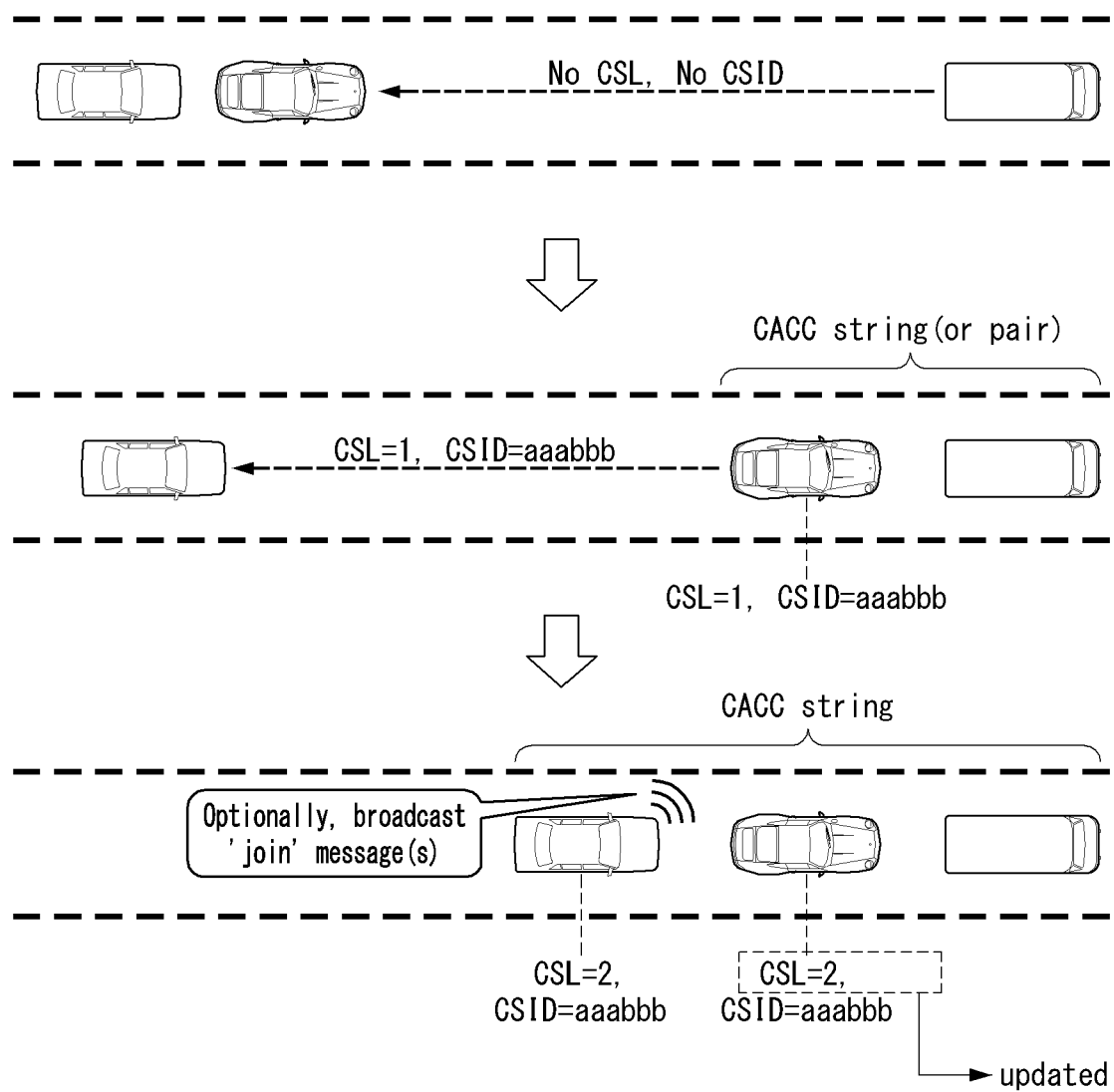
[FIG. 24]

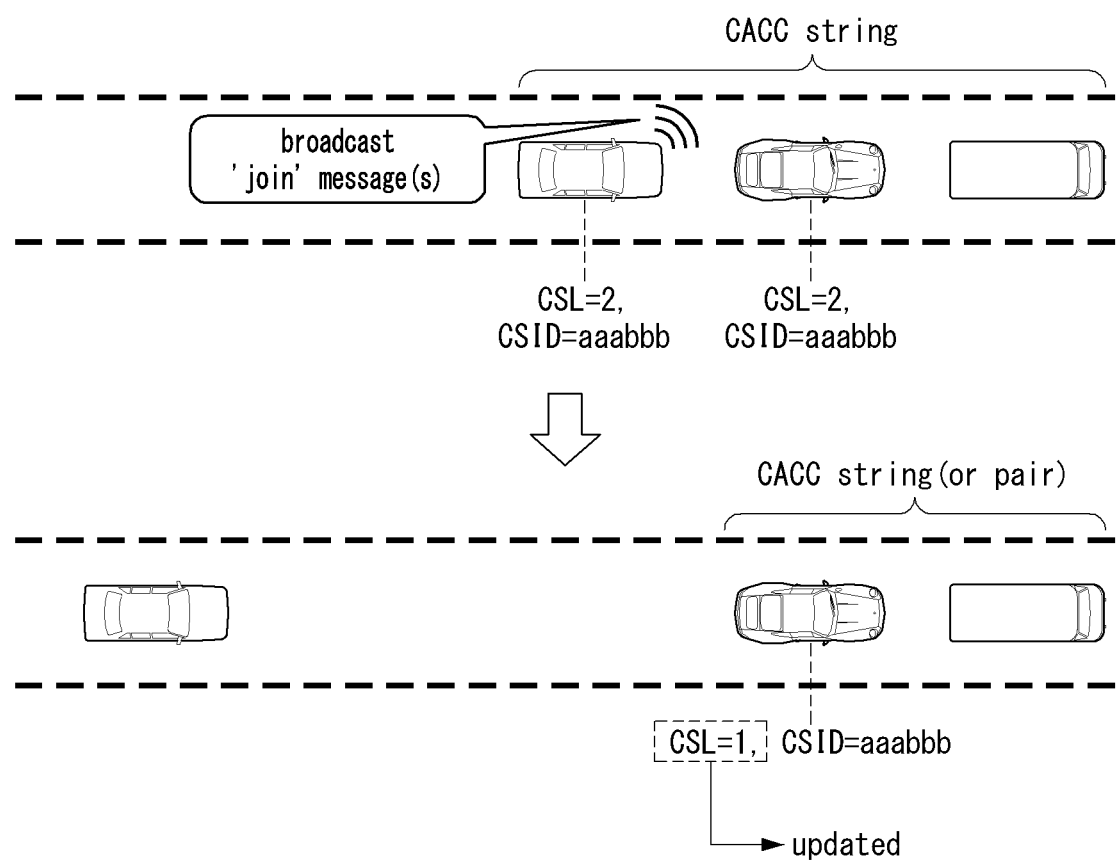
[FIG. 25]

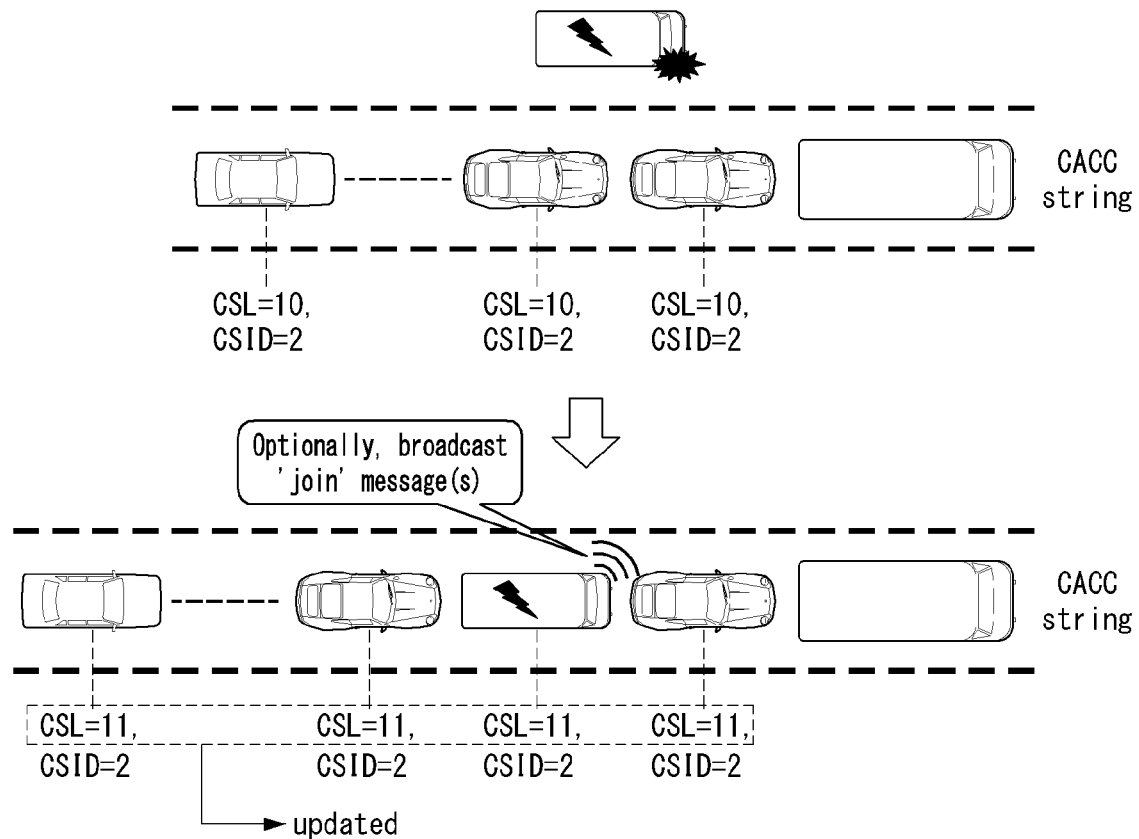
[FIG. 26]

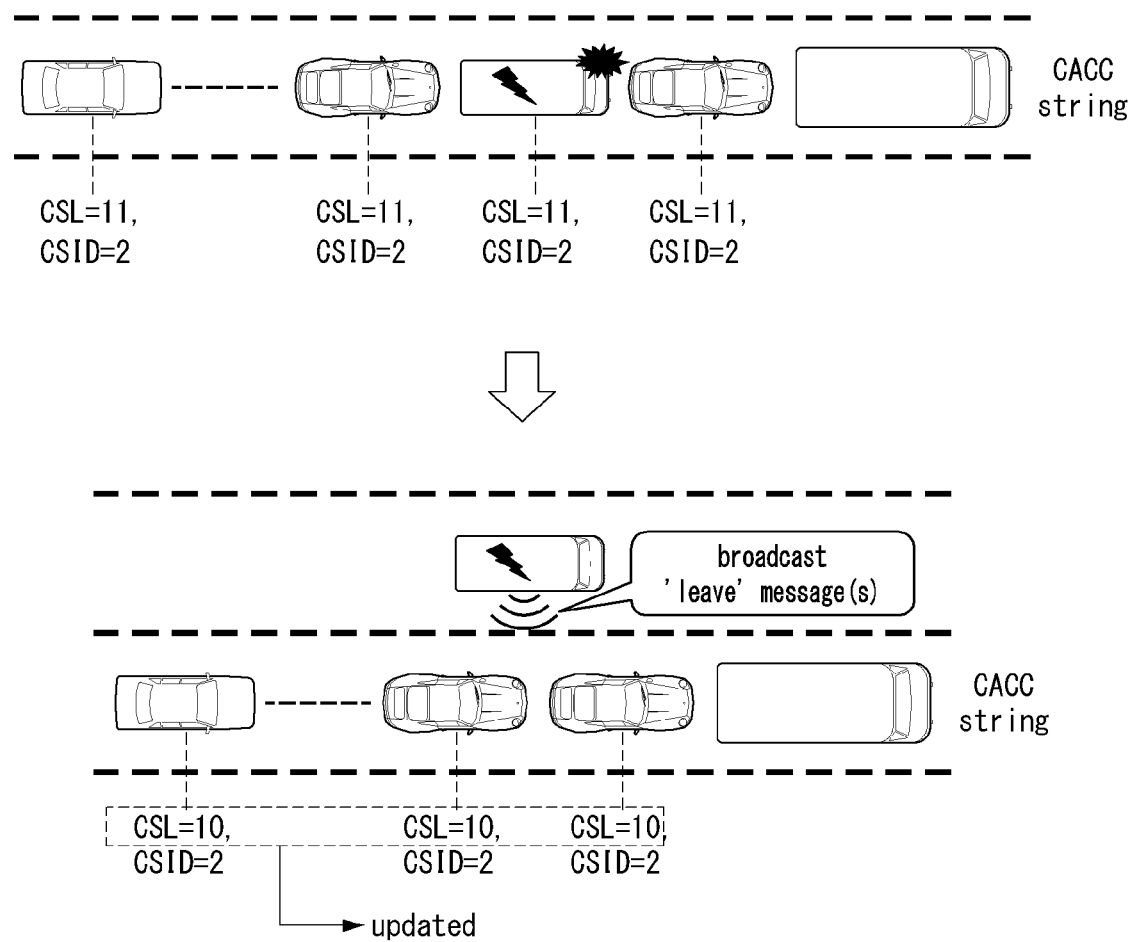
[FIG. 27]

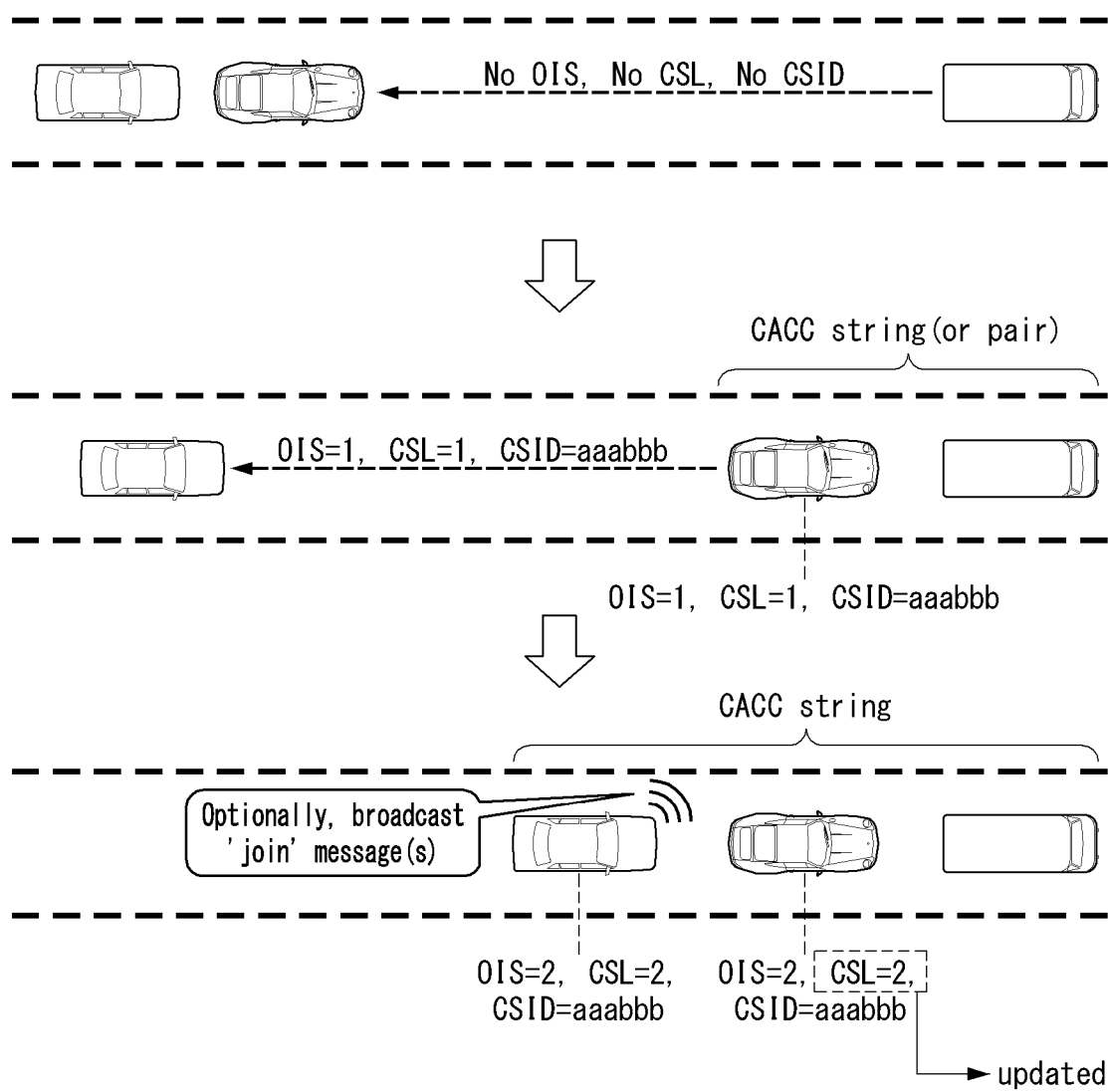
[FIG. 28]

[FIG. 29]
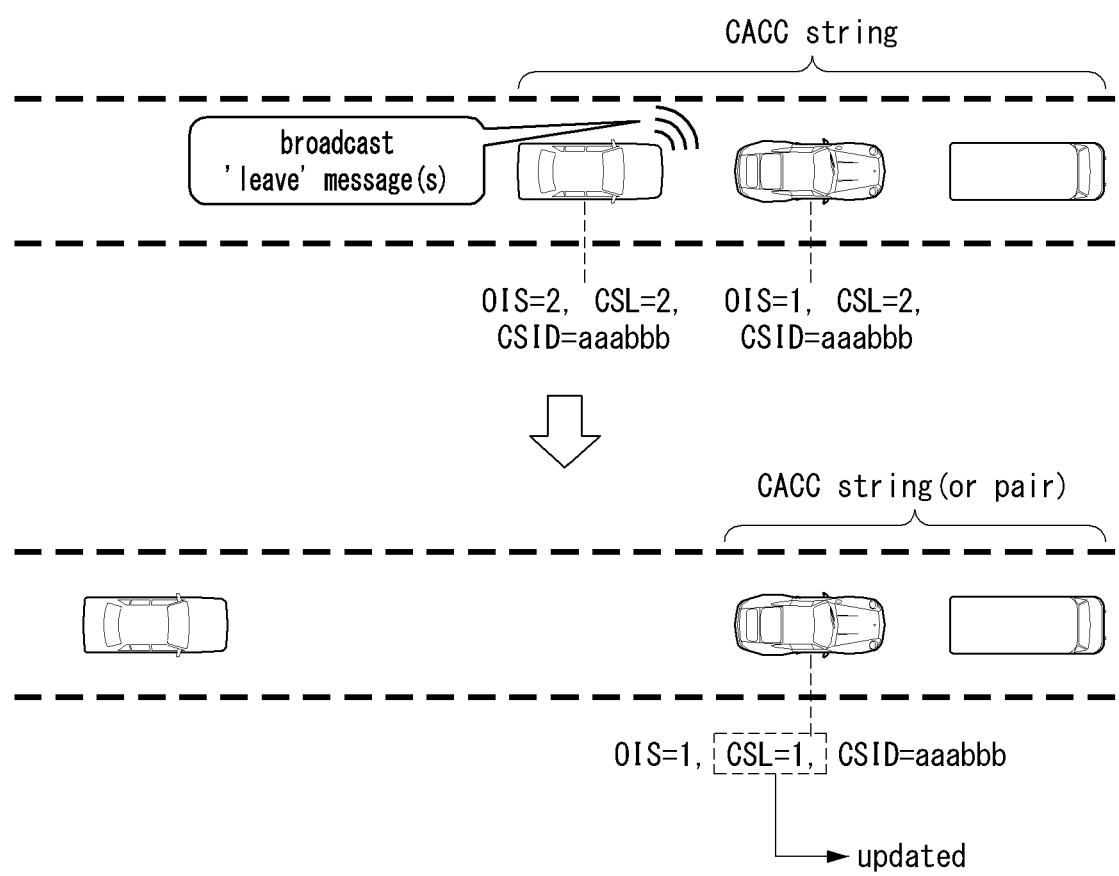

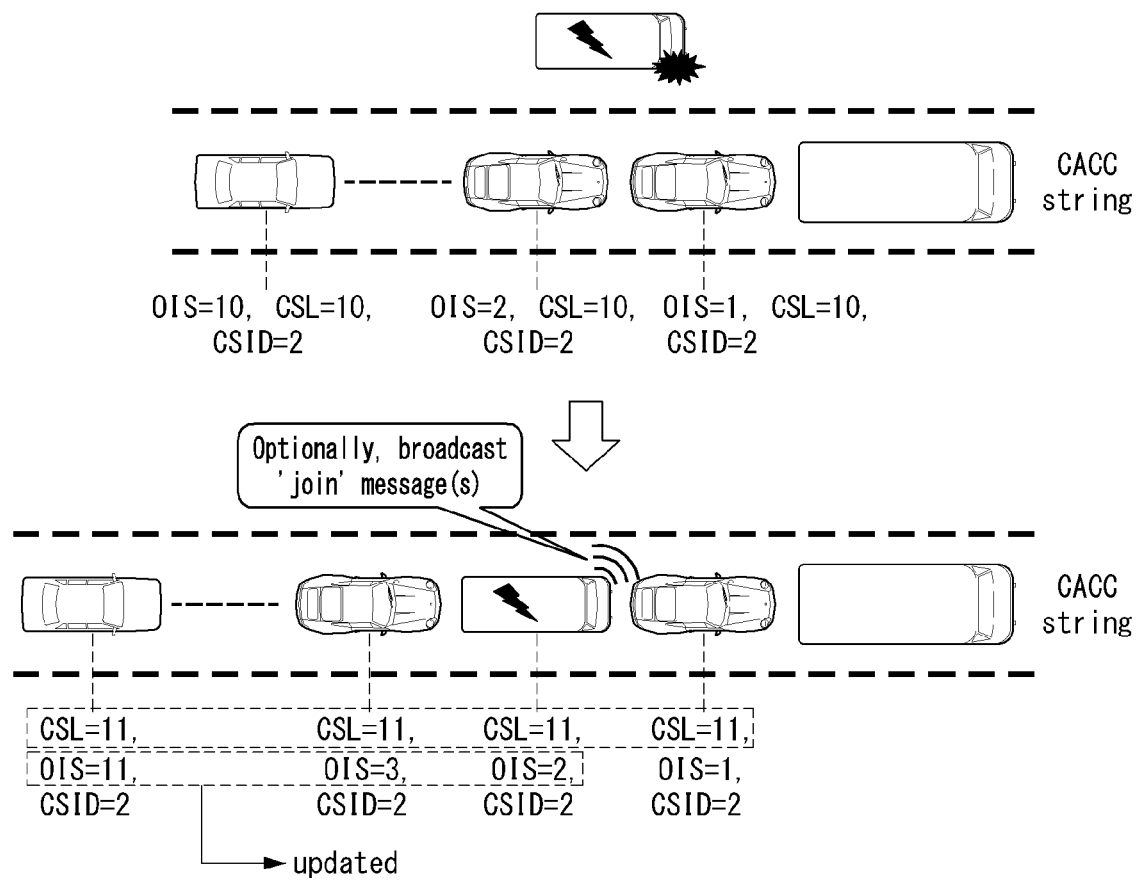
[FIG. 30]

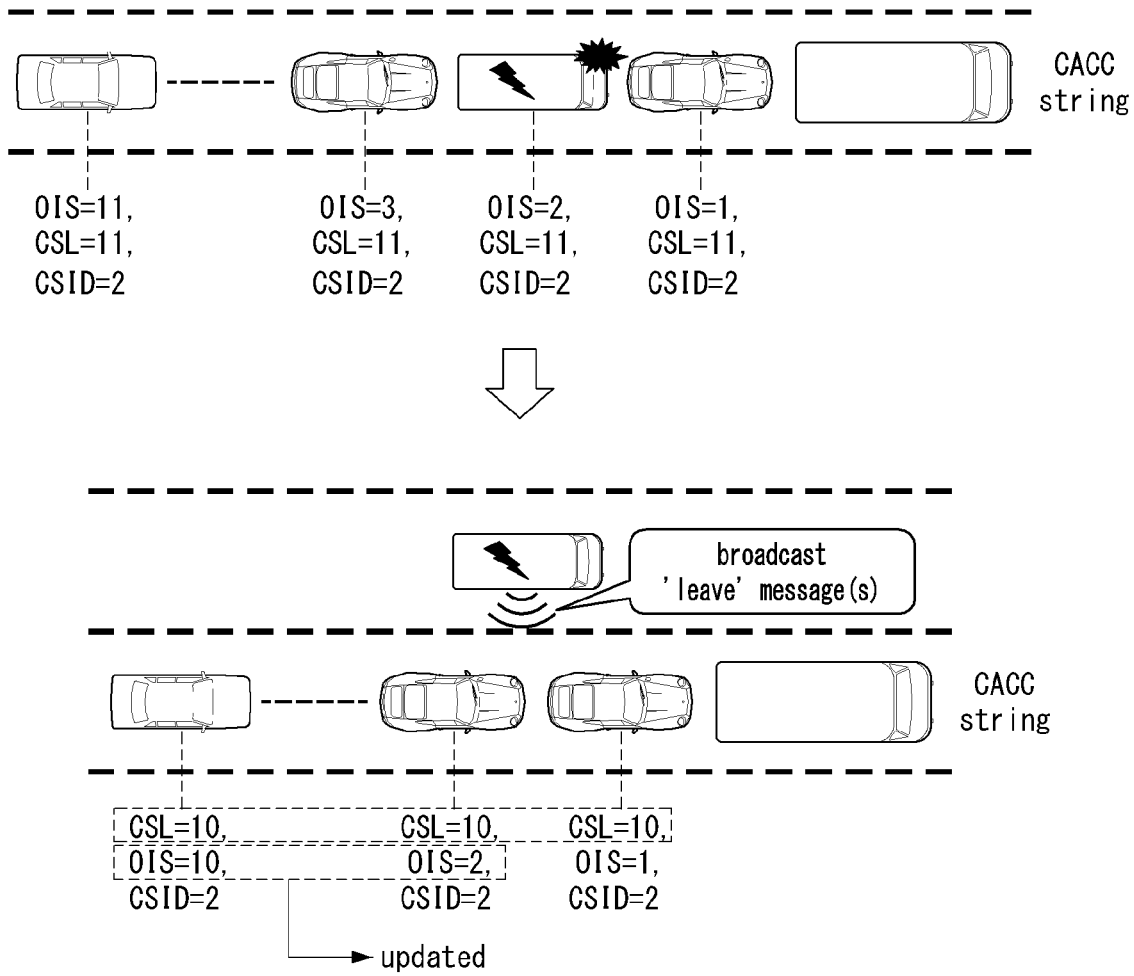

[FIG. 32]
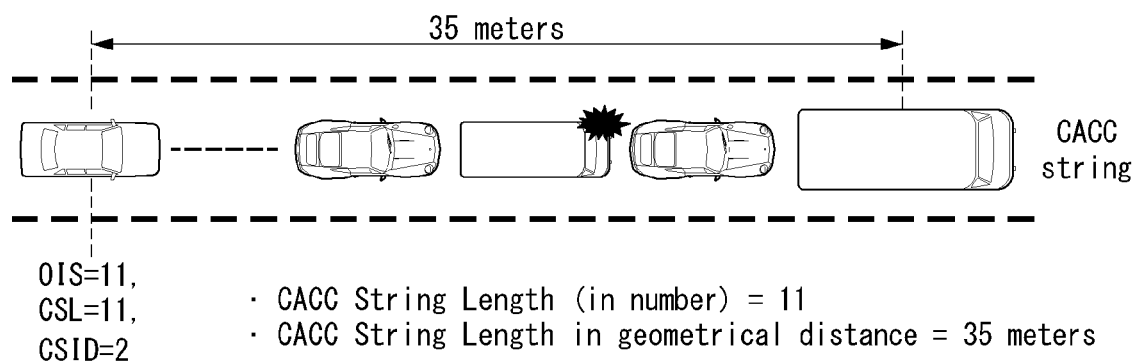

[FIG. 33]
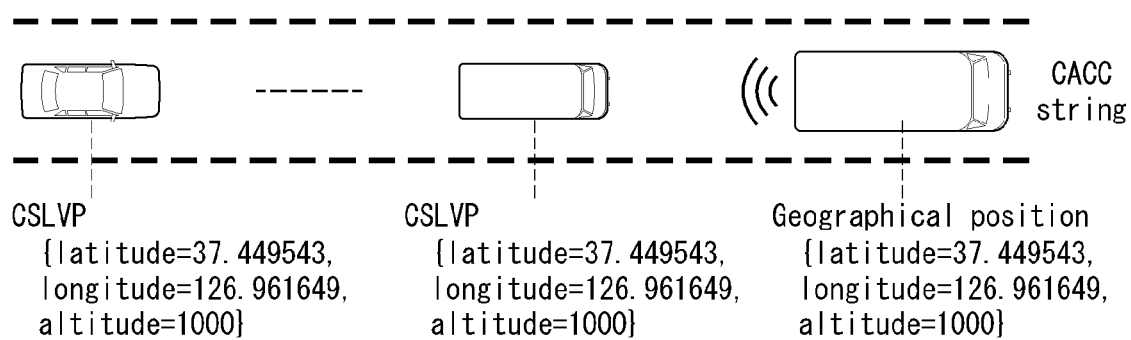

[FIG. 34]
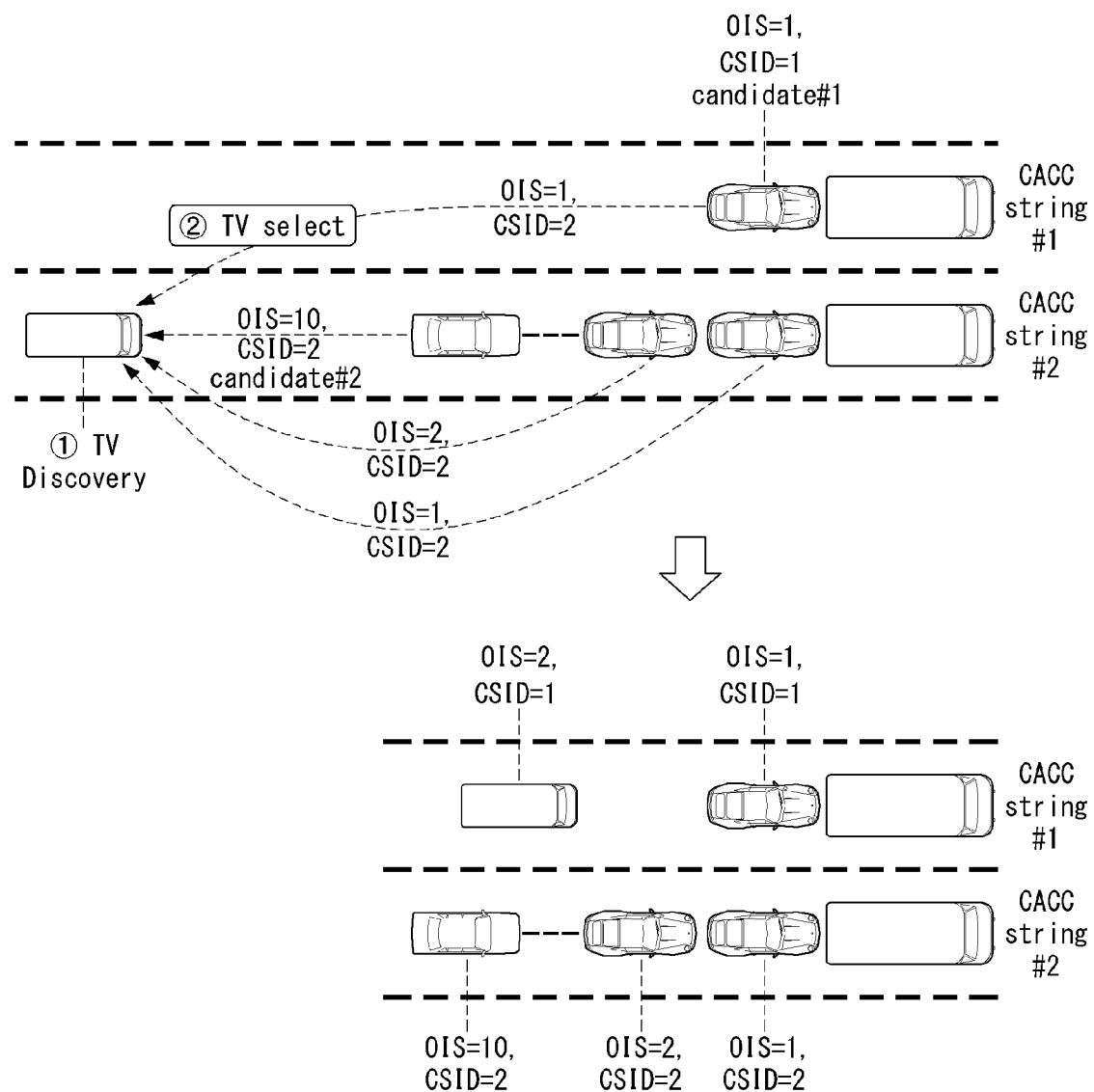

[FIG. 35]
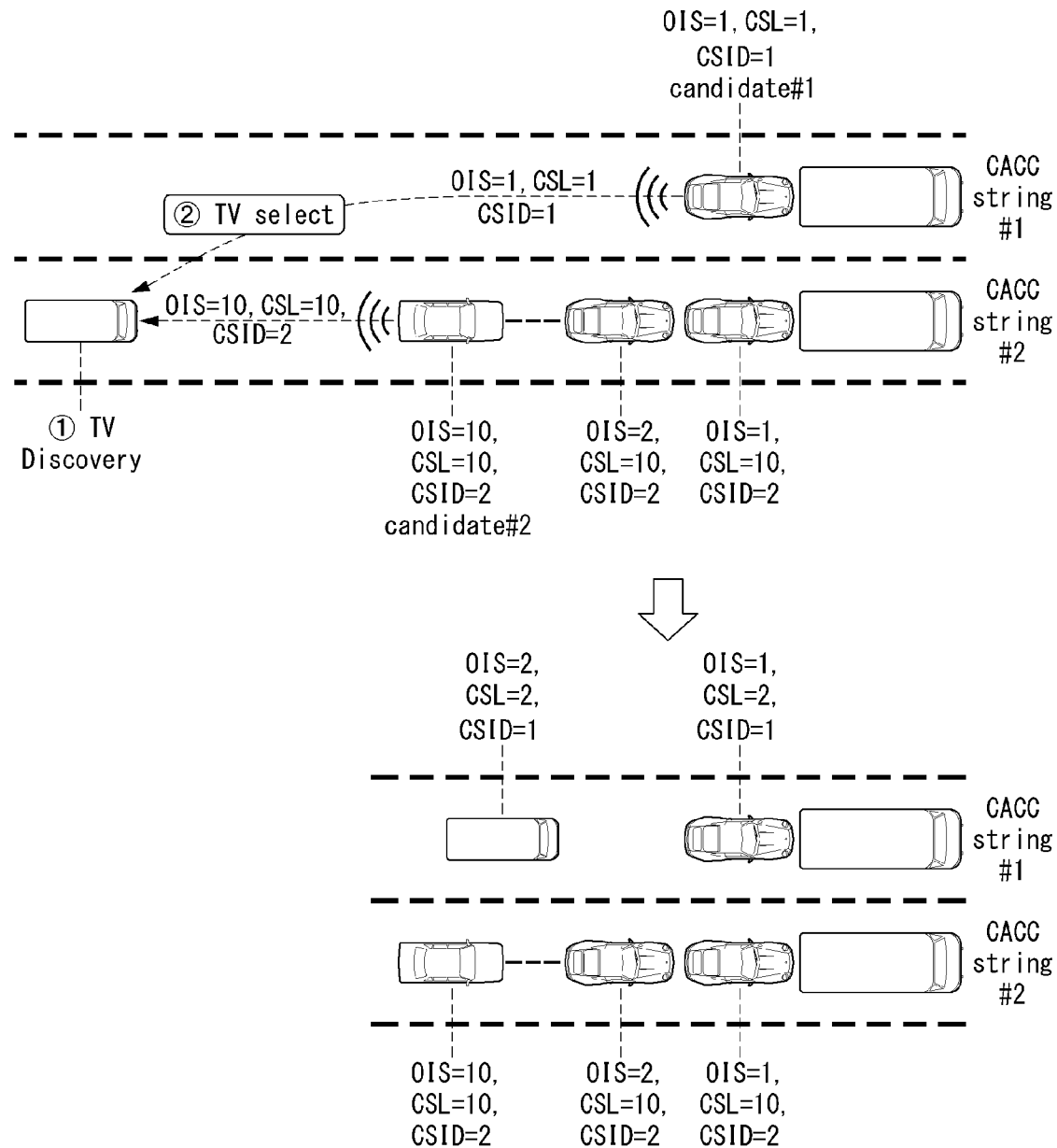

[FIG. 36]
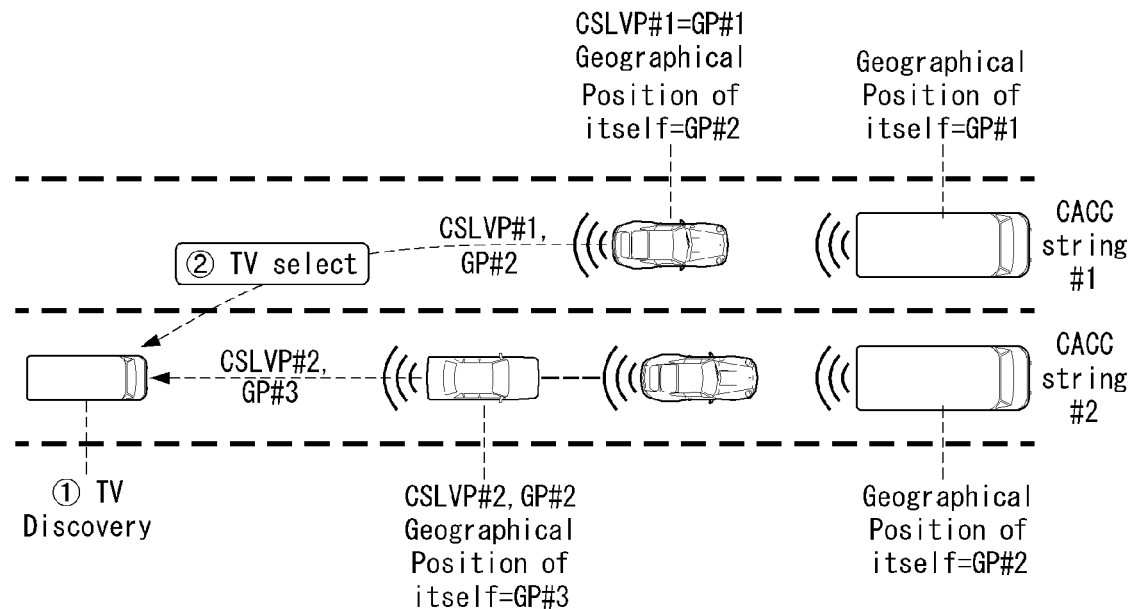
Estimation of the lengths of strings in geometrical distance
· Lengths of string#1 = distance between CSLVP#1 and GP#2
· Lengths of string#2 = distance between CSLVP#2 and GP#3
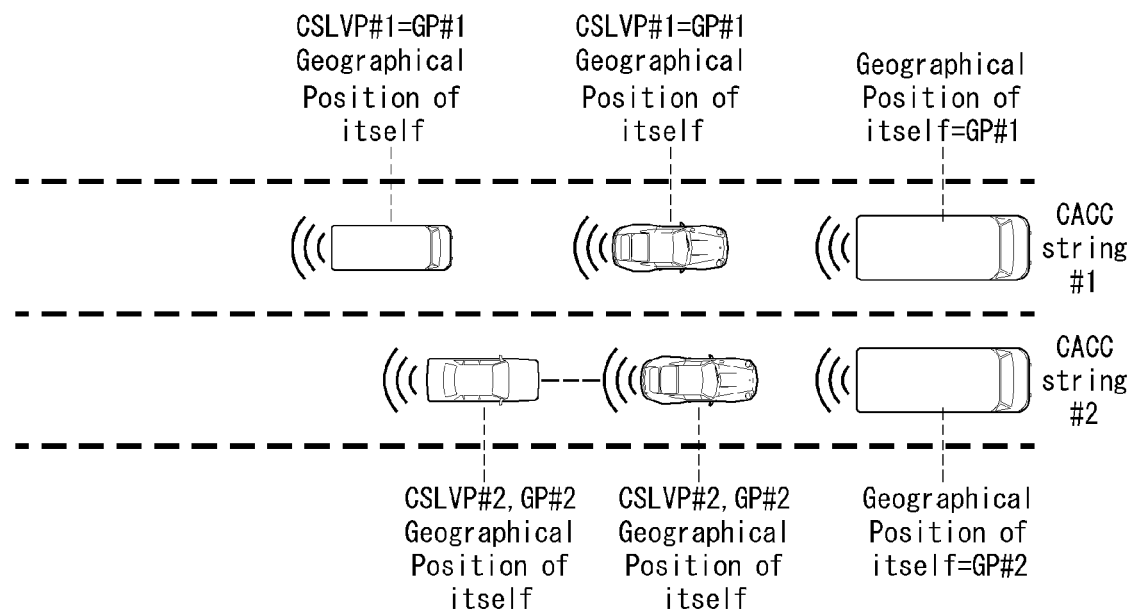

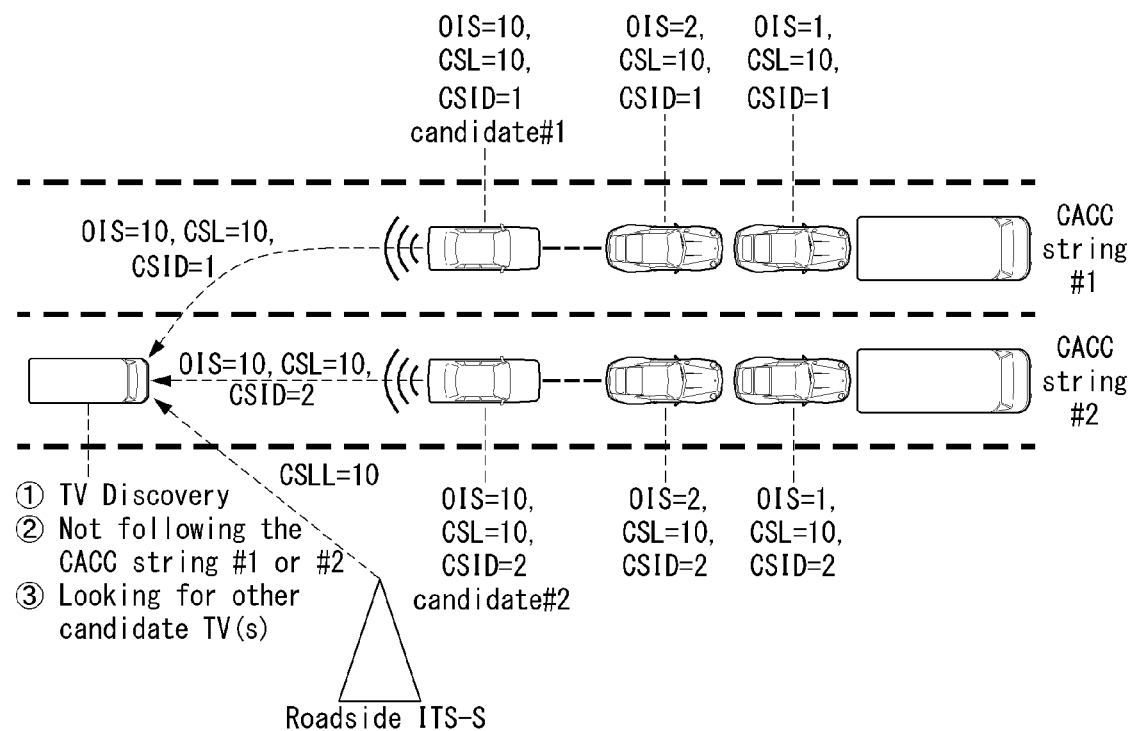
[FIG. 37]

[FIG. 38]
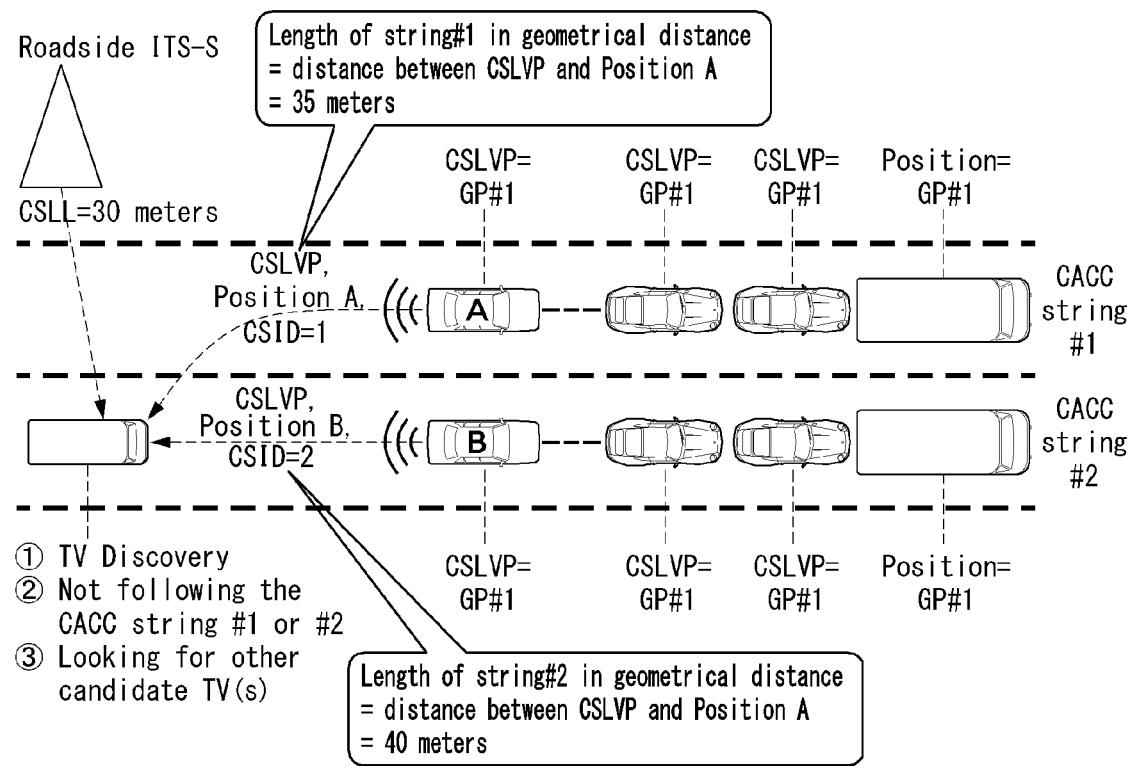

[FIG. 39]
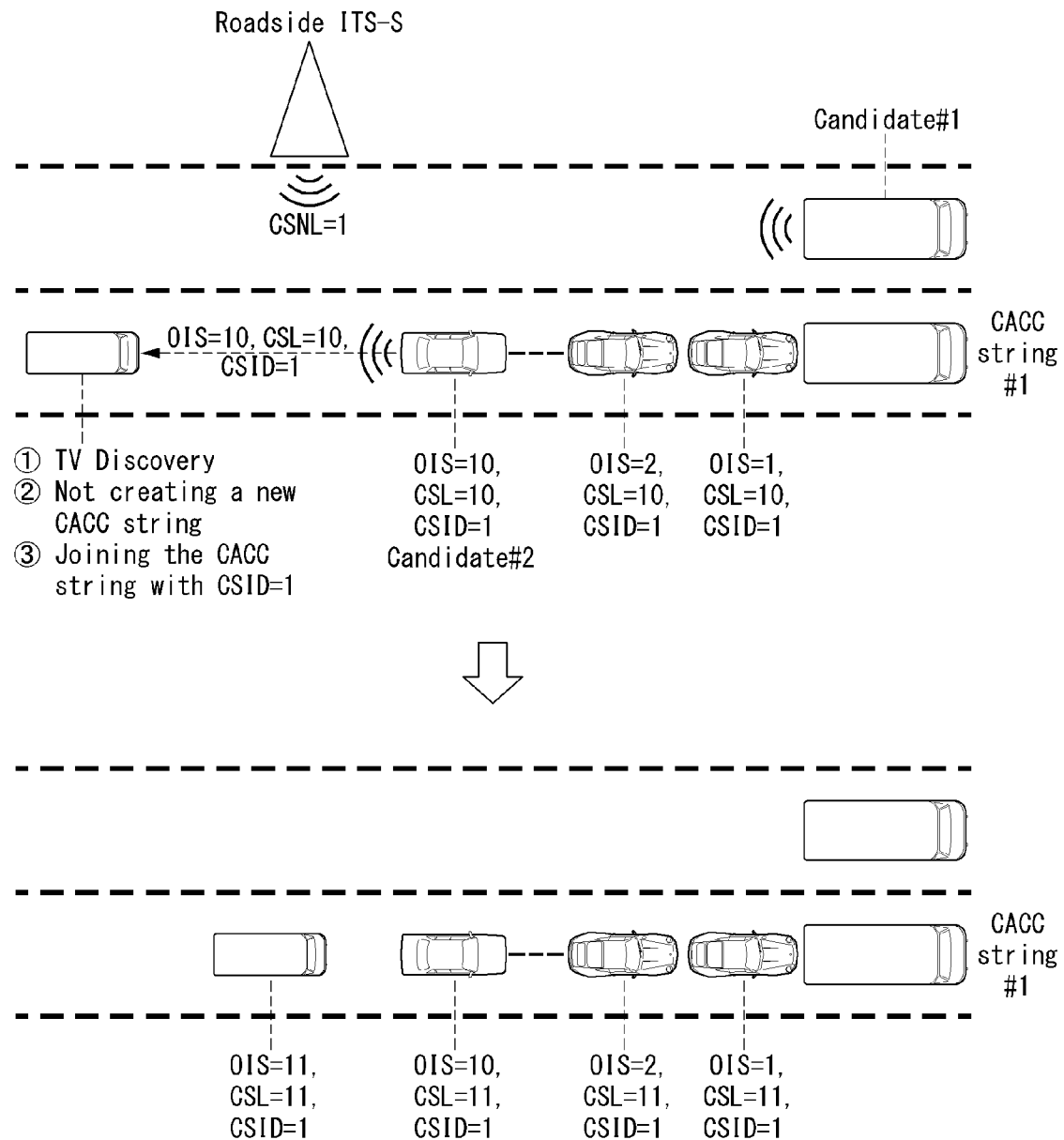

[FIG. 40]
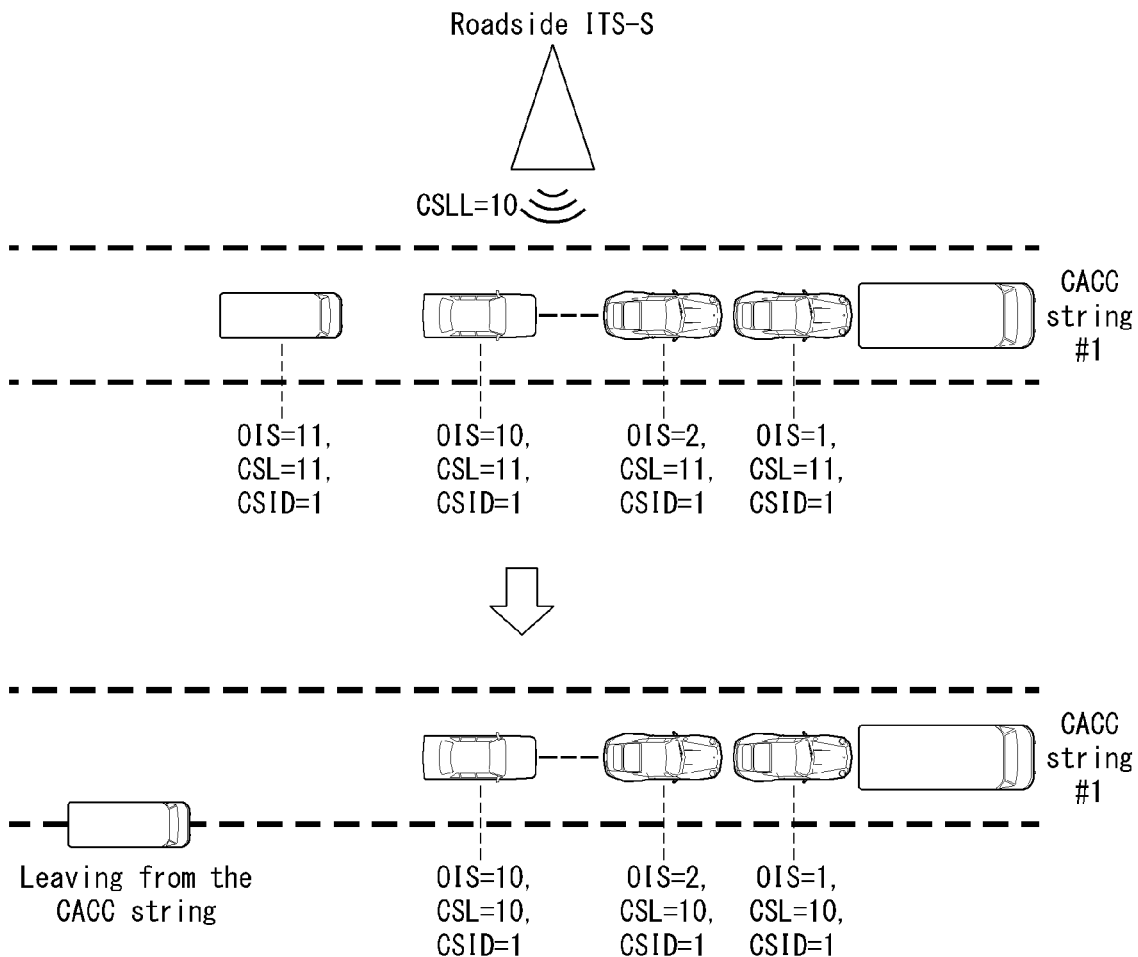

[FIG. 41]
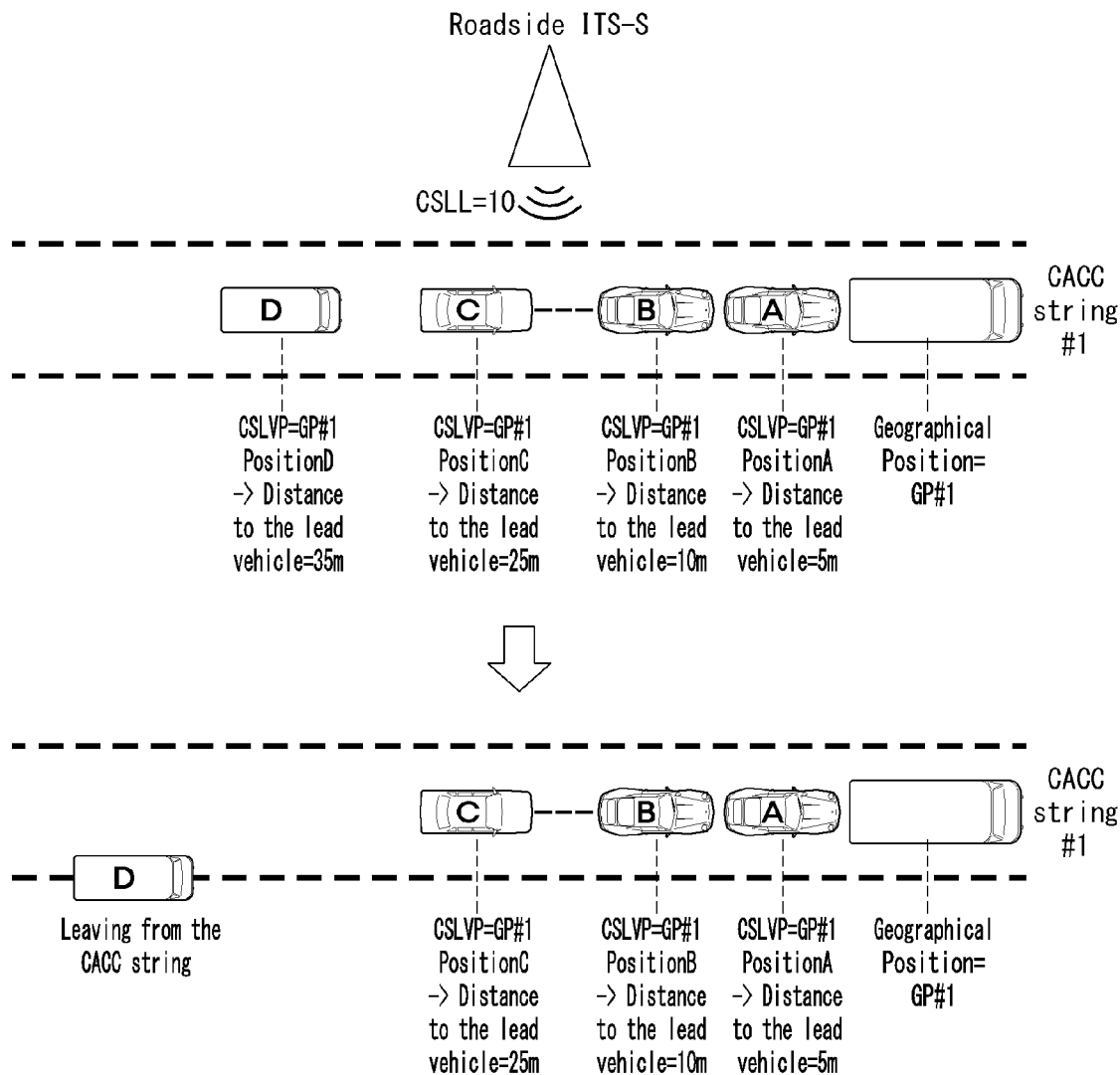

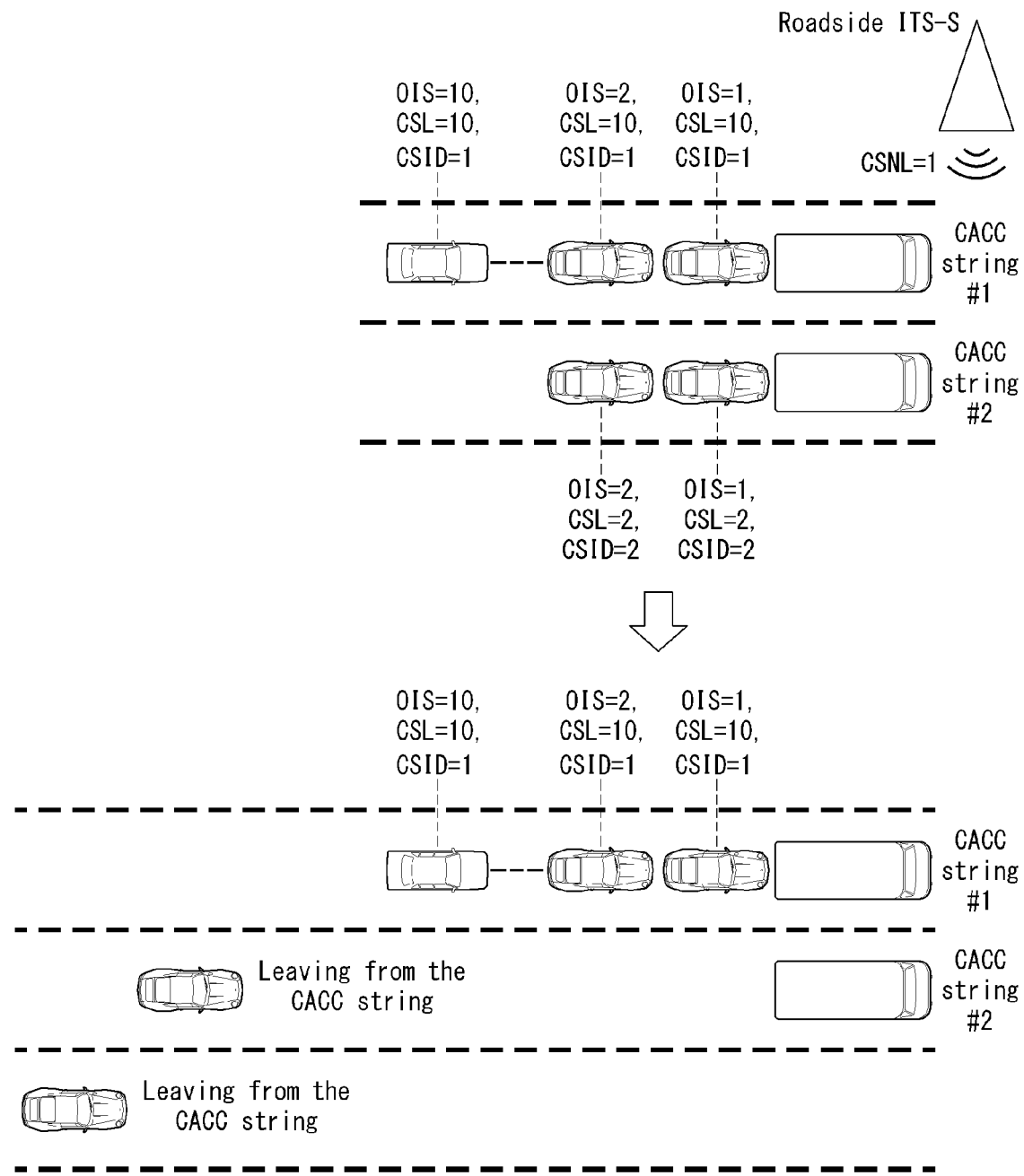
[FIG. 42]

[FIG. 43]
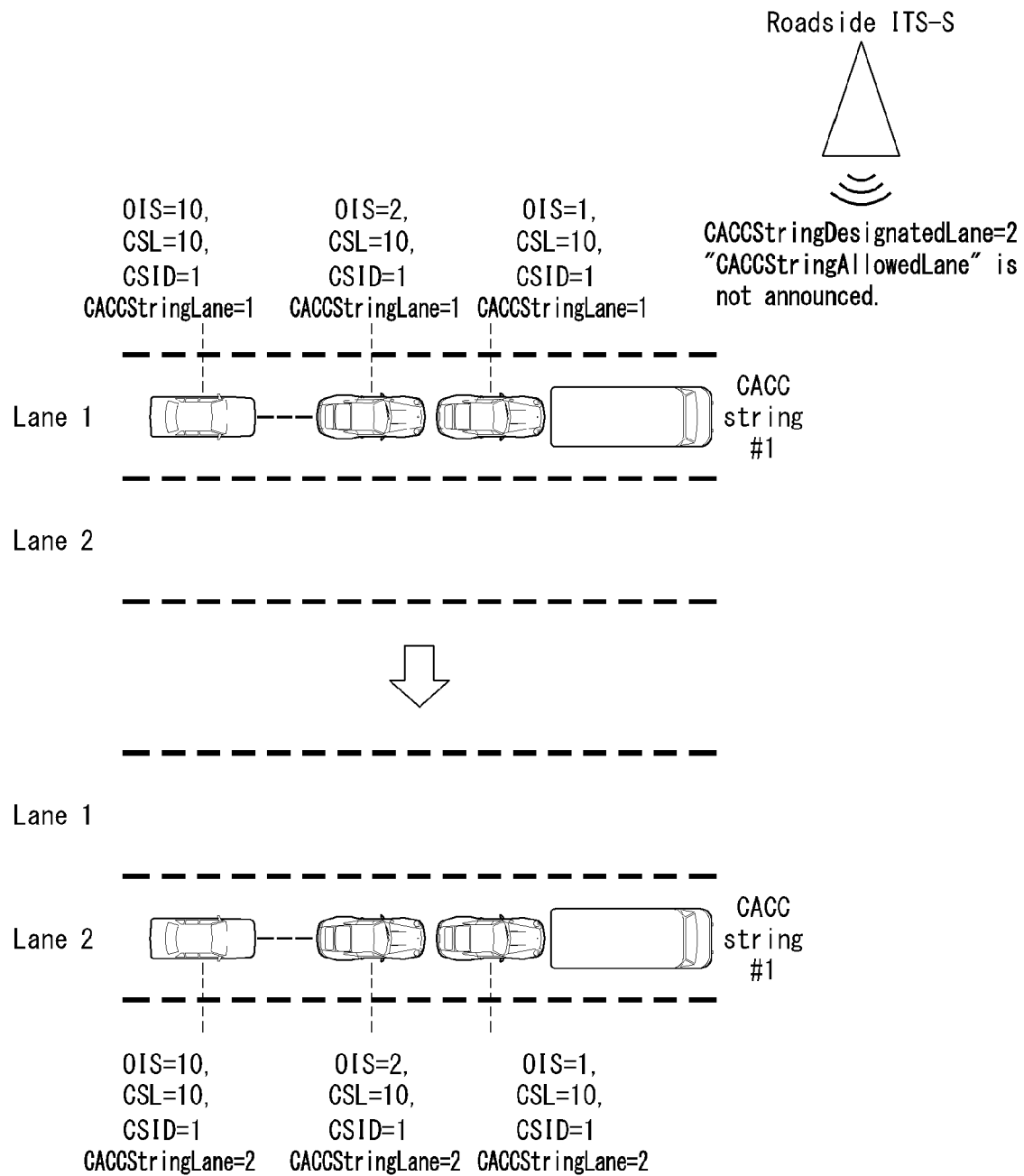

[FIG. 44]
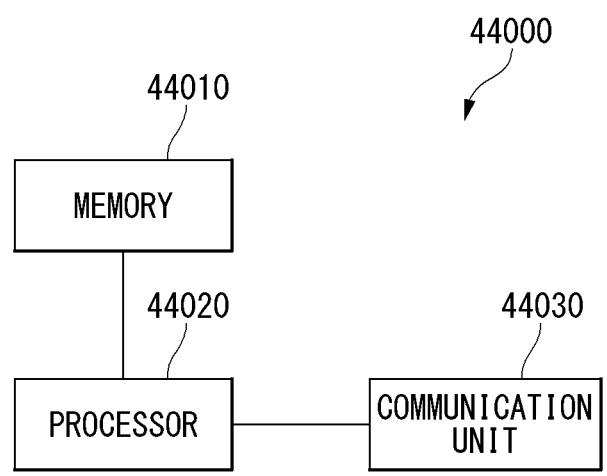

[FIG. 45]
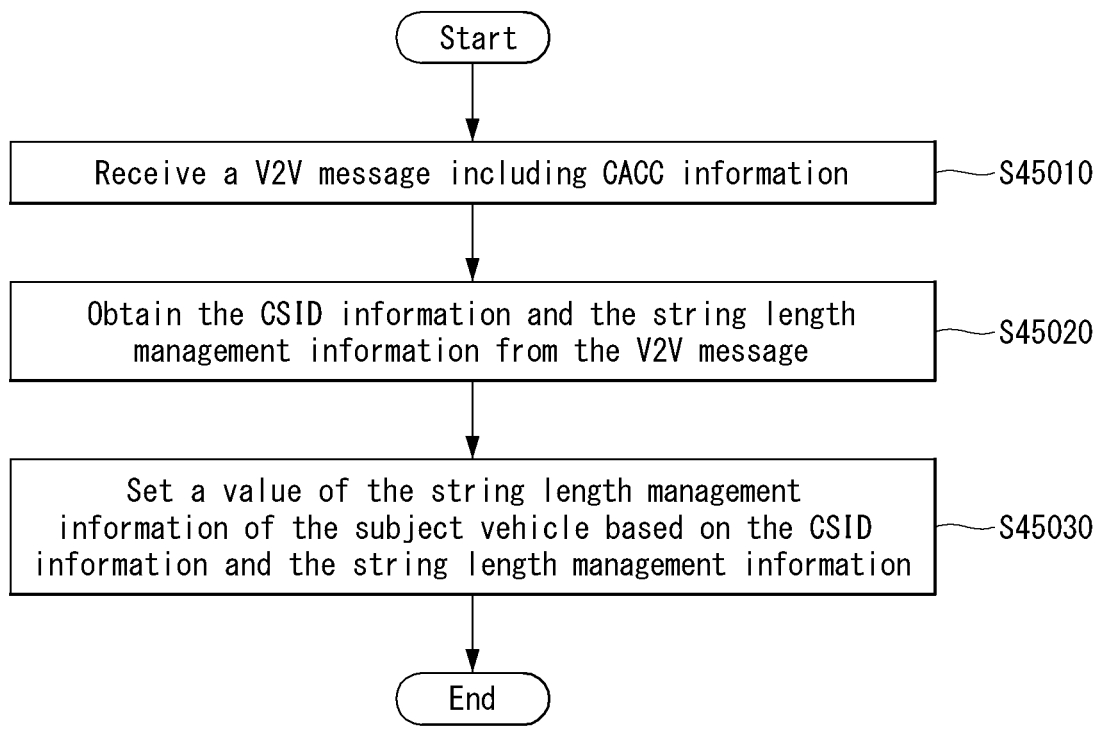

United States Patent US 11,304,036 B2

V2X COMMUNICATION APPARATUS AND METHOD FOR TRANSMITTING AND RECEIVING V2X MESSAGE THEREFOR

CROSS REFERENCE TO RELATED APPLICATIONS

This application is the National Phase of PCT International Application No. PCT/KR2017/015759, filed on Dec. 29, 2017, which claims priority under 35 U.S.C. 119(e) to U.S. Provisional Application Nos. 62/475,825, 62/475,827, 62/475,829, all filed on Mar. 23, 2017, and 62/486,465, filed on Apr. 18, 2017, all of which are hereby expressly incorporated by reference into the present application.

TECHNICAL FIELD

The present invention relates to V2X communication apparatus and a method for transmitting and receiving a V2X message therefor, and more particularly, to a method for receiving a V2X message including information related to Cooperative Adaptive Cruise Control (CACC), and providing a CACC service based on the information included in the message.

BACKGROUND ART

In recent years, vehicles have become a result of complex industrial technology, which is a fusion of electric, electronic, and communication technologies, centering on mechanical engineering and the vehicle is also called a smart car in such an aspect. Smart cars have been providing various customized mobile services as well as traditional vehicle technology such as traffic safety/complicatedness by connecting drivers, vehicles, and transportation infrastructures. The connectivity may be implemented using vehicle to everything (V2X) communication technology.

DISCLOSURE

Technical Problem

Various services can be provided through V2X communication. For example, with the goal of a contribution of traffic safety and mobility improvement, a service related to automatic and connected driving can be provided. One of the services is the CACC service, and the CACC technique is a technique that forms a CACC pair or a CACC string and maintains safety time gap between vehicles to the minimum value for traffic efficiency improvement and fuel consumption decrease.

However, in a certain environment or situation, the CACC may exert negative influence on a lane capacity or induce traffic congestion. Accordingly, a method is required for smoothing traffic flow while providing the CACC service. For example, a consideration is required for a method for managing a CACC stream efficiently.

Technical Solution

In order to solve the technical problem, a Vehicle to everything (V2X) communication apparatus and a V2X message reception method of the V2X communication apparatus is disclosed.

According to an embodiment of the present invention, a method for receiving a Vehicle to everything (V2X) message by a V2X communication apparatus of a subject vehicle includes receiving a V2V message including Cooperative Adaptive Cruise Control (CACC) information from at least one CACC vehicle, and the CACC information includes CACC String ID (CSID) information for identifying a CACC string to which the CACC vehicle is belonged and string length management information used for managing a string length of the CACC string; obtaining the CSID information and the string length management information from the V2V message; and setting a value of the string length management information of the subject vehicle based on the CSID information and the string length management information, and the string length management information includes at least one of Order In String (OIS) information indicating a current order of the CACC vehicle in the CACC string or CACC String Length (CSL) information indicating a length of the CASS string.

According to another aspect of the present invention, a V2X communication apparatus of a subject vehicle includes a memory configured to store data; a communication unit configured to transmit and receive a radio signal; and a processor configured to control the communication unit, and the V2X communication apparatus is configured to perform: receiving a V2V message including Cooperative Adaptive Cruise Control (CACC) information from at least one CACC vehicle, and the CACC information includes CACC String ID (CSID) information for identifying a CACC string to which the CACC vehicle is belonged and string length management information used for managing a string length of the CACC string; obtaining the CSID information and the string length management information from the V2V message; and setting a value of the string length management information of the subject vehicle based on the CSID information and the string length management information, and the string length management information includes at least one of Order In String (OIS) information indicating a current order of the CACC vehicle in the CACC string or CACC String Length (CSL) information indicating a length of the CASS string.

Technical Effects

The CACC protocol of the present invention includes a CACC dedicated facility layer entity, and it is available to process a received message, not going through a CACC application. Accordingly, unnecessary reception processing can be reduced, and accordingly, a CACC service can be provided with low delay time.

Through transmission/reception of a V2X message including CACC string ID information, a V2X communication apparatus may recognize a CACC string to which a vehicle transmitting a message is belonged.

Through transmission/reception of a V2X message including information related to an order in string, a V2X communication apparatus may estimate a length of a CACC string, and set an order in its own CACC string. Through this, a length of a CACC string may be efficiently managed.

Through transmission/reception of a V2X message including CACC string length information, a V2X communication apparatus may check directly a length of a CACC string to be joined newly. Through this, a length of a CACC string may be efficiently managed.

Through transmission/reception of a V2X message including CACC string length restriction information, a V2X communication apparatus may restrict a length of a CACC string appropriately. Through this, an occurrence of traffic congestion according to providing of a CACC service may be alleviated.

DESCRIPTION OF DRAWINGS

The accompanying drawings, which are included to provide a further understanding of the present invention and are incorporated in and constitute a part of this application, illustrate embodiments of the present invention together with the detailed description serving to describe the principle of the present invention.

FIG. 1 illustrates an intelligent transport system (ITS) according to an embodiment of the present invention.

FIG. 2 illustrates a V2X transmission/reception system according to an embodiment of the present invention.

FIG. 3 illustrates a configuration of a V2X system according to an embodiment of the present invention.

FIG. 4 illustrates a packet structure of a network/transport layer according to an embodiment of the present invention.

FIG. 5 illustrates a configuration of a V2X system according to another embodiment of the present invention.

FIG. 6 illustrates a WSMP packet configuration according to an embodiment of the present invention.

FIG. 7 illustrates a conceptual internal architecture of an MAC sublayer performing a multi-channel operation (MCO) according to an embodiment of the present invention.

FIG. 8 illustrates a relationship between a user priority of EDCA and access category (AC) according to an embodiment of the present invention.

FIG. 9 illustrates a physical layer configuration of a V2X transmitting apparatus according to an embodiment of the present invention.

FIG. 10 illustrates the CACC Protocol Architecture including a common facility according to an embodiment of the present invention.

FIG. 11 illustrates the CACC Protocol Architecture including a CACC dedicated facility according to an embodiment of the present invention.

FIG. 12 illustrates a CACC state transition model according to an embodiment of the present invention.

FIG. 13 illustrates a CACC operation flow of a V2X communication apparatus including a common facility according to an embodiment of the present invention.

FIG. 14 illustrates a CACC operation flow of a V2X communication apparatus including a common facility according to another embodiment of the present invention.

FIG. 15 illustrates a CACC operation flow of a V2X communication apparatus including a common facility according to another embodiment of the present invention.

FIG. 16 illustrates a CACC operation flow of a V2X communication apparatus including a common facility according to another embodiment of the present invention.

FIG. 17 illustrates a CACC operation flow of a V2X communication apparatus including a CACC dedicated facility according to an embodiment of the present invention.

FIG. 18 illustrates a CACC operation flow of a V2X communication apparatus including a CACC dedicated facility according to another embodiment of the present invention.

FIG. 19 illustrates a CACC operation flow of a V2X communication apparatus including a CACC dedicated facility according to another embodiment of the present invention.

FIG. 20 illustrates a CACC operation flow of a V2X communication apparatus including a dedicated facility according to another embodiment of the present invention.

FIG. 21 illustrates a method for determining an OIS value of a vehicle newly joining at an end of a CACC string according to an embodiment of the present invention.

FIG. 22 illustrates a method for determining an OIS value of a vehicle newly joining at a middle of a CACC string according to an embodiment of the present invention.

FIG. 23 illustrates a method for determining an OIS value of a vehicle leaving from a middle of a CACC string according to an embodiment of the present invention.

FIG. 24 illustrates a method for determining a CSL value of a vehicle newly joining at an end of a CACC string according to an embodiment of the present invention.

FIG. 25 illustrates a method for determining a CSL value of a vehicle leaving from an end of a CACC string according to an embodiment of the present invention.

FIG. 26 illustrates a method for determining a CSL value of a vehicle newly joining at a middle of a CACC string according to an embodiment of the present invention.

FIG. 27 illustrates a method for determining an OIS value of a vehicle leaving from a middle of a CACC string according to an embodiment of the present invention.

FIG. 28 illustrates a method for determining an OIS value and a CSL value of a newly joining vehicle at an end of a CACC string according to an embodiment of the present invention.

FIG. 29 illustrates a method for determining an OIS value and a CSL value of a vehicle leaving from an end of a CACC string according to an embodiment of the present invention.

FIG. 30 illustrates a method for determining an OIS value and a CSL value of a vehicle newly joining at a middle of a CACC string according to an embodiment of the present invention.

FIG. 31 illustrates a method for determining an OIS value and a CSL value of a vehicle leaving from a middle of a CACC string according to an embodiment of the present invention.

FIG. 32 illustrates a method of indicating a CACC string length with the number of vehicles or a geometrical distance according to an embodiment of the present invention.

FIG. 33 illustrates a method of sharing CSLVP information for a geometrical distance according to an embodiment of the present invention.

FIG. 34 illustrates a method for a subject vehicle to discover and select a target vehicle in a plurality of target candidate vehicles based on OIS information according to an embodiment of the present invention.

FIG. 35 illustrates a method for a subject vehicle to discover and select a target vehicle in a plurality of target candidate vehicles based on OIS information and CSL information according to an embodiment of the present invention.

FIG. 36 illustrates a method for a subject vehicle to discover and select a target vehicle in a plurality of target candidate vehicles based on CSLVP information according to an embodiment of the present invention.

FIG. 37 illustrates a method for a subject vehicle to select a CACC string based on CACC string length (CSLL) information according to an embodiment of the present invention.

FIG. 38 illustrates a method for a subject vehicle to select a CACC string based on CACC string length (CSLL) information according to another embodiment of the present invention.

FIG. 39 illustrates a method for a subject vehicle to select a CACC string based on CACC string number limit (CSNL) information according to an embodiment of the present invention.

FIG. 40 illustrates a method for a subject vehicle to determine whether to leave a CACC string using CACC string length (CSLL) information according to an embodiment of the present invention.

FIG. 41 illustrates a method for a subject vehicle to determine whether to leave a CACC string using CACC string length (CSLL) information according to another embodiment of the present invention.

FIG. 42 illustrates a method for a subject vehicle to determine whether to leave a CACC string using CACC string number limit (CSNL) information according to an embodiment of the present invention.

FIG. 43 illustrates a method for a subject vehicle to change a CACC string lane using CACC string lane information according to an embodiment of the present invention.

FIG. 44 illustrates a V2X communication apparatus according to an embodiment of the present invention.

FIG. 45 illustrates a method for a V2X communication apparatus to receive a V2X message according to an embodiment.

BEST MODE FOR INVENTION

Preferred embodiments of the present invention are described in detail and examples thereof are illustrated in the accompanying drawings. The following detailed description with reference to the accompanying drawings is intended to illustrate the preferred embodiments of the present invention rather than merely illustrating embodiments that may be implemented according to embodiments of the present invention. The following detailed description includes details in order to provide a thorough understanding of the present invention, but the present invention does not require all of these details. In the present invention, respective embodiments described below need not be particularly used separately. Multiple embodiments or all embodiments may be together used and specific embodiments may be used as a combination.

Most of the terms used in the present invention are selected from the general ones that are widely used in the field, but some terms are arbitrarily selected by the applicant and the meaning thereof will be described in detail in the following description as necessary. Accordingly, the invention should be understood based on the intended meaning of the term rather than the mere name or meaning of the term.

The present invention relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The OBU may also be referred to as on a board equipment (OBE). The V2X apparatus may correspond to a road side unit (RSU) of the infrastructure or may be included in the RSU. The RSU may also be referred to as a road side equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus.

FIG. 1 illustrates an intelligent transport system (ITS) according to an embodiment of the present invention.

The intelligent transport system means a system that provides an efficient and safe transport service by applying information and communication technology such as an electronic control and communication device to transportation means such as automobiles, buses, trains, or the like and transportation facilities including traffic lights, an electronic display board, and the like. In order to support the ITS, vehicle to everything (V2X) technology may be used. V2X communication technology represents communication technology between vehicles or between the vehicle and a peripheral device.

A vehicle that supports V2X communication is equipped with the OBU and the OBU includes a dedicated short-range communication (DSRC) communication modem. An infrastructure including a V2X module installed around a road, such as the traffic light, may be referred to as an RSU. Vulnerable road users (VRUs) are transportation weakness and pedestrians, bicycles, wheelchairs, etc. may correspond to the VRUs. The VRU may perform V2X communication.

Vehicle to vehicle (V2V) refers to inter-vehicle communication or communication technology including a V2X communication apparatus. Vehicle to infra-structure (V2I) refers to communication or communication technology between the vehicle and an infra-structure including the V2X communication apparatus. Besides, communication between the vehicle and the transportation weakness may refer to V20 and communication between the infra-structure and the transportation weakness may refer to 120.

FIG. 2 illustrates a V2X transmission/reception system according to an embodiment of the present invention.

A V2X transmission/reception system includes a V2X transmitter 2100 and a V2X receiver 2200 and the transmitter and the receiver are distinguished from each other according to roles of transmitting and receiving data and are not different from each other in a configuration of a device. The V2X transmitter 2100 and the V2X receiver 2200 are both the V2X communication apparatuses.

The V2X transmitter 2100 includes a Global Navigation Satellite System (GNSS) receiver 2110, a DSRC radio 2120, a DSRC device processor 2130, an application Electronic Control Unit (ECU) 2140, a sensor 2150, and a human interface 2160.

The DSRC radio 2120 may perform communications based on the IEEE 802.11 standard based on a Wireless Local Area Network (WLAN) and/or the Wireless Access in Vehicular Environments (WAVE) standard of the Society of Automotive Engineers (SAE). The DSRC radio 2120 may perform operations of a physical layer and an MAC layer.

The DSRC device processor 2130 may decode a message received by the DSRC radio 2120 or decode a message to be transmitted. The GNSS receiver 2110 may process GNSS and acquire positional information and temporal information. As an example, the GNSS receiver 2110 may become a Global Positioning System (GPS) device.

The application ECU 2140 may be a microprocessor for providing a specific application service. The application ECU may generate an operation/message based on sensor information and a user input in order to provide a service and transmit/receive the message by using the DSRC device processor. The sensor 2150 may obtain vehicle status and ambient sensor information. The human interface 2160 may receive a user's input or display/provide the message through an interface such as an input button or a monitor.

The V2X receiver 2200 includes a Global Navigation Satellite System (GNSS) receiver 2210, a DSRC radio 2220, a DSRC device processor 2230, an application Electronic Control Unit (ECU) 2240, a sensor 2250, and a human interface 2260. The aforementioned description of the configuration of the V2X transmitter 2100 is applied to the configuration of the V2X receiver 2200.

The DSRC radio and the DSRC device processor correspond to one embodiment of a communication unit. The communication unit may perform communication based on cellular communication technology such as 3GPP and Long Term Evolution (LTE).

FIG. 3 illustrates a configuration of a V2X system according to an embodiment of the present invention.

As an embodiment, the V2X system of FIG. 3 may correspond to an ITS station reference architecture defined in ISO 21217/EN302 665. In FIG. 3, the ITS station illustrates an example of an ITS station based on a reference architecture. FIG. 3 illustrates a hierarchical architecture for end-to-end communication. When a vehicle-to-vehicle message is communicated, the message is passed through each layer one layer down in a transmitting vehicle/ITS system and the message is delivered to an upper layer one layer up in a receiving vehicle/ITS system. The description of each layer is as follows.

Application layer: The application layer may implement and support various use cases. For example, an application may provide road safety, efficient traffic information, and other application information.

The application layer may classify and define the ITS application and provide an end vehicle/user/infra-structure through the lower layer. The application may be defined/applied for each user case or the use-case may be grouped and defined/applied like the road safety, traffic efficiency, a local service, and infotainment. As an embodiment, application classification, the use-case, and the like may be updated when a new application scenario is generated. Layer management may manage and serve information related to an operation and a security of the application layer. The information and the service may be bidirectionally delivered and shared through an interface between MAMA (management entity and application layer and SA (interface between security entity and ITS-S applications) or service access point (SAP) (e.g., MA-SAP and SA-SAP). A request from the application layer to a facility layer or information delivery from the facility layer to the application layer may be performed through FA (interface between facilities layer and ITS-S applications) (or FA-SAP).

Facilities layer: The facility layer may support various use-cases defined in the application layer so as to effectively implement various use-cases. For example, the facility layer may perform application support, information support, and session/communication support.

The facility layer may basically support functions of a session layer, a presentation layer, and an application layer which are top three layers. The facility layer may additionally provide evolved facilities such as the application support, the information support, and the session/communication support for the ITS system. The facility means a component that provides functionality, information, and data.

The facilities may be classified into a common facility and a domain facility. The common facility may provide a core service or function required for a basic application set of the ITS and an operation of the ITS station. For example, time management, position management, service management, and the like may be provided. The domain facility may provide a special service or function to the basic application set of one or plural ITSs. For example, the domain facility may provide DEcentralized Notification Messages (DENM) management for Road Hazard Warning applications (RHW). When the domain facility as an optional function is not supported by the ITS station, the domain facility may not be used.

Networking & Transport layer: The network/transport layer may configure a network for vehicle communication between homogeneous/heterogeneous networks by using various transport protocols and network protocols. For example, the networking/transport layer may provide Internet connection and routing using an Internet protocol such as TCP/UDP+IPv6 or the like. Alternatively, the networking/transport layer may configure a vehicle network by using a geographical position based protocol such as a basic transport protocol (BTP)/geonetworking.

The transport layer corresponds to a connection layer between services providing upper layers (session layer, presentation layer, and application layer) and lower layers (network layer, data link layer, and physical layer). The transport layer serves to manage data sent by a user to accurately arrive at a destination. At a transmitting side, the transport layer may serve to split data into packets having an appropriate size for transmission for efficient data transmission. At a receiving side, the transport layer may serve to recombine the received packets into an original file. As an embodiment, the transport protocol may adopt TCP/UDP and a transport protocol for ITS such as VTS may be used.

The network layer may allocate a logical address and decide a packet transfer path. The network layer may receive a packet generated by the transport layer and add a network header including the logical address of the destination. As an example of a packet path design, unicast/broadcast may be considered between the vehicles, between the vehicle and a fixation station, and between fixation stations. As an embodiment, as the network protocol for the ITS, a protocol such as geo-networking, IPv6 networking with mobility support, IPv6 over geo-networking, or the like may be considered.

Access layer: The access layer may transmit messages/data received by the upper layer through a physical channel. For example, the access layer may perform/support data communication based on IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/ATSC, GPS technology, IEEE 1609 WAVE technology, and the like.

The ITS system for vehicle communication and networking may be organically designed in consideration of various access technologies, network protocols, and communication interfaces for providing various use-cases. Further, the role and the function of each layer may be enhanced or reinforced.

FIG. 4 illustrates a packet structure of a network/transport layer according to an embodiment of the present invention.

FIG. 4 illustrates a packet structure of the network/transport layer, and the transport layer may generate a BTP packet and the network layer may generate a geo-networking packet. The geo-networking packet corresponds to data of a logical link control (LLC) packet to be included in the LLC packet. The geo-networking packet may be encapsulated into the LLC packet. In an embodiment of FIG. 4, the data may include a message set and the message set may become a basic safety message.

The BTP is a protocol for transmitting the message such as the CAM or DENM generated by the facility layer to the lower layer. The BTP header is constituted by A type and B type. An A type BTP header may include a destination port and a source port required for transmission/reception for interactive packet transmission. A B type BTP header may include the destination port and destination port information required for transmission for non-interactive packet transmission. The description of a field/information included in the header is as follows.

Destination port: The destination port identifies a facility entity corresponding to the destination of data (BTP-PDU) included in the BTP packet.

Source port: as a field generated in the case of BTP-A type, indicates a port of a protocol entity of the facility layer in a source in which the corresponding packet is transmitted. This field may have a size of 16 bits.

Destination port Information: as a field generated in the case of BTP-B type, may provide additional information when the destination port is a most well known port. This field may have the size of 16 bits.

The geo-networking packet includes a basic header and a common header according to the protocol of the network layer and optionally includes an extension header according to a geo-networking mode.

The basic header may be 32 bits (4 bytes). The basic header may include at least one of a version field, a next header (NH) field, a lifetime (LT) field, and a remaining hop limit (RHL) field. The description of the fields included in the basic header is as follows. A bit size configuring each field is just an embodiment and may be modified.

Version (4 bits): A version field indicates a version of the geo-networking protocol.

NH (4 bits): A next header (NH) field indicates a type of subsequent header/field. When a field value is 1, the common header may be followed and when the field value is 2, a secured packet in which the security is configured may be followed.

LT (8 bits): A lifetime (LT) field indicates a maximum survival time of the corresponding packet.

RHL (8 bits): A remaining hop limit (RHL) field indicates a remaining hop limit. An RHL field value may be reduced by one for each forwarding on a GeoAdhoc router. When the RHL field value is 0, the corresponding packet is not forwarded any longer.

The common header may be 64 bits (8 bytes). The common header may include at least one of a next header (NH) field, a header type (HT) field, a header sub-type (HST) field, a header sub-type (HST) field, a traffic class (TC) field, a flags field, a payload length (PL) field, and a maximum hop limit (MHL) field. The description of each of the fields is as follows.

NH (4 bits): The next header (NH) field indicates the type of subsequent header/field. When the field value is 0, the NH field may indicate "ANY" type which is not defined, when the field value is 1, the NH field may indicate a BTP-A type packet, when the field value is 2, the NH field may indicate a BTP-B type, and when the field value is 3, the NH field may indicate an IP diagram of IPv6.

HT (4 bits): The header type field indicates a geo-networking type. The geo-networking type includes Beacon, GeoUnicast, GeoAnycast, GeoBroadcast, Topologically-Scoped Broadcast (TSB), and Location Service (LS).

HST (4 bits): The header sub type field indicates a detailed type together with the header type. As an embodiment, when the HT type is set to the TSB, the HST may indicate a single hop for the HST value of '0' and a multi-hop for the HST value of '1'.

TC (8 bits): The traffic class field may include Store-Carry-Forward (SCF), channel offload, and TC ID. The SCF field indicates whether to store the packet when there is no neighbor to which the packet is to be transferred. The channel offload field indicates that the packet may be transferred to another channel in the case of a multi-channel operation. The TC ID field as a value allocated when transferring the packet in the facility layer may be used for setting a contention window value in the physical layer.

Flag (8 bits): The flag field indicates whether the ITS apparatus is mobile or stationary and as an embodiment, the flag field may become last 1 bit.

PL (8 bits): The payload length field indicates a data length subsequent to the geo-networking header in units of bytes. For example, in the case of the geo-networking packet that carries the CAM, the PL field may indicate the BTP header and the length of the CAM.

MHL (8 bits): The Maximum Hop Limit (MHL) field may indicate a maximum hopping number.

The LLC header is added to the geo-networking packet to generate the LLC packet. The LLC header provides a function to distinguish and transmit IP data from geo-networking data. The IP data and the geo-networking data may be distinguished by Ethertype of SNAP. As an embodiment, when the IP data is transmitted, the Ethertype may be set to 0x86DD and included in the LLC header. As an embodiment, when the geo-networking data is transmitted, the Ethertype may be set to 0x86DC and included in the LLC header. The receiver may verify the Ethertype field of the LLC packet header and forward and process the packet to an IP data path or a geo networking path according to the value.

FIG. 5 illustrates a configuration of a V2X system according to another embodiment of the present invention.

FIG. 5 illustrates a hierarchical architecture corresponding to another embodiment of the V2X system of FIG. 3. As an embodiment, the North American V2X system uses IEEE 802.11 PHY technology and MAC technology, and further may use the MAC technology of IEEE 1609.4. In the network/transport layer technology, the technology of the IEEE802.2 standard may be applied to an LLC block and the IEEE 1609.3 technology may be applied to a WAVE short message protocol (WSMP). The facility layer may use a message set of a J2735 standard of SAE and the application layer may use an application defined for V2V, V2I, and V2O in a J2945 standard.

The application layer may perform a function to implement and support the use-case. The application may be optionally used according to the use-case. A system requirement of each use-case may be defined in the J2945 standard. J2945/1 defines an application of V2V technology such as V2V safety communication.

A J2945/1 document defines applications including emergency electronic brake lights (EEBL), forward crash warning (FCW), blind spot warning (BSW), lane change warning (LCW), intersection movement assist (IMA), and control loss warning (CLW). As an embodiment, FCW technology is V2V safety communication technology that warns of a collision with a preceding vehicle. When a vehicle equipped with the V2X communication apparatus makes emergency stop or crashes, an FCW safety message may be transmitted in order to prevent a collision of a subsequent vehicle. The subsequent vehicle may receive FCW messages and alert a driver or perform such controls as speed deceleration or lane change. In particular, even when there is another vehicle between a stopped vehicle and a driving vehicle, it is possible to determine a state of the stopped through the FCW. The FCW safety message may include positional information (latitude, longitude, and lane) of the vehicle, vehicle information (vehicle type, length, direction, speed), and event information (stop, sudden stop, and slow down) and the information may be generated by the request of the facility layer.

The facility layer may correspond to OSI layer 5 (session layer), layer 6 (presentation layer), or layer 7 (application layer). The facility layer may generate the message set according to a situation in order to support the application. The message set may be defined in the J2735 standard and described/decoded through ASN.1. The message set may include a BasicSafetyMessage message, a MapData message, an SPAT message, CommonSafetyRequest message, an EmergencyVehicleAlert message, an IntersectionCollision message, a ProbeVehicleData message, a RoadSideAlert message, and a PersonalSafetyMessag message.

The facility layer collects the information to be transmitted from the upper layer to generate the message set. The message set may be displayed in an Abstract Syntax Notation 1 (ASN.1) scheme. The ASN.1 as a notation used to describe the data structure may also set an encoding/decoding rule. The ASN.1 does not depend on specific devices, a data representation scheme, programming languages, hardware platforms, and so on. The ASN.1 as a language for describing data regardless of platform is a joint standard between Consultative Committee on International Telegraphy and Telephony (CCITT) X.208 and International Organization for Standardization, (ISO) 8824.

The message set as a collection of messages related to V2X operations and there is a message set appropriate to the context of the upper application. The message set may be expressed in a format of the data frame and may include at least one element. Each element may include the data frame or a data element.

The data frame represents two or more data sequences. The data frame may become a sequence structure of the data element or a sequence structure of the data frame. As an embodiment, DV_vehicleData as a data frame structure representing information of a vehicle may include a plurality of data elements (for example, Height, Bumbers, mass, and trailerweight). The data element defines a description of the data element. As an embodiment, an element called Height used in the data frame is defined in DE_VehicleHeight and may express a height of the vehicle. As an embodiment, the height of the vehicle may be expressed from 0 to 127, and an LBS unit may be increased by 5 cm and be expressed up to 6.35 meters.

As an embodiment, a basic safety message (BasicSafetyMessage) may be transmitted. The BasicSafetyMessage as a most basic and important message in the message set is used for periodically transmitting basic information of the vehicle. The corresponding message may include coreData defined as BSMcoreData, PartII which is optional, and regional data. The coreData may include data elements including msgCnt, id, lat, long, elev, speed, deading, break, size, and the like. The coreData uses the data elements to display a message count, ID, latitude, longitude, altitude, speed, direction, a brake, a vehicle size, and so on. The corresponding BSM may generally transmit information corresponding to the coreData in a period of 100 msec (10 times per second).

The network/transport layer may correspond to OSI layer 3 (network layer) and layer 4 (transport layer). A WAVE short message protocol (WSMP) may be used for transmitting a WAVE Short Message (WSM) delivered by the upper layer. Additionally, an IPv6/TCP may be used for processing an IP signal in the related art. The LLC block may adopt the IEEE 802.2 standard and may distinguish IP diagrams from WSM packets.

The access layer may correspond to OSI layer 1 (physical layer) and OSI layer 2 (data link layer). The access layer may use PHY technology and MAC technology of IEEE 802.11 and additionally use MAC technology of IEEE 1609.4 in order to support vehicle communication.

The security entity and the management entity may be connected and operated in all intervals.

FIG. 6 illustrates a WSMP packet configuration according to an embodiment of the present invention.

The network/transport layer of FIG. 5 may transmit a vehicle security message such as the BSM via the WSMP. The WSMP is described in an IEEE 1609.3 document and may also support the Ipv6 and the TCP/UDP in order to additionally transmit the IP data.

The WSMP is a protocol for delivering the WAVE short message generated in the ASN.1 scheme in the facility layer to the lower layer. As illustrated in FIG. 6, the WSMP packet includes the WSMP header and the WSM data including the message. The WSMP header includes a version field, a PSID field, an extension field, a WSM WAVE element ID field, and a length field.

The version field may be defined as a Wsmp Version field indicating an actual WSMP version of 4 bits and a reserved field of 4 bits. The PSID field as a provider service identifier may be allocated according to the application in the upper layer. The PSID field helps deciding an appropriate upper layer at the receiver side. The extension field is a field for extending the WSMP header and information including a channel number, data rate, transmit power used, and the like may be inserted into the extension field. The WSMP WAVE element ID field may designate a type of transmitted WAVE short message. The length field may designate a length of the WSM data transmitted through a WSMLength field of 12 bits in units of octets.

The LLC header provides a function to distinguish and transmit the IP data from the WSMP data. The IP data and the WSMP data may be distinguished by Ethertype of SNAP. As an embodiment, the LLC header and SNAP header structures may be defined in the IEEE 802.2 document. As an embodiment, when the IP data is transmitted, the Ethertype may be set to 0x86DD and included in the LLC header. As an embodiment, when the WSMP data is transmitted, the Ethertype may be set to 0x86DC and included in the LLC header. The receiver may verify the Ethertype field of the LLC packet header and forward and process the packet to an IP data path or a WSMP path according to the value.

FIG. 7 illustrates a conceptual internal architecture of an MAC sublayer performing a multi-channel operation (MCO) according to an embodiment of the present invention.

As an embodiment, the architecture of FIG. 7 may be included in the access layer of FIG. 5 or included in the MAC layer of the access layer. The MCO structure of FIG. 7 may include channel coordination in which a channel access is defined, channel routing in which operation processes of overall data and a management frame between PHY-MAC layers are defined, Enhanced Dedicated Channel Access (EDCA) of deciding and defining the priority of the transmission frame and a data buffer (or queue) storing the frame received by the upper layer. A channel coordination block is not illustrated in FIG. 7 and the channel coordination may be performed by the entirety of an MAC sublayer of FIG. 5.

Channel coordination: As an embodiment, channel accesses to a control channel (CCH) and a service channel (SCH) may be controlled. A channel access coordination will be described below. As an embodiment, the Wave short message (WSM) may be transmitted as (via) the CCH and the WSM and/or IP data may be transmitted as the SCH.

Data buffer (queue): The data buffer may store the data frame received from the upper layer according to defined access category (AC). In the embodiment of FIG. 3, the data buffer may be provided for each AC.

Channel routing: A channel routing block may deliver data input in the upper layer to the data buffer. Transmission operation parameters such as the channel number, the transmit power, and the data rate for the channel coordination and the frame transmission may be called with respect to a transmission request of the upper layer.

EDCA: As a scheme for guaranteeing QoS in the IEEE 802.11e MAC layer in the related art is a contention based medium access scheme that divides the AC into four access categories (AC) according to a type of traffic and assigns different priorities for each category and allocates different parameters for each AC and gives more transmission opportunities to traffic having a higher priority. An EDCA block may designate 8 priorities of 0 to 7 for data transmission including the priority and data which reach the MAC layer may be mapped to four ACs according to the priority.

FIG. 8 illustrates a relationship between a user priority of EDCA and access category (AC) according to an embodiment of the present invention.

A relationship between a user priority of the EDCA and the AC is illustrated in FIG. 8. In FIG. 8, as an AC number is larger, a rank has a higher priority. Every AC has a transmission queue and an AC parameter thereof and the difference in AC priority is decided based on the AC parameter values set differently from each other. The AC parameter values set differently from each other are connected with back-off to have different channel access priorities. The corresponding AC parameter values adopt AIFS [AC], CWmin[AC], and CWmax[AC], respectively and here, an arbitration inter-frame space (AIFS) refers to a minimum time for verifying whether the channel is idle before performing transmission. The lower the value of AIFS [AC] and CWmin [AC] is, the higher the priority is, and accordingly, the channel access delay is shortened so that more bandwidth may be used in a given traffic environment.

When a collision between stations occurs during transmitting the frame, the transmitter generates a new back-off counter. Transmission queues for four ACs defined in the IEEE 802.11 MAC individually compete with each other for radio medium access in one station. Since the respective ACs have back-off counters which are independent from each other, a virtual collision may occur. When there are two or more ACs that simultaneously complete the back-off, data of an AC having a highest priority is first transmitted and other ACs update the back-off counter again by increasing a CW value. Such a collision resolution process is referred to as a virtual collision process. Further, the EDCA allows the channel to be accessed during data transmission through a transmission opportunity (TXOP). When one frame is too long and may not be transmitted during one TXOP, one frame may be divided into small frames and transmitted.

FIG. 9 illustrates a physical layer configuration of a V2X transmitting apparatus according to an embodiment of the present invention.

As an embodiment, FIG. 9 illustrates a block diagram of physical layer signal processing of IEEE 802.11 or ITS-G5. However, FIG. 9 illustrates a physical layer configuration according to an embodiment of the present invention, and is not limitedly applied only to the aforementioned transmission standard technology.

The physical layer processor of FIG. 9 may include a physical layer convergence protocol (PLCP) sublayer baseband signal processing part including at least one of a scrambler 9010, an FEC encoder 9020, an interleaver 9030, a mapper 9040, a pilot insertion block 9050, an IFFT block 9060, a guard insertion block 9070, and a preamble insertion block 9080 and a physical medium dependent (PMD) sublayer RF band signal processing part including at least one of a wave shaping 9090, an I/Q modulation block 9100, and a DAC 9110. The description of a function of each block is as follows.

The scrambler 9010 XORs an input bitstream with a pseudo random binary sequence (PRBS) to randomize the input bitstream. The FEC encoder 9020 may add redundancy to the transmission data so as to correct an error on a transmission channel at the receiving side. The interleaver 9030 may interleave input data/bitstreams based on an interleaving rule so as to cope with a burst error. As an embodiment, when deep facing when deep fading or erasure is applied to a QAM symbol, since interleaved bits are mapped to each QAM symbol, it is possible to prevent an error from occurring consecutive bits among all codeword bits. The mapper 9040 may allocate input bit words to one constellation. The pilot insertion block 9050 inserts a reference signal into a predetermined location of a signal block. By using such a reference signal, the receiver may estimate a channel distortion phenomenon such as channel estimation, frequency offset, and timing offset.

The IFFT block 9060, that is, an inverse waveform transform block, may convert an input signal so as to enhance transmission efficiency and flexibility in consideration of the characteristics of the transmission channel and a system structure. As an embodiment, in the case of an OFDM system, the IFFT block 9060 may convert a signal in a frequency domain into a time domain by using an inverse FFT operation. In the case of a single carrier system, the IFFT block 9060 may not be used or may be omitted. The guard insertion block 9070 may insert a guard interval between adjacent signal blocks in order to minimize an influence of delay spread of the transmission channel. As an embodiment, in the case of the OFDM system, the guard insertion block 9070 may insert a cyclic prefix into the guard interval period. The preamble insertion block 9080 may insert a signal of a determined type, i.e., a preamble, into the transmission signal between the transmitter and receiver so that the receiver may quickly and efficiently detect a target signal. As an embodiment, in the case of the OFDM system, the preamble insertion block 9080 may define a signal block/signal frame including a plurality of OFDM symbols and insert a preamble symbol into a start portion of the signal block/signal frame.

The wave shaping block 90090 may waveform process an input baseband signal based on channel transmission characteristics. As an embodiment, the waveform shaping block 9090 may perform square-root-raised cosine (SRRC) filtering to obtain a base of out-of-band emission of a transmitted signal. In the case of a multi-carrier system, the waveform shaping block 9090 may not be used or may be omitted. The I/Q modulator 9100 may perform in-phase and quadrature modulation. A digital to analog converter (DAC) 9110 block may convert an input digital signal into an analog signal and output the analog signal. An output analog signal may be transmitted through an output antenna.

Respective blocks described in FIG. 9 may be omitted or may be replaced with other blocks having similar or equivalent functions. The blocks in FIG. 9 may be configured as a whole or a combination of some parts as needed. In this specification, the V2X communication apparatus may communicate based on the DSRC technology and the WAVE technology described in FIGS. 7 to 9. However, the V2X communication apparatus may perform communication based on other communication technologies including cellular technologies such as LTE, LTE-A, and 5G.

Hereinafter, a Cooperative Adaptive Cruise Control (CACC) technique is described.

In a target to contribute to traffic safety and mobility improvement, a necessity for automated and connected driving is emerged over the world. Recently, a CACC technique has been developed as one of the techniques therefor. The CACC technique is a technique for establishing a CACC pair or a CACC string and keeping a safety time gap between vehicles to a minimum value for vehicle efficiency improvement and fuel consumption reduction.

The main motivation of the CACC is to reduce a time gap between vehicles in comparison with an adaptive cruise control (ACC) system, and to improve a response for the velocity change of a target vehicle. This yields a benefit to drivers and road operators and to society potentially.

For example, for drivers, the main benefit of the CACC may be in relation to reduced and automatically maintained (but safe) time gap and comfort obtained according to better response to the velocity change of a target vehicle. In addition, traffic jam is reduced, and reduction of fuel consumption may be obtained. For road operators, the main benefit of the CACC may be in relation to road capacity and traffic efficient increase. According to a research, highway lane performance improvement can be observed even in a low penetration rate. In addition, the social benefit of the CACC may be in relation to road safety increase, traffic jam reduction and environmental benefit. Even though safety is not a main target of the CACC, the CACC may provide a behavior of responding to preceding vehicle velocity more sensibly, and provide an improved safety due to faster response, and accordingly, make ACC more attractive and convenient.

A CACC application is an extension of the in-vehicle Adaptive Cruise Control (ACC). The CACC application enables reduction of time gap from a preceding vehicle to be available further degrees in comparison with the ACC system. Hereinafter, the terms used in the CACC technique are described as an example.

CACC: a V2X capable in-vehicle driving assistance system that adjusts automatically the vehicle speed to keep a target time gap with a target vehicle. Particularly, the CACC may be a V2X capable in-vehicle driving assistance system that adjusts automatically the vehicle speed to keep a target time gap with a target vehicle while keeping a minimum safety distance. For example, the CACC is a V2X capable in-vehicle driving assistance system that adjusts automatically the vehicle speed to keep a target time gap with a target vehicle while keeping a minimum safety distance, making use of information communicated from other vehicles and/or from the roadside infrastructure. Here, the V2X capable means that a communication with other V2X communication device (ITS-S) is available using a wireless communication (V2X communication). For example, the V2X capable means that an apparatus may transmit and/or receive a facility and/or an application layer message (e.g., CAM) using wireless communication.

CACC application: an application layer entity that implements the CACC functionalities and application logic CACC vehicle: a vehicle on which the CACC system is mounted. The CACC vehicle may or may not activate CACC on a specific time. The CACC vehicle may perform a V2X communication.

Active CACC vehicle: a CACC vehicle having CACC of an activate state

CACC string: two or more CACC pair in sequence. At this time, the first active CACC vehicle corresponds to a target vehicle of the second active CACC vehicle, and the second active CACC vehicle corresponds to a target vehicle of the third active CACC vehicle.

CACC pair: a subject vehicle and a target vehicle of the subject vehicle

Measured time gap: a time gap between a subject vehicle and a preceding vehicle of the subject vehicle, measured on a time Subject vehicle: a CACC vehicle that plays the role of following a target vehicle Target time gap: a time gap targeted by a subject vehicle Target vehicle (TV): a counterpart vehicle of a subject vehicle for V2X capable vehicle and CACC application. The target vehicle is not necessarily a CACC vehicle.

Time gap: a time gap while a rear end of a preceding vehicle and a front end of a following vehicle pass through the same position on a road surface. For example, this is a time interval between when a preceding vehicle's rear end and a following vehicle's front end passes the same location on the road surface, assuming that the following vehicle speed remains constant. In the present disclosure, the time gap may be referred to as a safety time gap.

Lead vehicle: the first vehicle in a CACC string and a CACC pair. The lead vehicle may not be a CACC vehicle. In a CACC pair, a preceding vehicle and a target vehicle may be the same. A preceding vehicle in a CACC string is a target vehicle of the first CACC vehicle.

As described above, the CACC is in-vehicle driving assistance system that adjusts automatically the vehicle speed to keep a target time gap $\Delta t_{target}$ with a target vehicle (TV) while keeping a minimum safety distance between vehicles. The CACC makes use of data received from other vehicle ITS-S and/or from roadside ITS-S through ITS network. The CACC may include at least one ITS-S application (CACC application) and/or a set of hardware components in which application logic is implemented using services provided by lower layers (facility, network and transport layer, and access layer).

A CACC application may process data received from other ITS-S and/or on board sensor, and determine vehicle speed and acceleration automatically, and accordingly, transmit a control command to a terminal control system (e.g., brake or accelerator). In addition, selectively, a CACC application may operate together with other ITS-S application such as other in-vehicle auxiliary system or pre-crash system, side control system, and the like. The CACC may be connected to an in-vehicle network, and may access to in-vehicle sensor data. The CACC may send a control command to acceleration/deceleration system.

Multiple active CACC vehicles may follow each other in order to establish a vehicle group indicated by a CACC string. Meanwhile, a CACC string management environment may be changed dynamically. For example, a CACC string may be divided into two groups, or may be combined with other string in order to make a new CACC string, and when all vehicles leave a string, the CACC string may be dispersed.

As an embodiment, a CACC target time gap $\Delta t_{target}$ may be a time interval configured by the CACC that follows a target vehicle (TV). The CACC may adjust acceleration, speed and/or brake in order to keep a time gap $\Delta t$ from a TV with $\Delta t_{target}$. Here, the time gap may be a time interval between when a preceding vehicle's rear end and a following vehicle's front end passes the same location on the road surface as described above. At this time, it may be assumed that the following vehicle speed remains constant. Meanwhile, the CACC needs to keep a minimum safety distance, and the minimum safety distance needs to be more than a distance required to avoid a collision.

CACC Architecture, State Transition & Operation Flow

Hereinafter, an exemplary CACC architecture is described. First, the Functional Architecture and the Information Architecture of the CACC are described. And then, the Communication Architecture (or Protocol Architecture) of the CACC is described. Particularly, with reference to FIGS. 10 and 11, the Protocol Architecture of a target vehicle and a subject vehicle for providing a CACC service is described.

First, in describing an exemplary CACC Functional Architecture, the CACC architecture may include a part or the whole of a main functional block as below.

Message handler: This manages generation, encoding/decoding, reception and transmission of a message (e.g., V2X message) for using a CACC application. The message handler may be referred to as a messaging module/entity (e.g., V2V messaging entity and V2V/I2V messaging entity).

TV identifier: This identifies a TV based on the data usable in a message handler, a vehicle status monitor and an environment monitor.

Vehicle status monitor: This monitors a vehicle kinematics status and other in-vehicle system status, for example, a side control assistance system.

Environment monitor: This monitors an environment neighboring a vehicle, for example, traffic status, road topology, other vehicle status, and so on. In the present disclosure, the vehicle status monitor and the environment monitor block may be collectively referred to as a vehicle and sensing information collection entity/module.

CACC logic manger: This manages a CACC logic, for example, switching between other CACC application machine statuses, subscription/withdrawal decision for a CACC string, a CACC parameter configuration (e.g., target time interval), and the like. In the present disclosure, the CACC logic manger may be referred to as a CACC management entity/module.

Motion planner: This function determines a vehicle operation and a potential vehicle manipulation possibility based on a CACC parameter set by a CACC logic manager, for example, an acceleration value, a scheduled speed, and the like.

Actuator control manager: This manages and generates a control command to a corresponding vehicle actuator according to the motion planner result.

Next, in describing an exemplary CACC Information Architecture, in each subject vehicle, the CACC may receive information of other vehicle in ITS access layer (Over the Air; OTA) interface, and receive its own sensor data like a retard angle sensor through a vehicle data provider (VDP) for managing a CACC application in an in-vehicle network.

The output result of the CACC application may be transformed to a specific control command and transmitted to the corresponding vehicle actuator. Consequently, the subject vehicle may keep a time gap from the target vehicle according to the target time gap which is configured.

A message (V2V message) may be exchanged between vehicles (particularly, between a subject vehicle and a target vehicle). In addition, selectively, in order to support a CACC service, a vehicle ITS-S and a roadside ITS-S may exchange a part or the whole of the following information.

The traffic information (e.g., traffic jam, speed limit, average speed, recommend speed, etc.) transmitted from a roadside ITS-S to a vehicle ITS-S of a neighboring area. A CACC application of a subject vehicle may consider such information when an application operates, for example, in order to determine a target time gap and/or a vehicle target speed depending on a neighboring traffic.

The road topology information (e.g., curve, intersection topology) transmitted from a roadside ITS-S to a vehicle ITS-S of a neighboring area. A CACC application of a subject vehicle may consider such information in application logic in order to determine a target time gap and/or a vehicle target speed depending on a neighboring traffic, for example.

The traffic light status and timing information transmitted from a roadside ITS-S to a vehicle ITS-S of a neighboring area. A CACC application of its own vehicle may consider such information in application logic in order to determine a target time gap and/or a vehicle target speed depending on a neighboring traffic, for example.

In this case, the roadside ITS-S may provide the service described above independently (standalone) or may be supported from a central ITS-S. The central ITS-S may receive vehicle examination information collected by the roadside ITS-S, receive vehicle examination information directly received from the vehicle ITS-S for traffic monitoring, or provide traffic information, road topology information, service information, and the like to the roadside ITS-S in a related area or to the ITS-S of the corresponding vehicle directly. The exchange protocol between the message and the central ITS-S may be DATEX II, OCIT-C and TPEG, for example.

Next, the CACC Protocol Architecture may include an application layer including a CACC application and a facility layer including facilities for vehicle information collection, CACC management, vehicle control and/or HMI support. In this case, the facilities may be common facilities that may also be used by other application or CACC-dedicated facilities only usable in the CACC application. In the present disclosure, the CACC Protocol Architecture may be referred to as a Protocol Architecture or a CACC Architecture, and the like. Hereinafter, with reference to FIGS. 10 and 11, the Protocol Architecture of a target vehicle and a subject vehicle is described.

FIG. 10 illustrates the CACC Protocol Architecture including a common facility according to an embodiment of the present invention. Particularly, FIGS. 10(a) and (b) illustrates the CACC Protocol Architecture of a target vehicle and a subject vehicle including a common facility according to an embodiment of the present invention.

Referring to FIGS. 10(a) and (b), the CACC Protocol Architecture may include an application layer, a facility layer, a network and transport layer, and/or an access layer. In addition, the CACC Protocol Architecture may further include a management entity and a security entity. Basic description for each layer and entity is as described above in FIG. 3.

In the embodiment of FIG. 10(a) showing the CACC Protocol Architecture of a target vehicle, an application layer may include a CACC application module/entity for providing a CACC service. Here, the CACC application entity is referred to as a higher layer entity (application layer entity) for enabling a CACC service.

In addition, the facility layer may include a V2V messaging module/entity and/or a vehicle and sensing information collection module/entity. Here, the V2V messaging entity is referred to as a facility layer entity for exchanging a V2V message, and the vehicle and sensing information collection entity is referred to as a facility layer entity for collecting vehicle itself information (vehicle information) and information via a sensor (sensing information). The V2V messaging entity and the vehicle and sensing information collection entity of the facility layer are not dedicated facility layer entities (dedicated facilities) used only for the CACC service, but correspond to common facility layer entities (common facilities) that are also used by other application.

In the embodiment of FIG. 10(b) showing the CACC Protocol Architecture of a subject vehicle, an application layer may include a CACC application module/entity for providing a CACC service. As described above, CACC application entity is referred to as a higher layer entity (application layer entity) for enabling a CACC service. In addition, the facility layer may include a V2V/V2I messaging module/entity, a vehicle and sensing information collection module/entity, a CACC management module/entity, a vehicle control module/entity, and/or HMI support module/entity. As described above, the V2V messaging entity is referred to as a facility layer entity for exchanging a V2V message, and the vehicle and sensing information collection entity is referred to as a facility layer entity for collecting vehicle itself information (vehicle information) and information via a sensor (sensing information). In addition, the I2V messaging entity is referred to as a facility layer entity for exchanging an I2V message. The V2X messaging entity and the I2V messaging entity may be referred to as a V2V/V2I messaging entity, a V2X messaging entity, and the like.

The CACC management entity is referred to as a facility layer entity for configuring a CACC status for a CACC service, a time gap and/or a target speed based on information of the V2X messaging entity and the vehicle information collection entity (vehicle and sensing information collection entity). The vehicle control entity is referred to as a facility layer entity for controlling a vehicle (e.g., speed control). The vehicle control entity may control a vehicle by transmitting a control command to a vehicle actuator directly or transmitting a control command to other in-vehicle auxiliary system through an in-vehicle network. The HMI support entity is referred to a facility layer entity for forwarding various notifications (for a driver) to a Human Machine Interface (HMI) module. The V2V/V2I messaging entity, the vehicle and sensing information collection entity, the vehicle control entity and the HMI support entity are not dedicated facility layer entities (dedicated facilities) used only for the CACC service, but correspond to common facility layer entities (common facilities) that are also used by other application.

FIG. 11 illustrates the CACC Protocol Architecture including a CACC dedicated facility according to an embodiment of the present invention. Particularly, FIGS. 11(a) and (b) illustrates the CACC Protocol Architecture of a target vehicle and a subject vehicle including a dedicated facility according to an embodiment of the present invention.

Referring to FIGS. 11(a) and (b), the CACC Protocol Architecture may include an application layer, a facility layer, a network and transport layer, and/or an access layer. In addition, the CACC Protocol Architecture may further include a management entity and a security entity. Basic description for each layer and entity is as described above in FIG. 3.

In the embodiment of FIG. 11(a) showing the CACC Protocol Architecture of a target vehicle, like the embodiment of FIG. 10(a), an application layer may include a CACC application module/entity for providing a CACC service. As described above, the CACC application entity is referred to as a higher layer entity (application layer entity) for enabling a CACC service.

However, different from the embodiment of FIG. 10(a), the facility layer may include a dedicated CACC facility layer entity (dedicated facility) for a CACC service. For example, the facility layer may include a CACC V2V messaging module/entity and/or a CACC vehicle and sensing information collection module/entity. Here, the CACC V2V messaging entity is referred to as a facility layer entity for exchanging a V2V message for use of a CACC service, and the CACC vehicle and sensing information collection entity is referred to as a facility layer entity for collecting vehicle itself information (vehicle information) and information via a sensor (sensing information). The CACC V2V messaging entity and the CACC vehicle and sensing information collection entity of the facility layer correspond to dedicated facility layer entities (dedicated facilities) used only for the CACC service. When such a dedicated facility is used, using the CACC dedicated facility of the facility layer, a CACC service may be provided with low latency.

In the embodiment of FIG. 11(b) showing the CACC Protocol Architecture of a subject vehicle, like the embodiment of FIG. 10(b), an application layer may include a CACC application module/entity for providing a CACC service. As described above, CACC application entity is referred to as a higher layer entity (application layer entity) for enabling a CACC service.

However, different from the embodiment of FIG. 10(b), in the embodiment of FIG. 11(b), the facility layer may include a dedicated CACC facility layer entity (dedicated facility) for a CACC service. For example, the facility layer may include a CACC V2V/V2I messaging module/entity, a CACC vehicle and sensing information collection module/entity, a CACC management module/entity and/or a vehicle control module/entity. In addition, the facility layer may further include an HMI support module/entity.

As described above, the CACC V2V messaging entity is referred to as a facility layer entity for exchanging a V2V message for use of a CACC service, and the CACC vehicle and sensing information collection entity is referred to as a facility layer entity for collecting vehicle itself information (vehicle information) and information via a sensor (sensing information) for use of a CACC service. In addition, the CACC I2V messaging entity is referred to as a facility layer entity for exchanging an I2V message use of a CACC service. The CACC V2X messaging entity and the CACC I2V messaging entity may be referred to as a CACC V2V/V2I messaging entity, a CACC V2X messaging entity, and the like.

The CACC management entity is referred to as a facility layer entity for configuring a CACC status for a CACC service, a time gap and/or a target speed based on information of the V2X messaging entity and the vehicle information collection entity (vehicle and sensing information collection entity). The CACC vehicle control entity is referred to as a facility layer entity for controlling a vehicle (e.g., speed control) for a CACC service. The vehicle control entity may control a vehicle by transmitting a control command to a vehicle actuator directly or transmitting a control command to other in-vehicle auxiliary system through an in-vehicle network. The HMI support entity is referred to a facility layer entity for forwarding various notifications (for a driver) to a Human Machine Interface (HMI) module. The CACC V2V/V2I messaging entity, the CACC vehicle and sensing information collection entity and the CACC vehicle control entity correspond to dedicated facility layer entities (dedicated facilities) used only for a CACC service. When such a dedicated facility is used, using the CACC dedicated facility of the facility layer, a CACC service may be provided with low latency.

FIG. 12 illustrates a CACC state transition model according to an embodiment of the present invention. FIG. 12 may be an example of a CACC application state machine diagram. In the embodiment of FIG. 12, an entrance to each state may require a confirmation/permission of a CACC application or a driver. For example, TV discovery, CACC activation and CACC termination state may be preferentially determined in the CACC management entity, and as occasion demands, a confirmation/permission of a CACC application or a driver may be required. Hereinafter, with reference to FIG. 12, each state is described.

CACC disabled: A state that a CACC application is disabled. This state may be triggered when a CACC application is turned off. For example, when a CACC application is turned off in the TV discovery state, the CACC terminated state or the CACC activated state, the CACC application may enter this state.

CACC Enabled: A state that a CACC application is enabled. This state may be triggered when a CACC application is turned on. As an embodiment, this state may include the TV discovery state, the CACC activated state and/or the CACC terminated state.

TV Discovery state: A state that a CACC application discovers a target vehicle. This state may be triggered when a CACC application is turned on from the CACC Disabled. As such, an enabled CACC application may perform a preconfigured TV Discovery state, and accordingly, discover a target vehicle.

CACC Activated: A state that a CACC application is activated. This state may be triggered when a target vehicle is selected in the TV Discovery state. For example, when a target vehicle is discovered and selected, a CACC application may enter this state. In this state, a CACC application may determine whether a preconfigured Termination Condition is satisfied. In the case that the Termination Condition is not satisfied, a CACC application may maintain this state continuously. When the Termination Condition is satisfied, a CACC application may enter a CACC Terminated state. Such Termination Condition may include the following examples.

Cut in: A case that a third vehicle cuts in between a subject vehicle and a target vehicle.

Lane Change: A case that a target vehicle changes a lane, and a subject vehicle has no CACC application having the lane change function.

Unwanted Route: A case that a target vehicle moves through a route which a subject vehicle does not wanted.

Traffic Signal: A case of unable to follow a target vehicle because of a Traffic Signal.

Misbehavior: A case that a target vehicle does not follow a traffic signal and a regulation speed.

Connection Lost: A case of unable to receive a V2V signal of target vehicle any more.

CACC Terminated: A case that a CACC application is terminated. This state may be triggered when a target vehicle is not selected in the TV Discovery state. Otherwise, this state may be triggered when a preconfigured termination condition is satisfied in the CACC Activated state. Meanwhile, when a CACC application is in the CACC Terminated state, the CACC application may perform the TV discovery procedure again. Even in this state, the CACC application is enabled state, for example, in the case that the CACC application is not turned off, the CACC application may enter the TV Discovery state again.

FIG. 13 illustrates a CACC operation flow of a V2X communication apparatus including a common facility according to an embodiment of the present invention. In the embodiment of FIG. 13, a V2X communication apparatus may be implemented according to the CACC Protocol Architecture (e.g., the Protocol Architecture of FIG. 10) including a common facility. Particularly, the embodiment of FIG. 13 shows an operation flow from the CACC Disabled state to the TV Discovery state and the CACC Activated state.

In the embodiment of FIG. 13, the architecture of a roadside ITS-S may include an I2V messaging entity for exchanging an I2V message. This I2V messaging entity may be a facility layer entity included in a facility layer. In addition, the architecture of a target vehicle (vehicle ITS-S) may follow the architecture of FIG. 10(a). For example, a target vehicle may include an application layer including a CACC application selectively, a facility layer including a V2V messaging entity and/or a vehicle and sensing information collection entity, a network and transport layer and an access layer. In addition, the architecture of a subject vehicle (vehicle ITS-S) may follow the architecture of FIG. 10(b). For example, a subject vehicle may include an application layer including a CACC application, a facility layer including a V2V/I2V messaging entity, a vehicle and sensing information collection entity, a CACC management entity, a vehicle control entity and/or an HMI support entity, a network and transport layer and an access layer. Furthermore, the subject vehicle may further include an HMI entity.

In describing an operation of a target vehicle (vehicle ITS-S/V2X communication apparatus of the target vehicle) first with reference to FIG. 13, the target vehicle may collect vehicle information using the vehicle and sensing information collection entity. The vehicle and sensing information collection entity may collect the vehicle information, and may forward the collected vehicle information to the CACC application or the V2V messaging entity. As an embodiment, the vehicle information may include information for a current speed of a vehicle, a current acceleration, a current braking degree, whether to establish a CACC string, a CACC string length, a CAM message frequency and/or a vehicle type.

The CACC application may forward the vehicle information to the V2V messaging entity. As such, the collected vehicle information may be forwarded to the V2V messaging entity via the CACC application or directly.

In addition, the target vehicle may transmit the vehicle information to the subject vehicle through V2X communication. For this, the V2V messaging entity may forward the vehicle information to the network and transport layer/the access layer, and the network and transport layer/the access layer may transmit the vehicle information to the subject vehicle through V2X communication.

At this time, processing for a transmission of the vehicle information may be performed in each entity and layer. For example, the V2V messaging entity may generate a V2V message including the vehicle information, and may forward this to the network/transport layer and the access layer. In addition, the network/transport layer and the access layer may generate a radio signal by performing network/transport layer processing and access layer processing, and transmit the radio signal to the subject vehicle through V2X communication. Through this procedure, the vehicle information may be forwarded from the V2V messaging entity of the target vehicle to the network and transport layer and the access layer, and forwarded to the subject vehicle through V2X communication.

Next, in describing an operation of a roadside ITS-S/V2X communication apparatus, the roadside ITS-S may transmit environmental information to a subject vehicle through I2V communication. As an embodiment, the environmental information may include a speed limit, a curve degree, the number of lanes, whether to allow CACC, whether to limit a CACC string length and the limited length, whether to limit the number of CACC strings and the limited number, traffic situation, a road surface state and/or a weather state.

The roadside ITS-S may transmit the environmental information to the subject vehicle through I2V communication using I2V messaging entity. At this time, the processing for transmitting the environmental information may be performed in the roadside ITS-S entity and layer. For example, the I2V messaging entity may generate an I2V message including the vehicle information, and forward this to the network/transport layer and the access layer. In addition, the network/transport layer and the access layer may generate a radio signal by performing network/transport layer processing and access layer processing, and transmit the radio signal to the subject vehicle through I2V communication. Through this procedure, the environmental information may be forwarded to the network/transport layer and the access layer from the I2V messaging entity, and transmitted to the subject vehicle through I2V communication.

Next, in describing an operation of a subject vehicle (a vehicle ITS-S of the subject vehicle/V2X communication apparatus), the subject vehicle may turn on a CACC application. When the CACC application is turned on, the subject vehicle may switch a CACC state from a CACC disabled state to a CACC enabled state and a TV discovery state. For example, when the CACC application is turned on, the CACC application may forward a CACC enabling signal/message to a CACC management entity, and the CACC management entity that receives it may switch the CACC state from a CACC disabled state to a CACC enabled state and a TV discovery state. In this case, the CACC management entity may forward CACC status information to the CACC application and/or the HMI support entity. The HMI support entity may forward the CACC status information to the HMI.

The subject vehicle may display the CACC status information using the HMI. Through this, the CACC status information may be provided to a user.

The subject vehicle may collect the vehicle information (SV information) of the subject vehicle using the vehicle and sensing information collection entity. The vehicle and sensing information collection entity may collect the vehicle information and forward the collected vehicle information to the CACC application.

The subject vehicle may receive the vehicle information (SV information) of the subject vehicle from a target vehicle through V2X communication. In this case, the subject vehicle may perform a reverse operation of the operation for transmitting the vehicle information of the target vehicle. For example, the access layer and the network/transport layer of the subject vehicle may forward a V2V message including the vehicle information to the V2V/I2V messaging entity by performing access layer processing and network/transport layer processing. The V2V/I2V messaging entity of the subject vehicle may obtain the vehicle information by processing the V2X message. Through such a procedure, the vehicle information may be received in the subject vehicle through V2X communication, and forwarded to the V2V/I2V messaging entity. Later, the V2V/I2V messaging entity may forward the obtained vehicle information to the CACC application.

The subject vehicle may receive environmental information from the roadside ITS-S through I2V communication. In this case, the subject vehicle may perform a reverse operation of the operation for transmitting the environmental information of the roadside ITS-S. For example, the access layer and the network/transport layer may perform access layer processing and network/transport layer processing, and forward an I2V message including the environmental information to the V2V/I2V messaging entity. The V2V/I2V messaging entity may obtain the environmental information by processing the I2V message. Through such a procedure, the environmental information may be received in the subject vehicle through V2X communication, and forwarded to the V2V/I2V messaging entity. Later, the V2V/I2V messaging entity may forward the obtained environmental information to the CACC application. Meanwhile, according to an embodiment, the V2V/I2V messaging entity may forward the vehicle information and the environmental information to the CACC application together. Through this, the vehicle information and the environmental information of the target vehicle may be forwarded to the CACC application. The CACC application may forward the vehicle information of the subject vehicle, the vehicle information of the target vehicle and/or the environmental information of the target vehicle to the CACC management entity.

The subject vehicle may select a target vehicle using the CACC management entity. The CACC management entity may select a target vehicle using the vehicle information of the subject vehicle, the vehicle information of the target vehicle and/or the environmental information of the target vehicle, and forward the information for the selected target vehicle (selected target vehicle information) to the CACC application. In this case, the CACC application may forward an acknowledgement message to the CACC management entity. At this time, the acknowledgement message may include information for a time gap (time gap information).

When the acknowledgement message is received, the subject vehicle may switch the CACC state to the CACC activated state using the CACC management entity. The CACC management entity may switch the CACC state from the TV discovery state to the CACC activated state. In this case, the CACC management entity may forward the CACC state and the selected target vehicle information to the CACC application. In addition, the CACC management entity may forward the CACC state and the selected target vehicle information to the HMI support entity and the HMI support entity may forward it to the HMI entity.

The subject vehicle may display the CACC state and the target vehicle information using the HMI entity. Through this, the CACC state and the target vehicle information may be provided to a user.

FIG. 14 illustrates a CACC operation flow of a V2X communication apparatus including a common facility according to another embodiment of the present invention. Particularly, the embodiment of FIG. 14 shows an operation flow of the CACC Activated state. In the embodiment of FIG. 14, the architecture of a roadside ITS-S, a target vehicle and a subject vehicle follows the architecture of the roadside ITS-S, the target vehicle and the subject vehicle of FIG. 13. In FIG. 14, the repeated description with the contents described above in FIG. 13 is omitted.

In describing an operation of a target vehicle (vehicle ITS-S/V2X communication apparatus of the target vehicle) first with reference to FIG. 14, the target vehicle may collect vehicle information using the vehicle and sensing information collection entity. In addition, the target vehicle may forward the vehicle information to the subject vehicle through V2X communication. The description in relation to such vehicle information collection and vehicle information forwarding is as described above in FIG. 13.

Next, in describing an operation of a roadside ITS-S/V2X communication apparatus, the roadside ITS-S may transmit environmental information to a subject vehicle through I2V communication. The description in relation to such a transmission of the environmental information is as described above in FIG. 13.

Later, an operation of a subject vehicle (a vehicle ITS-S of the subject vehicle/V2X communication apparatus) is described. In the embodiment of FIG. 14, it is assumed that the subject vehicle is in the CACC activated state. For example, through the procedure described above in FIG. 13, the subject vehicle may enter the CACC activated state from the TV discovery state.

The subject vehicle may collect the vehicle information using the vehicle and sensing information collection entity. In addition subject vehicle may receive the vehicle information of the target vehicle from the target vehicle through V2X communication. In addition, the subject vehicle may receive environmental information from the roadside ITS-S through I2V communication. Through the procedure of collecting the vehicle information of the subject vehicle, receiving the vehicle information of the target vehicle and receiving the environmental information, the vehicle information of the subject vehicle, the vehicle information of the target vehicle and/or the environmental information to the CACC management entity. This is as described above in FIG. 13.

Later, the subject vehicle may calculate a target speed using the CACC management entity. The CACC management entity may calculate the target speed using the vehicle information of the subject vehicle, the vehicle information of the target vehicle and/or the environmental information.

In addition, the subject vehicle may determine whether a termination condition is satisfied using the CACC management entity. The termination condition is as described above in FIG. 12.

Furthermore, the subject vehicle may control the vehicle speed using a vehicle control entity. For example, when the termination condition is not satisfied, the CACC management entity may forward the information for the target speed (target speed information) to the vehicle control entity, and the vehicle control entity may control the vehicle speed using the target speed information.

In addition, the subject vehicle may display the target speed information using the HMI entity. For example, when termination condition is not satisfied, the CACC management entity may forward the target speed information to the HMI support entity, and the HMI support entity may forward it to the HMI entity. In this case, the HMI entity may display the target speed information. Through this, the target speed information may be provided to a user.

FIG. 15 illustrates a CACC operation flow of a V2X communication apparatus including a common facility according to another embodiment of the present invention. Particularly, the embodiment of FIG. 15 shows an operation flow from the CACC Activated state to the CACC Terminated state. In the embodiment of FIG. 15, the architecture of a roadside ITS-S, a target vehicle and a subject vehicle follows the architecture of the roadside ITS-S, the target vehicle and the subject vehicle of FIG. 13. In FIG. 15, the repeated description with the contents described above in FIG. 13 and FIG. 14 is omitted.

In describing an operation of a target vehicle (vehicle ITS-S/V2X communication apparatus of the target vehicle) first with reference to FIG. 15, the target vehicle may collect vehicle information using the vehicle and sensing information collection entity. In addition, the target vehicle may forward the vehicle information to the subject vehicle through V2X communication. The description in relation to such vehicle information collection and vehicle information forwarding is as described above in FIG. 13.

Next, in describing an operation of a roadside ITS-S/V2X communication apparatus, the roadside ITS-S may transmit environmental information to a subject vehicle through I2V communication. The description in relation to such a transmission of the environmental information is as described above in FIG. 13.

Later, an operation of a subject vehicle (a vehicle ITS-S of the subject vehicle/V2X communication apparatus) is described. In the embodiment of FIG. 15, it is assumed that the subject vehicle is in the CACC activated state. For example, through the procedure described above in FIG. 13, the subject vehicle may enter the CACC activated state from the TV discovery state.

The subject vehicle may collect the vehicle information using the vehicle and sensing information collection entity. In addition subject vehicle may receive the vehicle information of the target vehicle from the target vehicle through V2X communication. In addition, the subject vehicle may receive environmental information from the roadside ITS-S through I2V communication. Through the procedure of collecting the vehicle information of the subject vehicle, receiving the vehicle information of the target vehicle and receiving the environmental information, the vehicle information of the subject vehicle, the vehicle information of the target vehicle and/or the environmental information to the CACC management entity. This is as described above in FIG. 13.

Later, the subject vehicle may calculate a target speed using the CACC management entity. This is as described above in FIG. 14. In addition, the subject vehicle may determine whether a termination condition is satisfied using the CACC management entity. The termination condition is as described above in FIG. 12.

When the termination condition is satisfied, the subject vehicle may switch the CACC state to the CACC terminated state. For example, when the termination condition is satisfied, the CACC management entity may switch the CACC state from the CACC activated state to the CACC terminated state. In this case, the CACC management entity may forward the CACC status information to the CACC application and/or the HMI support entity. The HMI support entity may forward CACC status information to the HMI.

In addition, the subject vehicle may display the CACC status information using the HMI. Through this, the CACC status information may be provided to a user.

FIG. 16 illustrates a CACC operation flow of a V2X communication apparatus including a common facility according to another embodiment of the present invention. Particularly, the embodiment of FIG. 16 shows an operation flow from the CACC Activated state to the CACC Disabled state. In the embodiment of FIG. 16, the architecture of a roadside ITS-S, a target vehicle and a subject vehicle follows the architecture of the roadside ITS-S, the target vehicle and the subject vehicle of FIG. 13. In FIG. 16, the repeated description with the contents described above in FIG. 13 to FIG. 15 is omitted.

In describing an operation of a target vehicle (vehicle ITS-S/V2X communication apparatus of the target vehicle) first with reference to FIG. 15, the target vehicle may collect vehicle information using the vehicle and sensing information collection entity. In addition, the target vehicle may forward the vehicle information to the subject vehicle through V2X communication. The description in relation to such vehicle information collection and vehicle information forwarding is as described above in FIG. 13.

Next, in describing an operation of a roadside ITS-S/V2X communication apparatus, the roadside ITS-S may transmit environmental information to a subject vehicle through I2V communication. The description in relation to such a transmission of the environmental information is as described above in FIG. 13.

Later, an operation of a subject vehicle (a vehicle ITS-S of the subject vehicle/V2X communication apparatus) is described. In the embodiment of FIG. 16, it is assumed that the subject vehicle is in the CACC activated state. For example, through the procedure described above in FIG. 13, the subject vehicle may enter the CACC activated state from the TV discovery state.

The subject vehicle may collect the vehicle information using the vehicle and sensing information collection entity. In addition subject vehicle may receive the vehicle information of the target vehicle from the target vehicle through V2X communication. In addition, the subject vehicle may receive environmental information from the roadside ITS-S through I2V communication. Through the procedure of collecting the vehicle information of the subject vehicle, receiving the vehicle information of the target vehicle and receiving the environmental information, the vehicle information of the subject vehicle, the vehicle information of the target vehicle and/or the environmental information to the CACC management entity. This is as described above in FIG. 13.

Later, the subject vehicle may calculate a target speed using the CACC management entity. This is as described above in FIG. 14. In addition, the subject vehicle may determine whether a termination condition is satisfied using the CACC management entity. The termination condition is as described above in FIG. 12.

In addition, the subject vehicle may turn off the CACC application. In this case, the CACC application may forward a CACC disabling signal/message to the CACC management entity.

Furthermore, when the CACC disabling message is received, the subject vehicle may switch the CACC state to the CACC disabled state. For example, when the CACC disabling message is received, the CACC management entity may switch the CACC state from the CACC activated state to the CACC disabled state. In this case, the CACC management entity may forward the CACC status information to the CACC application and/or the HMI support entity. The HMI support entity may forward CACC status information to the HMI.

In addition, the subject vehicle may display the CACC status information using the HMI. Through this, the CACC status information may be provided to a user.

As described above in FIGS. 13 to 16, in the case that a vehicle provides the CACC service using a common facility, the provision of the CACC service needs to be controlled through a CACC application always. In this case, after vehicle information, environmental information, and the like used for a target vehicle selection, a target speed calculation, a termination condition determination, and so on are transferred to the CACC application, the vehicle information, the environmental information, and the like need to be processed in each entity of the facility layer through the CACC application, and accordingly, which may increase latency for providing the CACC service.

FIG. 17 illustrates a CACC operation flow of a V2X communication apparatus including a CACC dedicated facility according to an embodiment of the present invention. In the embodiment of FIG. 17, the V2X communication apparatus may be implemented according to the CACC Protocol Architecture including a common facility (e.g., the Protocol Architecture of FIG. 11). Particularly, the embodiment of FIG. 17 shows an operation flow from the CACC Disabled state to the TV Discovery state and the CACC Activated state.

In the embodiment of FIG. 17, the architecture of a roadside ITS-S may include an I2V messaging entity for exchanging an I2V message. This I2V messaging entity may be a facility layer entity included in a facility layer. In addition, the architecture of a target vehicle (vehicle ITS-S) may follow the architecture of FIG. 11(a). For example, a target vehicle may include an application layer including a CACC application selectively, a facility layer including a CACC V2V messaging entity and/or a CACC vehicle and sensing information collection entity, a network/transport layer and an access layer. In addition, the architecture of a subject vehicle (vehicle ITS-S) may follow the architecture of FIG. 11(b). For example, a subject vehicle may include an application layer including a CACC application, a facility layer including a CACC V2V/I2V messaging entity, a CACC vehicle and sensing information collection entity, a CACC management entity, a CACC vehicle control entity and/or an HMI support entity, a network/transport layer and an access layer. Furthermore, the subject vehicle may further include an HMI entity.

In describing an operation of a target vehicle (vehicle ITS-S/V2X communication apparatus of the target vehicle) first with reference to FIG. 17, the target vehicle may enable the CACC V2V/I2V messaging entity and the CACC vehicle and sensing information collection entity. For example, the CACC application may transmit a CACC enabling signal/message to the V2V/I2V messaging entity and the CACC vehicle and sensing information collection entity so as to enable the CACC V2V/I2V messaging entity and the CACC vehicle and sensing information collection entity.

In addition, the target vehicle may collect vehicle information using the vehicle and sensing information collection entity. The vehicle and sensing information collection entity may collect the vehicle information, and forward the collected vehicle information to the CACC V2V/I2V messaging entity. As such, the collected vehicle information may be forwarded to the CACC V2V/I2V messaging entity directly, without going through the CACC application. As an embodiment, the vehicle information may include the vehicle information may include information for a current speed of a vehicle, a current acceleration, a current braking degree, whether to establish a CACC string, a CACC string length, a CAM message frequency and/or a vehicle type.

In addition, the target vehicle may transmit the vehicle information to the subject vehicle through V2X communication. For this, the V2V messaging entity may forward the vehicle information to the network/transport layer and the access layer, and the network/transport layer and the access layer may transmit the vehicle information to the subject vehicle through V2X communication.

At this time, processing for a transmission of the vehicle information may be performed in each entity and layer. For example, the CACC V2V messaging entity may generate a V2V message including the vehicle information, and may forward this to the network/transport layer and the access layer. In addition, the network/transport layer and the access layer may generate a radio signal by performing network/transport layer processing and access layer processing, and transmit the radio signal to the subject vehicle through V2X communication. Through this procedure, the vehicle information may be forwarded from the CACC V2V messaging entity of the target vehicle to the network and transport layer and the access layer, and forwarded to the subject vehicle through V2X communication.

Next, in describing an operation of a roadside ITS-S/V2X communication apparatus, the roadside ITS-S may transmit environmental information to a subject vehicle through I2V communication. As an embodiment, the environmental information may include a speed limit, a curve degree, the number of lanes, whether to allow CACC, whether to limit a CACC string length and the limited length, whether to limit the number of CACC strings and the limited number, traffic situation, a road surface state and/or a weather state.

The roadside ITS-S may transmit the environmental information to the subject vehicle through I2V communication using I2V messaging entity. At this time, the processing for transmitting the environmental information may be performed in the roadside ITS-S entity and layer. For example, the I2V messaging entity may generate an I2V message including the vehicle information, and forward this to the network/transport layer and the access layer. In addition, the network/transport layer and the access layer may generate a radio signal by performing network/transport layer processing and access layer processing, and transmit the radio signal to the subject vehicle through I2V communication. Through this procedure, the environmental information may be forwarded to the network/transport layer and the access layer from the I2V messaging entity, and transmitted to the subject vehicle through I2V communication.

Next, in describing an operation of a subject vehicle (a vehicle ITS-S of the subject vehicle/V2X communication apparatus), the subject vehicle may turn on a CACC application. When the CACC application is turned on, the subject vehicle may switch a CACC state from a CACC disabled state to a CACC enabled state and a TV discovery state. For example, when the CACC application is turned on, the CACC application may forward a CACC enabling signal/message to a CACC management entity, and the CACC management entity that receives it may switch the CACC state from a CACC disabled state to a CACC enabled state and a TV discovery state. In this case, the CACC management entity may forward CACC status information to the CACC application and/or the HMI support entity. The HMI support entity may forward the CACC status information to the HMI.

The subject vehicle may display the CACC status information using the HMI. Through this, the CACC status information may be provided to a user.

The subject vehicle may collect the vehicle information (SV information) of the subject vehicle using the vehicle and sensing information collection entity. The vehicle and sensing information collection entity may collect the vehicle information and forward the collected vehicle information to the CACC application. That is, the CACC vehicle and sensing information collection entity may forward the collected vehicle information to the CACC management entity directly, without going through the CACC application.

The subject vehicle may receive the vehicle information (SV information) of the subject vehicle from a target vehicle through V2X communication. In this case, the subject vehicle may perform a reverse operation of the operation for transmitting the vehicle information of the target vehicle. For example, the access layer and the network/transport layer of the subject vehicle may forward a V2V message including the vehicle information to the CACC V2V/I2V messaging entity by performing access layer processing and network/transport layer processing. The CACC V2V/I2V messaging entity of the subject vehicle may obtain the vehicle information by processing the V2X message. Through such a procedure, the vehicle information may be received in the subject vehicle through V2X communication, and forwarded to the V2V/I2V messaging entity. Later, the CACC V2V/I2V messaging entity may forward the obtained vehicle information to the CACC management entity.

The subject vehicle may receive environmental information from the roadside ITS-S through I2V communication. In this case, the subject vehicle may perform a reverse operation of the operation for transmitting the environmental information of the roadside ITS-S. For example, the access layer and the network/transport layer may perform access layer processing and network/transport layer processing, and forward an I2V message including the environmental information to the CACC V2V/I2V messaging entity. The CACC V2V/I2V messaging entity may obtain the environmental information by processing the I2V message. Through such a procedure, the environmental information may be received in the subject vehicle through V2X communication, and forwarded to the V2V/I2V messaging entity. Later, the CACC V2V/I2V messaging entity may forward the obtained environmental information to the CACC management entity. Meanwhile, according to an embodiment, the CACC V2V/I2V messaging entity may forward the vehicle information and the environmental information to the CACC management entity together. Through this, the vehicle information and/or the environmental information of the target vehicle may be forwarded to the CACC management entity. That is, the CACC V2V/I2V messaging entity may forward the collected vehicle information and the environmental information to the CACC management entity directly, without going through the CACC application.

The subject vehicle may select a target vehicle using the CACC management entity. The CACC management entity may select a target vehicle using the vehicle information of the subject vehicle, the vehicle information of the target vehicle and/or the environmental information of the target vehicle, and forward the information for the selected target vehicle (selected target vehicle information) to the CACC application. In this case, the CACC application may forward an acknowledgement message to the CACC management entity. At this time, the acknowledgement message may include information for a time gap (time gap information).

When the acknowledgement message is received, the subject vehicle may switch the CACC state to the CACC activated state using the CACC management entity. The CACC management entity may switch the CACC state from the TV discovery state to the CACC activated state. In this case, the CACC management entity may forward the CACC state and the selected target vehicle information to the CACC application. In addition, the CACC management entity may forward the CACC state and the selected target vehicle information to the HMI support entity and the HMI support entity may forward it to the HMI entity.

The subject vehicle may display the CACC state and the target vehicle information using the HMI entity. Through this, the CACC state and the target vehicle information may be provided to a user.

FIG. 18 illustrates a CACC operation flow of a V2X communication apparatus including a CACC dedicated facility according to another embodiment of the present invention. Particularly, the embodiment of FIG. 18 shows an operation flow of the CACC Activated state. In the embodiment of FIG. 18, the architecture of a roadside ITS-S, a target vehicle and a subject vehicle follows the architecture of the roadside ITS-S, the target vehicle and the subject vehicle of FIG. 17. In FIG. 18, the repeated description with the contents described above in FIG. 17 is omitted.

In describing an operation of a target vehicle (vehicle ITS-S/V2X communication apparatus of the target vehicle) first with reference to FIG. 18, the target vehicle may collect vehicle information using the CACC vehicle and sensing information collection entity. In addition, the target vehicle may forward the vehicle information to the subject vehicle through V2X communication. The description in relation to such vehicle information collection and vehicle information forwarding is as described above in FIG. 17.

Next, in describing an operation of a roadside ITS-S/V2X communication apparatus, the roadside ITS-S may transmit environmental information to a subject vehicle through I2V communication. The description in relation to such a transmission of the environmental information is as described above in FIG. 13.

Later, an operation of a subject vehicle (a vehicle ITS-S of the subject vehicle/V2X communication apparatus) is described. In the embodiment of FIG. 18, it is assumed that the subject vehicle is in the CACC activated state. For example, through the procedure described above in FIG. 17, the subject vehicle may enter the CACC activated state from the TV discovery state.

The subject vehicle may collect the vehicle information using the CACC vehicle and sensing information collection entity. In addition subject vehicle may receive the vehicle information of the target vehicle from the target vehicle through V2X communication. In addition, the subject vehicle may receive environmental information from the roadside ITS-S through I2V communication. Through the procedure of collecting the vehicle information of the subject vehicle, receiving the vehicle information of the target vehicle and receiving the environmental information, the vehicle information of the subject vehicle, the vehicle information of the target vehicle and/or the environmental information to the CACC management entity. This is as described above in FIG. 17.

Later, the subject vehicle may calculate a target speed using the CACC management entity. The CACC management entity may calculate the target speed using the vehicle information of the subject vehicle, the vehicle information of the target vehicle and/or the environmental information.

In addition, the subject vehicle may determine whether a termination condition is satisfied using the CACC management entity. The termination condition is as described above in FIG. 12.

Furthermore, the subject vehicle may control the vehicle speed using a CACC vehicle control entity. For example, when the termination condition is not satisfied, the CACC management entity may forward the information for the target speed (target speed information) to the CACC vehicle control entity, and the CACC vehicle control entity may control the vehicle speed using the target speed information.

In addition, the subject vehicle may display the target speed information using the HMI entity. For example, when termination condition is not satisfied, the CACC management entity may forward the target speed information to the HMI support entity, and the HMI support entity may forward it to the HMI entity. In this case, the HMI entity may display the target speed information. Through this, the target speed information may be provided to a user.

FIG. 19 illustrates a CACC operation flow of a V2X communication apparatus including a CACC dedicated facility according to another embodiment of the present invention. Particularly, the embodiment of FIG. 19 shows an operation flow from the CACC Activated state to the CACC Terminated state. In the embodiment of FIG. 19, the architecture of a roadside ITS-S, a target vehicle and a subject vehicle follows the architecture of the roadside ITS-S, the target vehicle and the subject vehicle of FIG. 19. In FIG. 19, the repeated description with the contents described above in FIG. 17 and FIG. 18 is omitted.

In describing an operation of a target vehicle (vehicle ITS-S/V2X communication apparatus of the target vehicle) first with reference to FIG. 19, the target vehicle may collect vehicle information using the CACC vehicle and sensing information collection entity. In addition, the target vehicle may forward the vehicle information to the subject vehicle through V2X communication. The description in relation to such vehicle information collection and vehicle information forwarding is as described above in FIG. 17.

Next, in describing an operation of a roadside ITS-S/V2X communication apparatus, the roadside ITS-S may transmit environmental information to a subject vehicle through I2V communication. The description in relation to such a transmission of the environmental information is as described above in FIG. 17.

Later, an operation of a subject vehicle (a vehicle ITS-S of the subject vehicle/V2X communication apparatus) is described. In the embodiment of FIG. 19, it is assumed that the subject vehicle is in the CACC activated state. For example, through the procedure described above in FIG. 17, the subject vehicle may enter the CACC activated state from the TV discovery state.

The subject vehicle may collect the CACC vehicle information using the vehicle and sensing information collection entity. In addition subject vehicle may receive the vehicle information of the target vehicle from the target vehicle through V2X communication. In addition, the subject vehicle may receive environmental information from the roadside ITS-S through I2V communication. Through the procedure of collecting the vehicle information of the subject vehicle, receiving the vehicle information of the target vehicle and receiving the environmental information, the vehicle information of the subject vehicle, the vehicle information of the target vehicle and/or the environmental information to the CACC management entity. This is as described above in FIG. 17.

Later, the subject vehicle may calculate a target speed using the CACC management entity. This is as described above in FIG. 18. In addition, the subject vehicle may determine whether a termination condition is satisfied using the CACC management entity. The termination condition is as described above in FIG. 12.

When the termination condition is satisfied, the subject vehicle may switch the CACC state to the CACC terminated state. For example, when the termination condition is satisfied, the CACC management entity may switch the CACC state from the CACC activated state to the CACC terminated state. In this case, the CACC management entity may forward the CACC status information to the CACC application and/or the HMI support entity. The HMI support entity may forward CACC status information to the HMI, In addition, the subject vehicle may display the CACC status information using the HMI. Through this, the CACC status information may be provided to a user.

FIG. 20 illustrates a CACC operation flow of a V2X communication apparatus including a dedicated facility according to another embodiment of the present invention. Particularly, the embodiment of FIG. 20 shows an operation flow from the CACC Activated state to the CACC Disabled state. In the embodiment of FIG. 20, the architecture of a roadside ITS-S, a target vehicle and a subject vehicle follows the architecture of the roadside ITS-S, the target vehicle and the subject vehicle of FIG. 17. In FIG. 20, the repeated description with the contents described above in FIG. 17 to FIG. 19 is omitted.

In describing an operation of a target vehicle (vehicle ITS-S/V2X communication apparatus of the target vehicle) first with reference to FIG. 20, the target vehicle may collect vehicle information using the CACC vehicle and sensing information collection entity. In addition, the target vehicle may forward the vehicle information to the subject vehicle through V2X communication. The description in relation to such vehicle information collection and vehicle information forwarding is as described above in FIG. 17.

Next, in describing an operation of a roadside ITS-S/V2X communication apparatus, the roadside ITS-S may transmit environmental information to a subject vehicle through I2V communication. The description in relation to such a transmission of the environmental information is as described above in FIG. 17.

Later, an operation of a subject vehicle (a vehicle ITS-S of the subject vehicle/V2X communication apparatus) is described. In the embodiment of FIG. 20, it is assumed that the subject vehicle is in the CACC activated state. For example, through the procedure described above in FIG. 17, the subject vehicle may enter the CACC activated state from the TV discovery state.

The subject vehicle may collect the CACC vehicle information using the vehicle and sensing information collection entity. In addition subject vehicle may receive the vehicle information of the target vehicle from the target vehicle through V2X communication. In addition, the subject vehicle may receive environmental information from the roadside ITS-S through I2V communication. Through the procedure of collecting the vehicle information of the subject vehicle, receiving the vehicle information of the target vehicle and receiving the environmental information, the vehicle information of the subject vehicle, the vehicle information of the target vehicle and/or the environmental information to the CACC management entity. This is as described above in FIG. 17.

Later, the subject vehicle may calculate a target speed using the CACC management entity. This is as described above in FIG. 18. In addition, the subject vehicle may determine whether a termination condition is satisfied using the CACC management entity. The termination condition is as described above in FIG. 12.

In addition, the subject vehicle may turn off the CACC application. In this case, the CACC application may forward a CACC disabling signal/message to the CACC management entity.

Furthermore, when the CACC disabling message is received, the subject vehicle may switch the CACC state to the CACC disabled state. For example, when the CACC disabling message is received, the CACC management entity may switch the CACC state from the CACC activated state to the CACC disabled state. In this case, the CACC management entity may forward the CACC status information to the CACC application and/or the HMI support entity. The HMI support entity may forward CACC status information to the HMI.

In addition, the subject vehicle may display the CACC status information using the HMI. Through this, the CACC status information may be provided to a user.

As described above in FIGS. 17 to 20, in the case that a vehicle provides the CACC service using a dedicated facility, the CACC service may not required to be provided through the CACC application always, but may be directly provided by the CACC facility entity. In this case, after vehicle information, environmental information, and the like used for a target vehicle selection, a target speed calculation, a termination condition determination, and so on are transferred to the CACC application, the vehicle information, the environmental information, and the like need not to be processed in each entity of the facility layer through the CACC application, and accordingly, which may decrease latency for providing the CACC service.

Through the definition of the CACC architecture, the state switching model and the operation flow, a V2X communication apparatus may provide a CACC service that operates without an error actually. In addition, through the state switching model related to a termination condition, a CACC pair/string may be smoothly released/recombined. Furthermore, the operation flow may be simplified through the CACC dedicated facility layer entity, and accordingly, delay/latency for providing the CACC service may be reduced.

CACC Gap Enhancement

Hereinafter, it is described a problem when a CACC service is provided by considering a minimum time gap only and a method for solving the problem. Particularly, a method using a minimum safety distance is described.

Considering a time gap only, a distance between a target vehicle and a subject vehicle is as represented in Equation below.

$$d(t)=T \cdot v_s(t) \quad \text{[Equation 1]}$$

(Herein, d(t) is a distance between a target vehicle and a subject vehicle on a time instance (t), T is a predefined time gap, and $v_s(t)$ is a velocity of the subject vehicle on the time instance (t)).

Practically, it is difficult to keep the distance. When $v_s(t)$ becomes "0", d(t) becomes also "0", and accordingly, a consideration is required for a minimum safety distance for a safety margin, that is, a vehicle safety. For example, when a velocity of a vehicle is very low, in the case that a CACC service is provided by considering a minimum time gap only, the distance between target vehicle and the subject vehicle becomes too close. This may increase a collision risk between two vehicles. Accordingly, in providing a CACC service, the minimum safety distance needs to be considered together with the minimum time gap, and in this case, the minimum safety distance needs to be configured more than a distance required to avoid a collision. Therefore, the CACC service may be defined as a service for adjusting a velocity of the subject vehicle automatically so as to maintain a target time gap with the target vehicle while keeping the minimum safety distance from the target vehicle. Consequently, an interval between vehicles may be defined as the Equation below in the CACC.

$$T \geq T_{min} \& D \geq D_{min} \quad \text{[Equation 2]}$$

Herein, T is a time gap, and D is a distance gap. $T_{min}$ is a minimum time gap, and $D_{min}$ is a minimum distance gap.

Meanwhile, even in the case that a velocity change of the target vehicle occurs, as the amount of information for the target vehicle increases, the time gap and the distance gap may be kept with low variance. If these gaps may be kept with low variance, these gaps may be selected as minimum gaps that guarantee safety, that is, small values of the minimum time gap and the minimum distance gap. Consequently, this may improve traffic efficiency and reduce fuel consumption. Types of the information therefor are as below.

Distance information between a target vehicle and a subject vehicle

Velocity information of a target vehicle

Acceleration information of a target vehicle

In addition, in the case that the target vehicle obtains the above information more frequently and may adjust its own velocity with smaller intervals, the time gap and the distance gap may be maintained uniformly. At this time, the minimum time gap and the minimum distance gap may be selected as small values. Consequently, this may improve traffic efficiency and reduce fuel consumption.

Hereinafter, a CACC string management is described.

When a CACC string is elongated too much, this may degrade traffic efficiency. In addition, when an excessive number of CACC strings are existed simultaneously, this may degrade traffic efficiency. Accordingly, a proper control is required for a length of the CACC string and the number of CACC strings.

Hereinafter, firstly, it is described management, communication, format of a CACC string ID and a related target vehicle selection. In addition, it is described management, communication, format of CACC string length information and a related target vehicle selection. Further, it is described communication, format of a CACC string length limitation and a related target vehicle selection. In addition, it is described communication, format of a CACC string number limitation and a related target vehicle selection. Furthermore, it is described communication, format of CACC string lane position and a related target vehicle selection.

In addition, the embodiments in relation to the CACC string management that will be described below may also be applied to Platooning technique except the CACC technique. Here, the Platooning technique is a technique to establish a group for fuel consumption reduction and to keep a gap between group members to the minimum. This Platoon group may be managed by a front vehicle and a new member may join in, an existing member may leave, groups may be merged, a group may be separated, or a group itself may be released. The group management in the Platooning technique may be performed in the same or similar way as the CACC string management that will be described below. In this case, a CACC string may correspond to a Platooning group, and each of the information related to a CACC string may correspond to each of the information related to Platooning. For example, a CACC string ID may correspond to a Platooning group ID, and a CACC string length may correspond to Platooning group length.

CACC String ID (CSID) Management and Communication

When a CACC String Length (CSL) is checked, a V2X communication apparatus may receive a CSL value from a plurality of vehicles. In this case, a case may occur that it is difficult to distinguish whether the corresponding CSL value is a CSL value of a vehicle belonged to the same CACC string or a CSL value of a vehicle belonged to different CACC strings.

In addition, when a CACC String Number is checked, a V2X communication apparatus may determine whether it is a CACC activated vehicle using the information such as CSL and the like, but a case may occur that it is difficult to distinguish whether the CACC activated vehicles transmitting the information such as CSL and the like are belonged to the same CACC string or belonged to different CACC strings.

Owing to this reason, an ID of a CACC string is required. Such a CACC String ID (CSID) may be defined by a few exemplary methods below.

Simple Numbering Method

Table 1 below represents a CSID (DE_CACCStringID) defined by a Simple numbering method.

TABLE 1

| | |
|---|---|
| Descriptive Name | CACCStringID |
| Identifier | DataType_xxx |
| ASN.1 representation | CACCStringID ::= INTEGER(0..1000) |
| Definition | This DE (Data Element) identifies the CACC string. |
| Unit | N/A |

The CSID is a DE, and identifies a CACC string. For example, a CSID may be an integer from 0 to 1000 that identifies a CACC string.

A subject vehicle may receive CSID values located in a current corresponding region in a target vehicle discovery procedure. For example, in the case that the subject vehicle joins/participates in a CACC string existed in the current corresponding region, the subject vehicle may receive and store a CSID value from a target vehicle, and broadcast it. For another example, in the case that the subject vehicle generates a new CACC string, not joining in the CACC string existed in the current corresponding region, the subject vehicle may add 1 to the maximum value among the CSID values received from the discovered CACC string(s), store it as an ID of the newly generated CACC string, and broadcast it. In the case that there is no CACC string existed in the current corresponding region, the ID of the newly generated CACC string may be 1.

Method of Using a Network Address

Table 2 below represents a CSID (DE_CACCStringID) defined by a network address using method.

TABLE 2

| | |
|---|---|
| Descriptive Name | CACCStringID |
| Identifier | DataType_xxx |

TABLE 2-continued

| ASN.1 representation | CACCStringID ::= BIT STRING (64) Or CACCStringID ::= OCTET STRING (8) |
|---|---|
| Definition | This DE (Data Element) identifies the CACC string. |
| Unit | N/A |

The CSID is a DE, and identifies a CACC string. For example, a CSID may be a bit string or an octet string that identifies a CACC string. In this case, the bit string or the octet string may indicate a network address (e.g., MAC address) of a vehicle.

A subject vehicle may receive CSID values located in a current corresponding region in a target vehicle discovery procedure. For example, in the case that the subject vehicle joins/participates in a CACC string existed in the current corresponding region, the subject vehicle may receive and store a CSID value from a target vehicle, and broadcast it. For another example, in the case that the subject vehicle generates a new CACC string, not joining in the CACC string existed in the current corresponding region, the subject vehicle may store the MAC address of the target vehicle using an ID of the newly generated string and broadcast it. Using this method, there is an advantage that uniqueness of a CSID may be guaranteed.

CACC String Length (CSL) Management and Communication

A method of managing a length of decentralized CACC string may be one of the following exemplary methods.

Order in String (OIS) Method

In the embodiment below, for the convenience of description, it is assumed that an OIS value is set except for a lead vehicle of a CACC string. For example, it is assumed that the OIS value of the first CACC vehicle having the lead vehicle as a target vehicle is set to 1, and the OIS value of the second CACC vehicle having the first vehicle as a target vehicle is set to 2. However, the embodiment of setting the OIS value is not limited thereto, but the OIS value may be set including the lead vehicle of the CACC string, according to an embodiment. For example, the OIS value of the lead vehicle in the CACC string may be set to 1, and the OIS value of the first CACC vehicle having the lead vehicle as a target string may be set to 2. In this case, the lead vehicle may be a CACC vehicle having the CACC function.

FIG. 21 illustrates a method for determining an OIS value of a vehicle newly joining at an end of a CACC string according to an embodiment of the present invention.

As shown in the upper part of FIG. 21, in the case that a CACC string is not established, OIS information and CSID information are not transmitted.

As shown in the middle part of FIG. 21, in the case that a CACC string (or pair) is established, OIS information and CSID information may be generated and transmitted. For example, as shown in the drawing, in the case that a single CACC pair is established, a vehicle in the CACC string may generate CSID information (CSID=aaabbb) and OIS information (OIS=1), and transmit it to a neighboring vehicle.

As shown in the lower part of FIG. 21, in the case that a CACC activated vehicle joins at the rear end of the CACC string, the CACC activated vehicle (subject vehicle) may receive the OIS information and the CSID information from the target vehicle. In the case of receiving the OIS information, the subject vehicle may add 1 to the OIS value received from the target vehicle, and store it as its own OIS value. For example, as shown in the drawing, the newly joining subject vehicle may receive the OIS information (OIS=1) and the CSID information (CSID=aaabbb) from the target vehicle, and set a value of the OIS value added by 1 as its own OIS value. Otherwise, in the case of unable to receive the OIS information, the subject vehicle may set its own OIS value as 1, and store it.

For another example, in the case that the subject vehicle receives an OIS value from several vehicles in a CACC string in the discovery procedure, the subject vehicle may add 1 to the maximum value among the received OIS values, and store it as its own OIS value.

FIG. 22 illustrates a method for determining an OIS value of a vehicle newly joining at a middle of a CACC string according to an embodiment of the present invention.

As shown in the upper part of FIG. 22, a subject vehicle may newly join at the middle of a CACC string. At this time, each CACC vehicle in the CACC string may store CSID information and OIS information. In this case, each CACC vehicle except a lead vehicle of the CACC string may have sequential OIS values. For example, as shown in the drawing, the first CACC vehicle in the CACC string except the lead vehicle may have value 1 as the OIS value, the second CACC vehicle may have value 2 as the OIS value, and the tenth CACC vehicle may have value 10 as the OIS value. In this case, the target vehicle of the first CACC vehicle corresponds to the lead vehicle of the CACC string.

As shown in the lower part of FIG. 22, in the case that a CACC activated vehicle joins at the middle of the CACC string, the CACC activated vehicle (subject vehicle) may receive the OIS information and the CSID information from the target vehicle. In this case, the subject vehicle may add 1 to the OIS value received from the target vehicle, and store it as its own OIS value. For example, as shown in the drawing, the newly joining subject vehicle may receive the OIS information (OIS=1) and the CSID information (CSID=2) from the target vehicle, and set a value of the OIS value added by 1 as its own OIS value. For another example, in the case that the subject vehicle receives an OIS value from several vehicles in a CACC string in the discovery procedure, the subject vehicle may add 1 to the maximum value among the OIS values of the vehicles that go ahead of itself among the received OIS values, and store it as its own OIS value.

Meanwhile, in the case that a vehicle having an OIS value already receives an OIS value greater than or equal to its own OIS value from a vehicle that belongs to the same CACC string and goes ahead of itself, the vehicle may update its own OIS value as the value of the maximum value among the OIS values of the vehicles that go ahead of itself added by 1. For example, as shown in the drawing, as a new CACC vehicle joins between a vehicle having OIS=1 and a vehicle having OIS=2, the vehicle having OIS=2 to the vehicle having OIS=10 may update their own OIS values in the method of increasing by 1 as the corresponding OIS value.

FIG. 23 illustrates a method for determining an OIS value of a vehicle leaving from a middle of a CACC string according to an embodiment of the present invention.

As shown in the upper part of FIG. 23, in the case that a CACC vehicle in a CACC string leaves from a middle of the CACC string, the leaving vehicle may broadcast "leave" message.

In an embodiment, in the case that the leaving vehicle decides not to broadcast the "leave message", a remaining vehicle may update its own OIS value through the OIS value of other vehicle, which is periodically received. In this case, the remaining vehicle may update/set the maximum value among the OIS value of the vehicle that goes ahead of itself added by 1 as its own OIS value. This procedure should be repeated continually during the CACC string is maintained.

As another embodiment, in the case that the leaving vehicle decides to broadcast the "leave message", a remaining vehicle may update its own OIS value through the OIS value of other vehicle, which is periodically received. For example, the remaining vehicle may update/set the maximum value among the OIS value of the vehicle that goes ahead of itself added by 1 as its own OIS value. However, this procedure may be performed only when the "leave" message is received. Otherwise, in the case that the leaving vehicle is decided to broadcast the "leave message", a remaining vehicle may update its own OIS value through the OIS value in the received "leave message". For example, in the case that an OIS value is included in the "leave message" and this OIS value is smaller than its own OIS value, the remaining vehicle may update/set its own OIS value subtracted by 1 as its own OIS value.

Meanwhile, in the embodiments described above, the determination of the vehicle that goes ahead of itself may be performed by using vehicle position information forwarded through a message forwarded/received periodically. As an embodiment, all CACC activated vehicles in the CACC string may broadcast its own OIS information and CSID information periodically for other CACC vehicle. Tables 3 and 4 below represent an example of OIS information and CSID information, respectively.

Table 3 represents an example of OIS information (DE_OrderInString).

TABLE 3

| Descriptive Name | OrderInString |
|---|---|
| Identifier | DataType_xxx |
| ASN.1 representation | OrderInString ::= INTEGER(0..1000) |
| Definition | This DE (Data Element) indicates the Subject Vehicle's current order in the CACC string. |
| Unit | N/A |

The OIS information is a DE, and indicates a current order of a subject vehicle in a CACC string. For example, the OIS information may be an integer from 0 to 1000 that identifies the current order of a subject vehicle in a CACC string.

Table 4 represents an example of CACC information (DF_CACCInfo).

TABLE 4

| Descriptive Name | CACCInfo |
|---|---|
| Identifier | DataType_xxx |
| ASN.1 representation | CACCInfo ::=SEQUENCE { CACCStringID CACCStringID, orderInString OrderInString } |
| Definition | This DF (Data Frame) indicates the CACC String ID and Subject Vehicle's current order in the CACC string. |
| Unit | N/A |

The CACC information is a DE, and indicates a CACC string ID (CSID) and a current order of a subject vehicle in a CACC string. That is, the CACC information may include CSID information and OIS information.

CACC String Length (CSL)

In the embodiment below, for the convenience of description, it is assumed that a CSL value is set as the number of vehicles in a CACC string except for a lead vehicle of the CACC string. For example, in the case that there are the lead vehicle, the first CACC vehicle having the lead vehicle as a target vehicle and the second CACC vehicle having the first CACC vehicle as a target vehicle, the CSL value may be set to 2. However, the embodiment of setting the CSL value is not limited thereto. According to an embodiment, the CSL value may be set as the number of vehicles in the CACC string including the lead vehicle of the CACC string. Otherwise, the CSL value may be set as an actual length of the CACC string, not the number of vehicles in the CACC string. In this case, the actual length may be set as a distance between a lead vehicle and a following vehicle, or a distance between a vehicle having the lead vehicle as a target vehicle and a following vehicle.

FIG. 24 illustrates a method for determining a CSL value of a vehicle newly joining at an end of a CACC string according to an embodiment of the present invention.

As shown in the upper part of FIG. 24, in the case that a CACC string is not established, CSL information and CSID information are not transmitted.

As shown in the middle part of FIG. 24, in the case that a CACC string (or pair) is established, CSL information and CSID information may be generated and transmitted. For example, as shown in the drawing, in the case that a single CACC pair is established, a vehicle in the CACC string may generate CSID information (CSID=aaabbb) and CSL information (CSL=1), and transmit it to a neighboring vehicle.

As shown in the lower part of FIG. 24, in the case that a CACC activated vehicle joins at the rear end of the CACC string, the CACC activated vehicle (subject vehicle) may receive the CSL information and the CSID information from the target vehicle. In the case of receiving the CSL information, the subject vehicle may add 1 to the CSL value received from the target vehicle, and store it as its own CSL value. For example, as shown in the drawing, the newly joining subject vehicle may receive the CSL information (CSL=1) and the CSID information (CSID=aaabbb) from the target vehicle, and set a value of the CSL value added by 1 as its own CSL value. Otherwise, in the case of unable to receive the CSL information, the subject vehicle may set its own CSL value as 1, and store it.

As an embodiment, in the case a vehicle joins in a CACC string, it may be standardized that the joining vehicle may transmit "join" message. That is, when joining in a CACC string, the subject vehicle may determine whether to transmit "join" message.

In an embodiment, in the case the joining vehicle decides not to transmit "join" message, when the vehicle having a CSL value already receives a CSL value greater than its own CSL value from a vehicle belonged to the same CACC string, the vehicle may update its own CSL value as the newly received CSL value.

In another embodiment, in the case the joining vehicle decides to transmit "join" message, when the vehicle having a CSL value already receives "join" message, the vehicle may update its own CSL value as its own CSL value added by 1. For example, as shown in the drawing, the newly joining subject vehicle may transmit "join" message, and the vehicle that receives "join" message (e.g., a target vehicle of the newly joining subject vehicle) may update the value of the CSL value (CSL=1) already owned added by 1 (CSL=2) as its own CSL value.

FIG. 25 illustrates a method for determining a CSL value of a vehicle leaving from an end of a CACC string according to an embodiment of the present invention.

As shown in the upper part of FIG. 25, in the case that a CACC vehicle in a CACC string leaves from a rear end of the CACC string, the leaving vehicle should broadcast "leave" message.

As shown in the lower part of FIG. 25, when receiving "leave message", a remaining vehicle may update a value of its own CSL value subtracted by 1 as its own CSL value. For example, as shown in the drawing, when receiving "leave message", the remaining vehicle may update the CSL value (CSL=2) already owned subtracted by 1 (CSL=1) as its own CSL value.

FIG. 26 illustrates a method for determining a CSL value of a vehicle newly joining at a middle of a CACC string according to an embodiment of the present invention.

As shown in the upper part of FIG. 26, a subject vehicle may newly join at the middle of a CACC string. At this time, each CACC vehicle in the CACC string may store CSID information and CSL information. In this case, all CACC vehicles in the same CACC string have the same CSL value. For example, as shown in the drawing, all CACC vehicles in the CACC string except a lead vehicle may have value 10 as the CSL value.

As shown in the lower part of FIG. 26, in the case that a CACC activated vehicle joins at the middle of the CACC string, the CACC activated vehicle (subject vehicle) may receive the CSID information and/or the CSL information from the target vehicle. In this case, the subject vehicle may add 1 to the CSL value received from the target vehicle, and store it as its own CSL value. For example, as shown in the drawing, when the newly joining subject vehicle may receive the CSL information (CSL=10) and the CSID information (CSID=2) from the target vehicle, subject vehicle may set a value of the CSL value added by 1 as its own CLS value.

As an embodiment, in the case a vehicle joins in a CACC string, it may be standardized that the joining vehicle may transmit "join" message. That is, when joining in a CACC string, the subject vehicle may determine whether to transmit "join" message.

In an embodiment, in the case the joining vehicle decides not to transmit "join" message, when the vehicle having a CSL value already receives a CSL value greater than its own CSL value from a vehicle belonged to the same CACC string, the vehicle may update its own CSL value as the newly received CSL value.

In another embodiment, in the case the joining vehicle decides to transmit "join" message, when the vehicle having a CSL value already receives "join" message, the vehicle may update its own CSL value as its own CSL value added by 1. For example, as shown in the drawing, the newly joining subject vehicle may transmit "join" message, and the vehicle that receives "join" message may update the value of the CSL value (CSL=10) already owned added by 1 (CSL=11) as its own CSL value.

FIG. 27 illustrates a method for determining an OIS value of a vehicle leaving from a middle of a CACC string according to an embodiment of the present invention.

As shown in the upper part of FIG. 27, in the case that a CACC vehicle in a CACC string leaves from a middle of the CACC string, the leaving vehicle should broadcast "leave" message.

As shown in the lower part of FIG. 27, when receiving "leave message", a remaining vehicle may update a value of its own CSL value subtracted by 1 as its own CSL value. For example, as shown in the drawing, when receiving "leave message", the remaining vehicle may update the CSL value (CSL=11) already owned subtracted by 1 (CSL=10) as its own CSL value.

As an embodiment, all CACC activated vehicles in a CACC string may broadcast their own CSL information and CSID information periodically. In this case, there is an advantage that a value of CACC string length is known even in the case that the information is received from any vehicle in the CACC string. Tables 5 and 6 below represent an example of CSL information and CACC information, respectively.

Table 5 represents an example of CSL information (DE_CACCStringLength).

TABLE 5

| | |
|---|---|
| Descriptive Name | CACCStringLength |
| Identifier | DataType_xxx |
| ASN.1 representation | CACCStringLength ::= INTEGER(0 . . 1000) |
| Definition | This DE (Data Element) indicates the length of the CACC string. |
| Unit | N/A |

The CSL information is a DE, and indicates a length of a CACC string. For example, the CSL information may be an integer from 0 to 1000 indicating a length of a CACC string.

Table 6 represents CACC information (DF_CACCInfo).

TABLE 6

| | |
|---|---|
| Descriptive Name | CACCInfo |
| Identifier | DataType_xxx |
| ASN.1 representation | CACCInfo ::= SEQUENCE { CACCStringID CACCStringID, CACCString Length CACCString Length } |
| Definition | This DF (Data Frame) indicates the CACC String ID, and the length of the CACC string. |
| Unit | N/A |

The CACC information is a DE, and indicates a CACC string ID (CSID) and a length of CACC string. That is, the CACC information may include the CSID information and the CSL information.

OIS and CSL

Hereinafter, an embodiment is described that a CACC vehicle transmits the OIS information and the CSL information together.

FIG. 28 illustrates a method for determining an OIS value and a CSL value of a newly joining vehicle at an end of a CACC string according to an embodiment of the present invention.

As shown in the upper part of FIG. 28, in the case that a CACC string is not established, OIS information, CSL information and CSID information are not transmitted.

As shown in the middle part of FIG. 28, in the case that a CACC string (or pair) is established, OIS information, CSL information and/or CSID information may be generated and transmitted. For example, as shown in the drawing, in the case that a single CACC pair is established, a subject vehicle may generate OIS information (OIS=1), CSL information (CSL=1) and CSID information (CSID=aaabbb) and transmit it to a neighboring vehicle.

As shown in the lower part of FIG. 28, in the case that a CACC activated vehicle joins at the rear end of the CACC string, the CACC activated vehicle (subject vehicle) may receive the OIS information, the CSL information and/or the CSID information from the target vehicle. In the case of receiving the OIS information and the CSL information, the subject vehicle may add 1 to the OIS value received from the target vehicle, and store it as its own OIS value, and add 1 to the CSL value received from the target vehicle, and store it as its own CSL value. For example, as shown in the drawing, the newly joining subject vehicle may receive the OIS information (OIS=1), the CSL information (CSL=1) and the CSID information (CSID=aaabbb) from the target vehicle, and set a value of the OIS value added by 1 as its own OIS value, and set a value of the CSL value added by 1 as its own CSL value. Otherwise, in the case of unable to receive the OIS information and the CSL information, the subject vehicle may set its own OIS value and CSL value as 1, and store it.

For another example, in the case that the subject vehicle receives the OIS value and the CSL value from several vehicles in a CACC string in the discovery procedure, the subject vehicle may store a maximum value among the received OIS values added by 1 as its own OIS value, and may store the received (the same) CSL value added by 1 as its own CSL value.

As an embodiment, in the case a vehicle joins in a CACC string, it may be standardized that the joining vehicle may transmit "join" message. That is, when joining in a CACC string, the subject vehicle may determine whether to transmit "join" message.

In an embodiment, in the case the joining vehicle decides not to transmit "join" message, when the vehicle having an OIS value and a CSL value already receives a CSL value greater than its own CSL value from a vehicle belonged to the same CACC string, the vehicle may update its own CSL value as the newly received CSL value.

In another embodiment, in the case the joining vehicle decides to transmit "join" message, when the vehicle having an OIS value and a CSL value already receives "join" message, the vehicle may update its own CSL value as its own CSL value added by 1. For example, as shown in the drawing, the newly joining subject vehicle may transmit "join" message, and the vehicle that receives "join" message (e.g., a target vehicle of the newly joining subject vehicle) may update the value of the CSL value (CSL=1) already owned added by 1 (CSL=2) as its own CSL value.

FIG. 29 illustrates a method for determining an OIS value and a CSL value of a vehicle leaving from an end of a CACC string according to an embodiment of the present invention.

As shown in the upper part of FIG. 29, in the case that a CACC vehicle in a CACC string leaves from a rear end of the CACC string, the leaving vehicle should broadcast "leave" message.

As shown in the lower part of FIG. 29, when receiving "leave message", a remaining vehicle may update a value of its own CSL value subtracted by 1 as its own CSL value. For example, as shown in the drawing, when receiving "leave message", the remaining vehicle may update the CSL value (CSL=2) already owned subtracted by 1 (CSL=1) as its own CSL value.

FIG. 30 illustrates a method for determining an OIS value and a CSL value of a vehicle newly joining at a middle of a CACC string according to an embodiment of the present invention.

As shown in the upper part of FIG. 30, a subject vehicle may newly join at the middle of a CACC string. At this time, each CACC vehicle in the CACC string may store OIS information, CSID information and CSL information. In this case, all CACC vehicles in the same CACC string have the same CSL value. For example, as shown in the drawing, all CACC vehicles in the CACC string except a lead vehicle may have value 10 as the CSL value.

As shown in the lower part of FIG. 30, in the case that a CACC activated vehicle joins at the middle of the CACC string, the CACC activated vehicle (subject vehicle) may receive the OIS information, the CSL information and/or the CSID information from the target vehicle. In this case, the subject vehicle may add 1 to the OIS value received from the target vehicle and store it as its own OIS value, and may add 1 to the CSL value received from the target vehicle and store it as its own CSL value. For example, as shown in the drawing, when the newly joining subject vehicle may receive the OIS information (OIS=1), the CSL information (CSL=10) and the CSID information (CSID=2) from the target vehicle, subject vehicle may set a value of the OIS value (OIS=2) added by 1 as its own OIS value and set a value of the CSL value (CSL=11) added by 1 as its own CLS value. For another example, in the case that the subject vehicle receives the OIS value from several vehicles in a CACC string, the subject vehicle may add 1 to the maximum value among the OIS values of a vehicle ahead of itself, and may store it as its own OIS value.

Meanwhile, in the case that a vehicle having an OIS value already receives an OIS value greater than or equal to its own OIS value from a vehicle that belongs to the same CACC string and goes ahead of itself, the vehicle may update its own OIS value as the value of the maximum value among the OIS values of the vehicles that go ahead of itself added by 1. For example, as shown in the drawing, as a new CACC vehicle joins between a vehicle having OIS=1 and a vehicle having OIS=2, the vehicle having OIS=2 to the vehicle having OIS=10 may update their own OIS values in the method of increasing by 1 as the corresponding OIS value.

As an embodiment, in the case a vehicle joins in a CACC string, it may be standardized that the joining vehicle may transmit "join" message. That is, when joining in a CACC string, the subject vehicle may determine whether to transmit "join" message.

In an embodiment, in the case the joining vehicle decides not to transmit "join" message, when the vehicle having a CSL value already receives a CSL value greater than its own CSL value from a vehicle belonged to the same CACC string, the vehicle may update its own CSL value as the newly received CSL value.

In another embodiment, in the case the joining vehicle decides to transmit "join" message, when the vehicle having a CSL value already receives "join" message, the vehicle may update its own CSL value as its own CSL value added by 1. For example, as shown in the drawing, the newly joining subject vehicle may transmit "join" message, and the vehicle that receives "join" message may update the value of the CSL value (CSL=10) already owned added by 1 (CSL=11) as its own CSL value.

FIG. 31 illustrates a method for determining an OIS value and a CSL value of a vehicle leaving from a middle of a CACC string according to an embodiment of the present invention.

As shown in the upper part of FIG. 27, in the case that a CACC vehicle in a CACC string leaves from a middle of the CACC string, the leaving vehicle should broadcast "leave" message.

As shown in the lower part of FIG. 27, when receiving "leave message", a remaining vehicle may update a value of its own CSL value subtracted by 1 as its own CSL value. For example, as shown in the drawing, when receiving "leave message", the remaining vehicle may update the CSL value (CSL=11) already owned subtracted by 1 (CSL=10) as its own CSL value.

As an embodiment, a remaining vehicle may update its own OIS value through the OIS value of other vehicle, which is periodically received. For example, the remaining vehicle may update/set the maximum value among the OIS value of the vehicle that goes ahead of itself added by 1 as its own OIS value. However, this procedure may be performed may be repeated continually while the CACC string is maintained or only when the "leave" message is received. Otherwise, a remaining vehicle may update its own OIS value through the OIS value in the received "leave message". For example, in the case that an OIS value is included in the "leave message" and this OIS value is smaller than its own OIS value, the remaining vehicle may update/set its own OIS value subtracted by 1 as its own OIS value.

As an embodiment, all CACC activated vehicles in a CACC string may broadcast their own OIS information, CSL information and CSID information periodically. In this case, there is an advantage that a value of CACC string length is known even in the case that the information is received from any vehicle in the CACC string. In addition, there is an advantage that the last vehicle of the CACC string may be easily identified when the OIS information and the CSL information are broadcasted together. Tables 7 and 8 below represent an example of CSL information and CACC information, respectively.

Table 7 represents an example of CSL information (DE_CACCStringLength).

TABLE 7

| | |
|---|---|
| Descriptive Name | CACCStringLength |
| Identifier | DataType_xxx |
| ASN.1 representation | CACCStringLength ::= INTEGER(0 . . 1000) |
| Definition | This DE (Data Element) indicates the length of the CACC string. |
| Unit | N/A |

The CSL information is a DE, and indicates a length of a CACC string. For example, the CSL information may be an integer from 0 to 1000 indicating a length of a CACC string.

Table 8 represents CACC information (DF_CACCInfo).

TABLE 8

| | |
|---|---|
| Descriptive Name | CACCInfo |
| Identifier | DataType_xxx |
| ASN.1 representation | CACCInfo ::= SEQUENCE {<br>CACCStringID CACCStringID,<br>orderInString OrderInString,<br>CACCStringLength CACCStringLength<br>} |
| Definition | This DF (Data Frame) indicates the CACC String ID, Subject Vehicle's current order in the CACC string and the length of the CACC string. |
| Unit | N/A |

The CACC information is a DE, and indicates a CACC string ID (CSID), a current order of a subject vehicle in a CACC string and a length of CACC string. That is, the CACC information may include the CSID information, the OIS information and the CSL information.

Join/Leave Messaging and OIS

As described above, a CACC activated vehicle (subject vehicle) may receive CSID information and OIS information form a target vehicle. When receiving the information, the subject vehicle may add 1 to the OIS value received from the target vehicle, and store it as its own OIS value. Otherwise, when failing to receive the information, the subject vehicle may store its own OIS value as 1.

Meanwhile, according to an embodiment, the following scenario may be embodied together with or by substituting the scenarios described in FIGS. 21 to 31.

For example, when joining in a CACC string, the subject vehicle may broadcast the CSID information and "join" message. In this case, the other vehicles that receive the "join" message in the corresponding CACC string may not broadcast the OIS value any more, but only newly joining vehicles may broadcast the OIS value together with the CSID.

For another example, when leaving the CACC string, the subject vehicle may broadcast the CSID information and "leave" message. In this case, only the vehicle having the OIS value smaller than the received OIS value among the other vehicles in the corresponding CACC string that receive the "leave" message may broadcast the OIS value after the time.

Table 9 represents an example of JoinLeave message (DE_JoinLeave).

TABLE 9

| | |
|---|---|
| Descriptive Name | JoinLeave |
| Identifier | DataType_xxx |
| ASN.1 representation | JoinLeave ::= BOOLEAN |
| Definition | This DE (Data Element) indicates whether "join in" or "leave from" a CACC string. "1" means "join" and "0" means "leave". |
| Unit | N/A |

The JoinLeave message is a DE, and may indicate whether a subject vehicle joins in a CACC string or leaves from a CACC string. That is, the JoinLeave message may indicate whether a subject vehicle joins in a CACC string or leaves from a CACC string. For example, a first value (e.g., "1") of the JoinLeave message means "join" and a second value (e.g., "2") of the JoinLeave message indicates "leave". That is, when it is set as the first value (e.g., "1"), the JoinLeave message indicates that the subject vehicle joins in the CACC string, and when it is set as the second value (e.g., "2"), the JoinLeave message indicates that the subject vehicle leaves from the CACC string.

Table 10 represents an example of CACC member information (DF_CACCMember).

TABLE 10

| | |
|---|---|
| Descriptive Name | CACCMember |
| Identifier | DataType_xxx |
| ASN.1 representation | CACCMember ::= SEQUENCE {<br>CACCStringID CACCStringID,<br>JoinLeave JoinLeave<br>} |
| Definition | This DF (Data Frame) indicates the CACC String ID, and indicate whether "join in" or "leave from" the CACC string. |
| Unit | N/A |

The CACC member information is a DF, and may indicates CSID information, and indicate whether a subject vehicle joins in a CACC string or leaves from a CACC string. That is, the CACC member information may include the CSID information and the JoinLeave message/information.

Table 11 represents an example of CACC information (DF_CACCInfo).

TABLE 11

| | |
|---|---|
| Descriptive Name | CACCInfo |
| Identifier | DataType_xxx |
| ASN.1 representation | CACCInfo ::= SEQUENCE {<br>CACCStringID CACCStringID,<br>orderInString OrderInString,<br>forming BOOLEAN OPTIONAL<br>} |

TABLE 11-continued

| | |
|---|---|
| Definition | This DF (Data Frame) indicates the CACC String ID, Subject Vehicle's current order in the CACC string and indicate whether "join in" or "leave from" the CACC string. "forming" = 1 means "join" and "forming" = 0 means "leave". Otherwise, "forming" shall not exist (e.g., staying in the string). |
| Unit | N/A |

The CACC information is a DF, and may indicate a CACC string ID (CSID) and a current order of a subject vehicle in a CACC string, and indicate whether a subject vehicle joins in a CACC string or leaves from a CACC string. As an embodiment, the CACC information may include the CSID information, the OIS information and/or "forming" information. A first value (e.g., "1") of the "forming" information means "join" and a second value (e.g., "2") of the "forming" information indicates "leave". Otherwise, the "forming" information should not be existed (e.g., in the case of remaining in a CACC string). The "forming" information may also be referred to as Join Leave message/information.

Indication of CACC String Last Vehicle (CSLV)

When a CACC string is generated, the last vehicle in the CACC string may indicate CACC String's Last Vehicle (CSLV). That is, the last vehicle in the CACC string may indicate that the vehicle itself is the last vehicle in the CACC string. As an embodiment, the last vehicle in the CACC string may transmit the CSLV information, and may indicate that the vehicle itself is the last vehicle in the CACC string. Table 12 is an example of the CSLV information (DE_CACCStringLastVehicle).

TABLE 12

| | |
|---|---|
| Descriptive Name | CACCStringLastVehicle |
| Identifier | DataType_xxx |
| ASN.1 representation | CACCStringLastVehicle ::= BOOLEAN |
| Definition | This DE (Data Element) identifies if the vehicle is the last vehicle in a CACC string. The value "1" means that it is the last vehicle. The value "0" means that it is not the last vehicle. |
| Unit | N/A |

The CSLV information is a DE, and may identify that a vehicle is the last vehicle in a CACC string. For example, a first value (e.g., "1") of the CSLV information may mean that a vehicle is the last vehicle and a second value (e.g., "2") of the CSLV information may mean that a vehicle is not the last vehicle. That is, when it is set as the first value (e.g., "1"), the CSLV information indicates that a vehicle is the last vehicle in a CACC string, and when it is set as the second value (e.g., "2"), the CSLV information indicates that a vehicle is not the last vehicle in a CACC string.

Meanwhile, the other vehicle in the CACC string may not broadcast the CSLV information, or indicate that the vehicle is not the last vehicle.

CACC String Last Vehicle Position (CSLVP)

FIG. 32 illustrates a method of indicating a CACC string length with the number of vehicles or a geometrical distance according to an embodiment of the present invention.

As shown in FIG. 32, a CACC string length may be defined as the number of vehicles that construct the CACC string, or may also be defined as a geometrical distance of the CACC string. At this time, the geometrical distance may be a distance between a forefront vehicle (lead vehicle) and a rear end vehicle (the last vehicle). For example, as shown in the drawing, a CACC string length may be set as the number of vehicles (11) belonged to the CACC string or set as a geometrical distance (35 m) between the lead vehicle and the last vehicle.

In order to manage the CACC string length with the geometrical distance, the geometrical position information of the forefront vehicle (lead vehicle) of the CACC string needs to be shared among the vehicles of the CACC string.

FIG. 33 illustrates a method of sharing CSLVP information for a geometrical distance according to an embodiment of the present invention.

Referring to FIG. 33, a lead vehicle of a CACC string may transmit CSLVP information including its own geometrical position information. For example, as shown in the drawing, the lead vehicle may broadcast the CSLVP information that includes the information of its own latitude, longitude and/or altitude. The other vehicle in the CACC string may receive the CSLVP information and may obtain the geometrical position information of the lead vehicle.

Table 13 represents an example of the CSLVP information (DF_CACCStringLVPosition).

TABLE 13

| | |
|---|---|
| Descriptive Name | CACCStringLVPosition |
| Identifier | DataType_xxx |
| ASN.1 representation | CACCStringLVPosition ::= SEQUENCE { latitude Latitude, longitude Longitude, positionConfidenceEllipse PosConfidenceEllipse, altitude Altitude } |
| Definition | This DF (Data Frame) defines the geographical position of a CACC string's lead vehicle. |
| Unit | N/A |

The CSLVP information is a DF, and defines a geometrical position of a lead vehicle in a CACC string. For example, the CSLVP information may include information of latitude, longitude, position reliability and/or altitude of the lead vehicle in the CACC string.

CACC String Length Limit (CSLL)

A roadside station may broadcast a recommended or requested limit value of a CACC string length periodically by considering traffic condition, road topology, and the like of a region. For example, a roadside station (ITS-S) like an RSU may transmit CSLL information, and may provide a recommended or requested limit value of a CACC string length periodically. Table 14 represents an example of the CSLL information (DE_CACCStringLengthLimit).

TABLE 14

| | |
|---|---|
| Descriptive Name | CACCStringLengthLimit |
| Identifier | DataType_xxx |
| ASN.1 representation | CACCStringLengthLimit ::= INTEGER (1 . . 1000) |
| Definition | This DE (Data Element) defines the limit of CACC string length in number for the regional area. |
| Unit | N/A |

As represented in Table 14, the CSLL information is a DE, and defines a limitation of a CACC string length for a region by a number. That is, the CSLL information may limit the CACC string length for the region by number unit. For example, the CACC string length for the region may be limited by vehicles from 1 to 1000.

Meanwhile, according to an embodiment, such a length limitation may be defined by a geometrical distance of a CACC string. Table 15 represents an example of CSLLGD information (DE_CACCStringLengthLimitGD).

TABLE 15

| | |
|---|---|
| Descriptive Name | CACCStringLengthLimitGD |
| Identifier | DataType_xxx |
| ASN.1 representation | CACCStringLengthLimitGD ::= INTEGER (1 . . 10000) |
| Definition | This DE (Data Element) defines the limit of CACC string length in geometrical distance (meters) for the regional area. |
| Unit | N/A |

As represented in Table 15, the CSLLGD information is a DE, and defines a limitation of a CACC string length for a region by a geometrical distance. That is, the CSLLGD information may limit the CACC string length for the region by geometrical distance unit. For example, the CACC string length for the region may be limited by a distance from 1 meter to 10000 meters.

Before joining in a CACC string, a CACC activated vehicle may receive a position (CSLVP) of a lead vehicle and a position of the last vehicle in the CACC string, and may know the geometrical length of the CACC string. The CSLVP may be shared and broadcasted among the vehicles in the CACC string through the CSLVP message/information described above. The position of the last vehicle may be received for measured through V2X communication or a sensor.

CACC String Number Limit (CSNL)

A roadside station may broadcast a recommended or requested limit value of a CACC string number periodically by considering traffic condition, road topology, and the like of a region. For example, a roadside station like an RSU may transmit CSNL information, and may provide a recommended or requested limit value of a CACC string number periodically. Table 16 represents an example of the CSNL information (DE_CACCStringNumLimit).

TABLE 16

| | |
|---|---|
| Descriptive Name | CACCStringNumLimit |
| Identifier | DataType_xxx |
| ASN.1 representation | CACCStringNum Limit ::= INTEGER (0 . . 1000) |
| Definition | This DE (Data Element) defines the limit of the number of CACC strings for the regional area. |
| Unit | N/A |

As represented in Table 16, the CSNL information is a DE, and defines a limitation of a CACC string number for a region. For example, the CSNL information may limit the CACC string number for the region by a number from 1 to 1000.

CACC String Lane

A vehicle in a CACC string may broadcast information for a lane on which the CACC string is located (lane information). For example, the vehicle in the CACC string may provide the lane information for the lane on which the CACC string is located by transmitting CACC string lane information. Table 17 represents an example of CACC string lane information (DE_CACCStringLane).

TABLE 17

| | |
|---|---|
| Descriptive Name | CACCStringLane |
| Identifier | DataType_xxx |
| ASN.1 representation | CACCStringLane ::= INTEGER {outermostDrivingLane(1), secondLaneFromOutside(2)}(1 . . 14) |
| Definition | This DE (Data Element) identifies the CACC string's lane position. |
| Unit | N/A |

As represented in Table 17, the CACC string lane information is a DE, and identifies a lane position of a CACC string. The CACC string lane information may indicate a lane position of a CACC string using an integer from 1 to 14. For example, when CACC string lane information is 1, this indicates the outermost driving lane, and when CACC string lane information is 2, this indicates the second outermost driving lane. In such a way, a lane position of a CACC string may be indicated through the CACC string information.

As an embodiment, the CACC string lane information may be broadcasted by being included in the CACC information (DF_CACCInfo).

A roadside station may broadcast the information for a CACC string allowed and a designated lane in a corresponding region. For example, a roadside station (ITS-S) like an RSU may provide the information for a CACC string allowed lane by using CACC string allowed lane information, and provide the information for a CACC string exclusive lane by using CACC string designated lane information. Tables 18 and 19 represent an example of the CACC string allowed lane information (DF_CACCStringAllowedLane) and the CACC string designated lane information (DF_CACCStringDesignatedLane), respectively.

TABLE 18

| | |
|---|---|
| Descriptive Name | CACCStringAllowedLane |
| Identifier | DataType_xxx |
| ASN.1 representation | CACCStringAllowedLane ::= SEQUENCE (SIZE(0 . . 14)) OF LanePosition |
| Definition | This OF (Data Frame) lists lane positions allowed for CACC strings. |
| Unit | N/A |

As represented in Table 18, the CACC string allowed lane information is a DF, and lists lane positions allowed for a CACC string. For example, the CACC string allowed lane information may be a sequence indicating a lane position on which a CACC string is allowed.

TABLE 19

| | |
|---|---|
| Descriptive Name | CACCStringDesignatedLane |
| Identifier | DataType_xxx |
| ASN.1 representation | CACCStringDesignatedLane ::= SEQUENCE (SIZE(0 . . 14)) OF LanePosition |
| Definition | This DF (Data Frame) lists lane positions designated for CACC strings. |
| Unit | N/A |

As represented in Table 19, the CACC string designated lane information is a DF, and lists lane positions designated for a CACC string. For example, the CACC string designated lane information may be a sequence indicating a lane position on which a CACC string is designated.

Hereinafter, with reference to FIGS. 34 to 39, a method for selecting a target vehicle and selecting a CACC string is described. In the embodiment below, it is assumed that there is a plurality of target candidate vehicles or there is a plurality of CACC strings.

Target Vehicle Selection

In a first embodiment, a subject vehicle may select a target vehicle using the CACC string length (CSL) information only. In this case, the subject vehicle may obtain the CSL information during the target vehicle discovery procedure. When obtaining the CSL information from a plurality of vehicles, the subject vehicle may join in a string of which a value of CACC string length is the smallest considering traffic efficiency.

In a second embodiment, a subject vehicle may select a target vehicle using the CSL information and the CSLL information. When obtaining the CSLL information from a roadside ITS-S, the subject vehicle may not join in a CACC string having a length of a value which is greater than or equal to the value. When a traffic situation is bad, the roadside ITS-S may decrease the CSLL value such that an excessively long CACC string does not degrade traffic efficiency.

In a third embodiment, a subject vehicle may select a target vehicle using the CSNL information. When obtaining the CSNL information from a roadside ITS-S, in the case that the subject vehicle discovers a CACC string greater than or equal to the value, the subject vehicle may not generate a new CACC string. In this case, the subject vehicle may join in one of the CACC strings discovered for the CACC. A discovery of a CACC string is available with a CACC string ID (CSID) that enables to receive it from a CACC activated vehicle, and the number of CACC strings may be identified using the maximum value among the received CSIDs (in the case of the simple numbering method) or the number of CSIDs distinguished (in the case of using a network address).

FIG. 34 illustrates a method for a subject vehicle to discover and select a target vehicle in a plurality of target candidate vehicles based on OIS information according to an embodiment of the present invention. In the embodiment of FIG. 34, it is assumed that a subject vehicle joins at an end of a CACC string.

Referring to the upper part of FIG. 34, the subject vehicle may perform a target vehicle discovery procedure. Through this, the subject vehicle may discover at least one target vehicle candidate. As shown in the drawing, when a plurality of target vehicle candidates is discovered, the subject vehicle may receive the OIS information and/or the CSID information from each of the target vehicle candidates. Later, the subject vehicle may select a target vehicle from the target vehicle candidates based on the OIS information. For example, as shown in the drawing, the subject vehicle joining at the end of the CACC string may select the target vehicle candidate having the smallest OIS value among the target vehicle candidates as the target vehicle.

Later, the subject vehicle may join in the CACC string so as to follow the selected target vehicle, as shown in the lower part of FIG. 34.

FIG. 35 illustrates a method for a subject vehicle to discover and select a target vehicle in a plurality of target candidate vehicles based on OIS information and CSL information according to an embodiment of the present invention. In the embodiment of FIG. 35, it is assumed that a subject vehicle joins at an end of a CACC string.

Referring to the upper part of FIG. 35, the subject vehicle may perform a target vehicle discovery procedure. Through this, the subject vehicle may discover at least one target vehicle candidate. As shown in the drawing, when a plurality of target vehicle candidates is discovered, the subject vehicle may receive the OIS information, the CSL information and/or the CSID information from each of the target vehicle candidates. Later, the subject vehicle may select a target vehicle from the target vehicle candidates based on the OIS information and the CSL information. For example, as shown in the drawing, the subject vehicle joining at the end of the CACC string may select the target vehicle candidate having the smallest OIS value and/or CSL value among the target vehicle candidates as the target vehicle.

Later, the subject vehicle may join in the CACC string so as to follow the selected target vehicle, as shown in the lower part of FIG. 35.

FIG. 36 illustrates a method for a subject vehicle to discover and select a target vehicle in a plurality of target candidate vehicles based on CSLVP information according to an embodiment of the present invention. In the embodiment of FIG. 36, it is assumed that a subject vehicle joins at an end of a CACC string.

Referring to the upper part of FIG. 36, the subject vehicle may perform a target vehicle discovery procedure. At this time the subject vehicle may estimate a length of the CACC string using a geometrical distance. As an embodiment, the subject vehicle may receive its own geometrical position (GP) information and the CSLVP information from each target vehicle candidate, and estimate the length of the CACC string using the GP information and the CSLVP information.

For example, the subject vehicle may receive first CSLVP information (CSLVP #1) indicating a geometrical position GP #1 of a lead vehicle of a first CACC string and first GP information indicating a geometrical position GP #2 of a first target vehicle candidate from the first target vehicle candidate belonged to the first CACC string (CACC string #1), and estimate a length of the first CACC string using the first CSLVP information and the first GP information. The length of the first CACC string estimated as such may be a distance between a value of the first CSLVP information and a value of the first GP information. In addition, the subject vehicle may receive second CSLVP information (CSLVP #2) indicating a geometrical position GP #2 of a lead vehicle of a second CACC string and second GP information indicating a geometrical position GP #3 of a second target vehicle candidate from the second target vehicle candidate belonged to the second CACC string (CACC string #2), and estimate a length of the second CACC string using the second CSLVP information and the second GP information. The length of the second CACC string estimated as such may be a distance between a value of the second CSLVP information and a value of the second GP information.

Later, the subject vehicle may select a target vehicle from a plurality of the target vehicle candidates using the estimated CACC string length. For example, as shown in the drawing, the subject vehicle joining at the end of the CACC string may select the target vehicle candidate having the smallest CACC string length value among the target vehicle candidates as the target vehicle.

Later, the subject vehicle may join in the CACC string so as to follow the selected target vehicle, as shown in the lower part of FIG. 36.

FIG. 37 illustrates a method for a subject vehicle to select a CACC string based on CACC string length (CSLL) information according to an embodiment of the present invention. In the embodiment of FIG. 37, a subject vehicle may receive the OIS information, the CSL information and/or the CSID information from a plurality of target vehicle candidates, and receive the CSLL information from a neighboring roadside ITS-S. At this time, the CSLL information may be set as the number of vehicles belonged to the CACC string.

As shown in the drawing, in the case that an OIS value or a CSL value of the target vehicle is greater than or equal to a CSLL value, the subject vehicle may not follow the CACC string to which the corresponding target vehicle candidate is belonged. In this case, the subject vehicle may discover another target vehicle candidate again.

FIG. 38 illustrates a method for a subject vehicle to select a CACC string based on CACC string length (CSLL) information according to another embodiment of the present invention. In the embodiment of FIG. 38, a subject vehicle may receive its own position information, the CSLVP information and/or the CSID information from a plurality of target vehicle candidates, and receive the CSLL information from a neighboring roadside ITS-S. At this time, the CSLL information may be set as a geometrical distance of the CACC string.

As shown in the drawing, the subject vehicle may estimate a length of the CACC string using a geometrical distance. This is as described above in FIG. 36. In the case that the geometrical distance of the CACC string to which the corresponding target vehicle candidate is belonged is greater than or equal to a CSLL value, the subject vehicle may not follow the CACC string to which the corresponding target vehicle candidate is belonged. In this case, the subject vehicle may discover another target vehicle candidate again.

FIG. 39 illustrates a method for a subject vehicle to select a CACC string based on CACC string number limit (CSNL) information according to an embodiment of the present invention. In the embodiment of FIG. 39, a subject vehicle may receive the OIS information, the CSL information and/or the CSID information from a plurality of target vehicle candidates, and receive the CSNL information from a neighboring roadside ITS-S.

As shown in the upper part of FIG. 39, in the case that the number of CSIDs is greater than or equal to a CSNL value, the subject vehicle should not generate a new CACC string. In this case, as shown in the lower part of FIG. 39, the subject vehicle may select the CACC already existed and select the target vehicle candidate belonged to the corresponding CACC string as its target vehicle.

Hereinafter, with reference to FIGS. 40 to 43, a method for determining whether to leave a CACC string and for chaining a CACC string lane.

Leaving from a CACC String

In a first embodiment, a subject vehicle may determine whether to leave from a CACC string with the OIS information and the CSLL information. In the case that the subject vehicle, which establishes the CACC string already and is moving, obtains the CSLL information from a roadside ITS-S and the CSLL value is smaller than an OIS value of the corresponding subject vehicle, the subject vehicle may terminate the CACC service. That is, the subject vehicle may leave from the CACC string.

In a second embodiment, a subject vehicle may determine whether to leave from a CACC string with the CSNL information. In the case that the subject vehicle, which establishes the CACC string already and is moving, obtains the CSNL information from a roadside ITS-S and the CSNL value is smaller than a CSID value of the corresponding subject vehicle (in the case of a method of simple numbering), the subject vehicle may terminate the CACC service. That is, the subject vehicle may leave from the CACC string.

FIG. 40 illustrates a method for a subject vehicle to determine whether to leave a CACC string using CACC string length (CSLL) information according to an embodiment of the present invention. In the embodiment of FIG. 40, a subject vehicle belonged to a CACC string may receive the CSLL information from a neighboring roadside ITS-S. At this time, the CSLL information may be set as the number of vehicles belonged to the CACC string.

As shown in the upper part of FIG. 40, in the case that the received CSLL value is greater than a CSL value, the subject vehicle may leave the CACC string. For example, as shown in the lower part of FIG. 40, the last vehicle in the CACC string may leave the CACC string.

FIG. 41 illustrates a method for a subject vehicle to determine whether to leave a CACC string using CACC string length (CSLL) information according to another embodiment of the present invention. In the embodiment of FIG. 41, a subject vehicle belonged to a CACC string may receive the CSLL information from a neighboring roadside ITS-S. At this time, the CSLL information may be set as a geometrical distance of the CACC string.

As described in the upper part of FIG. 41, each vehicle belonged to a CACC string may estimate a distance to a lead vehicle in the CACC string. At this time, the CSLVP information received from the lead vehicle may be used.

As shown in the lower part of FIG. 41, in the case that the received CSLL value is greater than a distance to a lead vehicle, the subject vehicle may leave a CACC string. For example, as shown in the lower part of FIG. 41, the last vehicle in the CACC string may leave the CACC string.

FIG. 42 illustrates a method for a subject vehicle to determine whether to leave a CACC string using CACC string number limit (CSNL) information according to an embodiment of the present invention. In the embodiment of FIG. 42, a subject vehicle belonged to a CACC string may receive the CSNL information from a neighboring roadside ITS-S.

As shown in the upper part of FIG. 42, in the case that the number of CSIDs of a target vehicle candidate is greater than a CSNL value, a part of the CACC string should be dispersed. For example, the number of CSIDs exceeds the CSLN value, a CACC string of which CSL value is small among the CACC strings may be dispersed.

For example, as shown in the lower part of FIG. 42, the vehicles belonged to the corresponding CACC string leave the corresponding CACC string, and accordingly, a CACC string may be dispersed.

FIG. 43 illustrates a method for a subject vehicle to change a CACC string lane using CACC string lane information according to an embodiment of the present invention. In the embodiment of FIG. 43, a subject vehicle belonged to a CACC string may receive the CACC string lane information from a neighboring roadside ITS-S.

As described in the upper part of FIG. 43, a vehicle belonged to the CACC string may receive the CACC string lane information indicating other lane as a designated lane, not a lane on which the corresponding CACC string is located. In this case, as shown in the lower part of FIG. 43, the vehicles belonged to the CACC string may change a CACC string lane to the corresponding lane.

The data used for managing the CACC string described above may be forwarded through a CAM message or a DENM message. In this case, the CACC related information may be transmitted through an extension of the CAM message or an extension of the DENM message. However, this is not limited thereto, but the data may be forwarded through a message having a new message format for the CACC service.

FIG. 44 illustrates a V2X communication apparatus according to an embodiment of the present invention.

In FIG. 44, a V2X communication apparatus 44000 may include a memory 44010, a processor 44020 and a communication unit 44030. As described above, the V2X communication apparatus may correspond to an On Board Unit (OBU) or a Road Side Unit (RSU), or may be belonged to the OBU or the RSU. The V2X communication apparatus may be included in an ITS station, or correspond to the ITS station.

The communication unit 44030 may be connected to the processor 44020 and may transmit/receive a radio signal. The communication unit 44030 may transmit a signal by up-converting the data received from the processor 44020 to a transmission/reception band. The communication unit may implement an operation of an access layer. As an embodiment, the communication unit may implement an operation of a physical layer included in the access layer or implement an operation of a MAC layer additionally. The communication unit may include a plurality of sub communication units in order to communicate according to a plurality of communication protocols.

The processor 44020 may be connected with the communication unit 44030 and may implement operations of layers according to an ITS system or a WAVE system. The processor 44020 may be configured to perform operations according to the various embodiments of the present invention according to the drawings and descriptions described above. In addition, at least one of a module, data, program or software that implements the operation of the V2X communication apparatus according to the various embodiments of the present invention may be stored in the memory 44010 and executed by the processor 44020.

The memory 44010 is connected to the processor 44020 and stores various types of information for executing the processor 44020. The memory 44010 may be located inside or outside the processor 44020 and may be connected to the processor 44020 by various well-known means. The memory may include a security/non-security storage device or included in a security/non-security storage device. According to an embodiment, the memory may be referred to as a security/non-security storage device.

The detailed construction of the V2X communication apparatus 44000 may be implemented such that the various embodiments of the present invention described above are independently applied or two or more embodiments are applied together.

In relation to FIG. 2, the GNSS receiver and the DSRD radio may be included in the communication unit 44030. The DSRC device processor may be included in the communication unit 44030 or included in the processor 44020.

FIG. 45 illustrates a method for a V2X communication apparatus to receive a V2X message according to an embodiment. In the embodiment of FIG. 45, the V2X communication apparatus may be a V2X communication apparatus of a subject vehicle. For example, the V2X communication apparatus may be a V2X communication apparatus of the subject vehicle that newly joins in a CACC string.

The V2X communication apparatus may receive a V2V message including CACC information from at least one CACC vehicle (step, S45010). In this case, the CACC vehicle may be a vehicle belonged to the CACC string. As an embodiment, the V2V message may be transmitted with CAM message format, DENM message format or a new message format for a CACC service.

As an embodiment, the CACC information includes CSID information for identifying a CACC string to which the CACC vehicle is belonged and string length management information used for managing a string length of the CACC string. In addition, the CACC information further includes the last vehicle indication information indicating whether the CACC vehicle is the last vehicle in the CACC string. Further, the CACC information may further include at least one of string lane information indicating a lane on which the CACC string is located, string allowable lane information indicating a lane on which the CACC string is allowed or string designated lane information indicating a lane designated to the CACC string.

The V2X communication apparatus may obtain the CSID information and the string length management information from the V2V message (step, S45020). That is, the V2X communication apparatus may obtain the CSID information and the string length management information from the respective V2V messages.

The V2X communication apparatus may set a value of the string length management information of the subject vehicle based on the CSID information and the string length management information (step, S45030). As such, the string length management information may be transmitted (broadcasted) with being included in the V2V message.

As an embodiment, the string length management information may include at least one of Order In String (OIS) information indicating a current order of the CACC vehicle in the CACC string or CACC String Length (CSL) information indicating a length of the CASS string.

In an embodiment, when the string length management information includes the OIS information, the V2X communication apparatus may set the value of the OIS information of the subject vehicle as the maximum value among values of the OIS information obtained from a V2V message having a value of the CISD information identical to a value of the CISD information of a target vehicle followed by the subject vehicle, added by 1. This is as described above in FIGS. 21 to 23.

In another embodiment, when the string length management information includes the OIS information, the V2X communication apparatus may set the value of the OIS information of the subject vehicle as a value of CSL information obtained from a CACC message having a value of the CISD information identical to a value of the CISD information of a target vehicle followed by the subject vehicle, added by 1. This is as described above in FIGS. 24 to 27.

As an embodiment, the V2X communication apparatus may receive, from a roadside station, an I2V message including CACC String Length Limit (CSLL) information for restricting the length of the CASS string, and may determining whether the subject vehicle leaves from the CASS string based on the OIS information and the CSLL information. At this time, when the value of the OIS information is greater than a value of the CSLL information, the V2X communication apparatus may determine the subject vehicle to leave from the CASS string. This is as described above in FIGS. 37 and 38.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

It is understood to those skilled in the art that various alterations and modifications are available in the present invention without departing from the concept or the scope of the present invention. Accordingly, it is intended that the present invention includes alterations and modifications of the present invention provided in the attached claims and the equivalence thereof.

Both of the device and the method invention are described in the present disclosure, and the description of both of the device and the method invention may be applied mutually complementarily.

Various embodiments are described in the Best Mode for Invention.

INDUSTRIAL APPLICABILITY

The present invention is used in a series of vehicle communication field.

It is understood to those skilled in the art that various alterations and modifications are available in the present invention without departing from the concept or the scope of the present invention. Accordingly, it is intended that the present invention includes alterations and modifications of the present invention provided in the attached claims and the equivalence thereof.

The invention claimed is:

1. A method for receiving a Vehicle to everything (V2X) message by a V2X communication apparatus of a subject vehicle, the method comprising:

receiving a V2X message including Cooperative Adaptive Cruise Control (CACC) information from at least one apparatus supporting CACC, wherein the CACC information includes CACC String ID (CSID) information for identifying a CACC string to which a vehicle supporting CACC belongs and string length management information used for managing a string length of the CACC string, wherein the string length management information includes (i) Order In Strum (OIS) information representing a current order of the vehicle supporting CACC in the CACC string, (ii) CACC String Length Limit (CSLL) information representing a limit of a length of the CACC string and (iii) CACC String Lead Vehicle Position (CSLVP) information representing a geometrical position of a lead vehicle in the CACC string;

obtaining the CSID information and the string length management information from the V2X message;

determining whether to join the CACC string to which the vehicle supporting CACC belongs based on the string length management information; and setting a value of the string length management information of the subject vehicle based on (i) the CSID information and (ii) the string length management information, wherein whether to join the CACC string to which the vehicle supporting CACC belongs is determined based on (i) the CSLL information and (ii) CACC String Length (CSL) information representing a length of the CACC string for managing a length of the CACC string information.

2. The method for receiving a V2X message of claim 1, wherein the obtaining the CSID information and the string length management information from the V2X message is performed by:

based on the string length management information including the OIS information has a positive integer, setting the value of the OIS information of the subject vehicle as a maximum value among values of the OIS information obtained from a V2X message having a value of the CSID information identical to a value of the CSID information of a target vehicle followed by the subject vehicle, added by 1.

3. The method for receiving a V2X message of claim 2, further comprising:

receiving, from a roadside station, an I2V message including the CSLL; and determining whether the subject vehicle leaves from the CACC string based on the OIS information and the CSLL information, wherein the string length management information includes the CSLL information indicating a limited length of the CACC string.

4. The method for receiving a V2X message of claim 3, wherein the determining whether the subject vehicle leaves from the CACC string includes, when the value of the OIS information is greater than a value of the CSLL information, determining the subject vehicle to leave from the CACC string.

5. The method for receiving a V2X message of claim 1, wherein the setting the value of the string length management information of the subject vehicle based on the CSID information and the string length management information is performed by:

based on the string length management information including the CSL information, setting the value of the CSL information of the subject vehicle as a value of CSL information obtained from a CACC message having a value of the CSID information identical to a value of the CSID information of a target vehicle followed by the subject vehicle, added by 1.

6. The method for receiving a V2X message of claim 1, wherein the CACC information further includes a last vehicle indication information indicating whether the vehicle supporting CACC is the last vehicle in the CACC string.

7. The method for receiving a V2X message of claim 1, wherein the CACC information includes at least one of string lane information indicating a lane on which the CACC string is located, string allowable lane information indicating a lane on which the CACC string is allowed or string designated lane information indicating a lane designated to the CACC string.

8. The method for receiving a V2X message of claim 2, further comprising:
receiving, from a roadside station, an I2V message including the CSL information indicating a length of the CACC string; and
determining whether the subject vehicle joins the CACC string based on the OIS information and the CSL information.

9. The method for receiving a V2X message of claim 1, wherein the limit of the length of the CACC string of the CSLL information represents one of (i) a total number of the vehicle supporting CACC which belongs to the CACC string and (ii) a geometrical distance between a lead vehicle and a last vehicle which belong to the CACC string.

10. The method for receiving a V2X message of claim 9, wherein, based on the limit of the length of the CACC string of the CSLL information representing the geometrical distance between the lead vehicle and the last vehicle which belong to the CACC string, whether to join the CACC string to which the vehicle supporting CACC belongs is determined further based on (i) the CSLL information and (ii) the CSL VP information.

11. The method for receiving a V2X message of claim 1, wherein the string length management information further includes CACC String Number Limit (CSNL) information representing a limit of a number of the CACC string.

12. The method for receiving a V2X message of claim 11, based on that whether to join the CACC string to which the vehicle supporting CACC belongs is determined based on the CSNL information, further comprising:
joining to one of CACC strings discovered based on a number of the CACC strings discovered being greater than a value of the CSNL information,
wherein a new CACC string is not generated by the subject vehicle.

13. A vehicle to everything (V2X) communication apparatus of a subject vehicle, the V2X communication apparatus comprising:
a transceiver configured to transmit and receive a radio signal;
at least one processor; and
at least one computer memory operably connectable to the at least one processor and storing instructions that, when executed by the at least one processor, perform operations comprising:
receiving, via the transceiver a V2X message including Cooperative Adaptive Cruise Control (CACC) information from at least one apparatus supporting CACC,
wherein the CACC information includes CACC String ID (CSID) information for identifying a CACC string to which a vehicle supporting CACC belongs and string length management information used for managing a string length of the CACC string,
wherein the string length management information includes (i) Order In String (OIS) information representing a current order of the vehicle supporting CACC in the CACC string, (ii) CACC String Length Limit (CSLL) information representing a limit of a length of the CACC string and (iii) CACC String Lead Vehicle Position (CSLVP) information representing a geometrical position of a lead vehicle in the CACC string;
obtaining the CSID information and the string length management information from the V2X message;
determining whether to join the CACC siring to which the vehicle supporting CACC belongs based on the string length management information; and
setting a value of the string length management information of the subject vehicle based on (i) the CSID information and (ii) the string length management information,
wherein whether to join the CACC string to which the vehicle supporting CACC belongs is determined based on (i) the CSLL information and (ii) CACC String Length (CSL) information representing a length of the CACC string for managing a length of the CACC string information.

14. The V2X communication apparatus of claim 13, wherein the operations further comprise:
based on the string length management information including the OIS information has a positive integer,
setting the value of the OIS information of the subject vehicle as a maximum value among values of the OIS information obtained from a V2X message having a value of the CSID information identical to a value of the CSID information of a target vehicle followed by the subject vehicle, added by 1.

15. The V2X communication apparatus of claim 14, wherein the operations further comprise:
receiving, via the transceiver, from a roadside station, an I2V message including the CSLL information; and
determining whether the subject vehicle leaves from the CACC string based on the OIS information and the CSLL information, and
wherein the string length management information includes the CSLL information indicating a limited length of the CACC string.

16. The V2X communication apparatus of claim 15, wherein the operations further comprise:
based on the value of the OIS information being greater than a value of the CSLL information, determining the subject vehicle to leave from the CACC string.

17. The V2X communication apparatus of claim 13, wherein the operations further comprise:
based on the string length management information including the CSL information,
setting the value of the CSL information of the subject vehicle as a value of CSL information obtained from a CACC message having a value of the CSID information identical to a value of the CSID information of a target vehicle followed by the subject vehicle, added by 1.

18. The V2X communication apparatus of claim 13, wherein the CACC information further includes a last vehicle indication information indicating whether the vehicle supporting CACC is the last vehicle in the CACC string.

19. The V2X communication apparatus of claim 13, wherein the CACC information includes at least one of string lane information indicating a lane on which the CACC string is located, string allowable lane information indicating a lane on which the CACC string is allowed or string designated lane information indicating a lane designated to the CACC string.

20. The V2X communication apparatus of claim 14, wherein the operations further comprise:
- receiving, from a roadside station, an I2V message including the CSL information indicating a length of the CACC string; and
- determining, whether the subject vehicle joins the CACC string based on the OIS information and the CSL information.

* * * * *